US011761831B2

(12) United States Patent
Okada et al.

(10) Patent No.: US 11,761,831 B2
(45) Date of Patent: *Sep. 19, 2023

(54) FORCE SENSOR

(71) Applicant: TRI-FORCE MANAGEMENT CORPORATION, Saitama-ken (JP)

(72) Inventors: Kazuhiro Okada, Saitama-ken (JP); Miho Sekine, Saitama-ken (JP); Yuki Hongo, Saitama-ken (JP)

(73) Assignee: TRI-FORCE MANAGEMENT CORPORATION, Saitama-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/829,567

(22) Filed: Jun. 1, 2022

(65) Prior Publication Data

US 2022/0291062 A1 Sep. 15, 2022

Related U.S. Application Data

(62) Division of application No. 16/944,964, filed on Jul. 31, 2020, now Pat. No. 11,499,878.

(30) Foreign Application Priority Data

Feb. 25, 2020 (JP) ................................. 2020-029797

(51) Int. Cl.
*G01L 1/00* (2006.01)
*G01L 1/22* (2006.01)
*G01L 1/14* (2006.01)

(52) U.S. Cl.
CPC ............ *G01L 1/2287* (2013.01); *G01L 1/144* (2013.01)

(58) Field of Classification Search
CPC ............................. G01L 1/2287; G01L 1/144
See application file for complete search history.

(56) References Cited

U.S. PATENT DOCUMENTS

| 3,948,093 | A | | 4/1976 | Folchi et al. |
| 4,086,576 | A | | 4/1978 | Jebb et al. |
| 4,250,735 | A | * | 2/1981 | Spedding ................ B30B 15/04 |
| | | | | 72/402 |
| 4,616,511 | A | | 10/1986 | Gindy et al. |
| 5,182,515 | A | | 1/1993 | Okada |
| 6,584,857 | B1 | | 7/2003 | Furlani et al. |

(Continued)

FOREIGN PATENT DOCUMENTS

JP       6257017 B1     1/2018

OTHER PUBLICATIONS

Japanese Office Action dated Jul. 10, 2020 for Application No. JP 2020-029797.

(Continued)

*Primary Examiner* — Max H Noori
(74) *Attorney, Agent, or Firm* — Ladas & Parry LLP

(57) ABSTRACT

A strain body of a force sensor according to the present invention includes a tilting structure disposed between a force receiving body and a support body, a force-receiving-body-side deformable body connecting the force receiving body and the tilting structure, and a support-body-side deformable body connecting the tilting structure and the support body. The tilting structure includes a first tilting body that extends in a second direction orthogonal to a first direction and that is elastically deformable by the action of force in the first direction.

13 Claims, 32 Drawing Sheets

(56) References Cited

U.S. PATENT DOCUMENTS

| | | |
|---|---|---|
| 10,488,280 B2 | 11/2019 | Okada et al. |
| 11,499,878 B2 * | 11/2022 | Okada .................. G01L 1/2243 |
| 2008/0030205 A1 | 2/2008 | Fujii et al. |
| 2011/0005338 A1 | 1/2011 | Okada |
| 2015/0241196 A1 | 8/2015 | Gerson |
| 2016/0258828 A1 | 9/2016 | Nezuka |
| 2018/0313866 A1 * | 11/2018 | Yamaguchi ............... G01L 1/18 |
| 2019/0113407 A1 * | 4/2019 | Okada ..................... G01L 5/166 |
| 2019/0212215 A1 | 7/2019 | Okada et al. |
| 2021/0247229 A1 * | 8/2021 | Blankley, Jr. ........ G01G 23/363 |

OTHER PUBLICATIONS

Extended European Search Report dated Jan. 13, 2021 for Application No. EP 20188518.3.

\* cited by examiner

|    | C1 | C2 |
|----|----|----|
| Fx | −  | +  |
| Fy | 0  | 0  |
| Fz | −  | −  |

FIG. 8

|    | C1 | C2 | C3 | C4 | C5 | C6 | C7 | C8 |
|----|----|----|----|----|----|----|----|----|
| Fx | − | + | 0 | 0 | + | − | 0 | 0 |
| Fy | 0 | 0 | − | + | 0 | 0 | + | − |
| Fz | − | − | − | − | − | − | − | − |
| Mx | + | + | 0 | 0 | − | − | 0 | 0 |
| My | 0 | 0 | + | + | 0 | 0 | − | − |
| Mz | − | + | − | + | − | + | − | + |

FIG. 9

|     | Fx | Fy | Fz | Mx | My | Mz |
|-----|----|----|----|----|----|----|
| VFx | 4 | 0 | 0 | 0 | 0 | 0 |
| VFy | 0 | 4 | 0 | 0 | 0 | 0 |
| VFz | 0 | 0 | 8 | 0 | 0 | 0 |
| VMx | 0 | 0 | 0 | 4 | 0 | 0 |
| VMy | 0 | 0 | 0 | 0 | 4 | 0 |
| VMz | 0 | 0 | 0 | 0 | 0 | 8 |

FIG. 10

FORCE SENSOR

RELATED APPLICATION

This application is a divisional of application Ser. No. 16/944,964 filed on Jul. 31, 2020, which claims priority from JP 2020-029797 filed on Feb. 25, 2020, the entire contents of which are incorporated herein by reference.

CROSS-REFERENCE TO RELATED APPLICATIONS

This application is based upon and claims the benefit of priority from Japanese Patent Application No. 2020-029797, filed on Feb. 25, 2020; the entire contents of which are incorporated herein by reference.

FIELD

The present invention relates to a force sensor.

BACKGROUND

Heretofore, there has been known a force sensor that outputs, as an electric signal, force acting in a predetermined axial direction and moment (or torque) acting around a predetermined rotation axis (e.g., see Japanese Patent No. 6257017). This force sensor is widely used for force control and others of various robots including industrial robots, collaborative robots, life support robots, medical robots, service robots, etc. Thus, improvement in performance is requested as well as safety.

For example, in a general force sensor, when force or moment is input, strain is produced by elastic deformation of a strain body constituting the force sensor, and displacement is caused. The magnitude of the input force or moment is obtained by detecting the magnitude of the displacement as an electric signal. Various types such as a capacitance type and a strain gauge type exist as detection types.

While the strain body is elastically deformed, stress is applied to the strain body. When elastic deformation of the strain body due to the applied stress is small, displacement is small. In this case, detection sensitivity of force or moment can deteriorate. If detection sensitivity deteriorates, detection accuracy can deteriorate.

SUMMARY

The present invention has been made in view of such circumstances, and is indented to provide a force sensor that can improve detection accuracy.

The present invention provides
a force sensor comprising:
a force receiving body that receives action of force or moment to be targeted for detection;
a support body that is disposed on one side of the force receiving body in a first direction and that supports the force receiving body;
a strain body that connects the force receiving body and the support body and that is elastically deformed by the action of force or moment received by the force receiving body;
a detection element that detects displacement caused by elastic deformation produced in the strain body; and
a detection circuit that outputs an electric signal indicating force or moment acting on the strain body, on the basis of a detection result by the detection element, wherein the strain body includes a tilting structure disposed between the force receiving body and the support body, a force-receiving-body-side deformable body that connects the force receiving body and the tilting structure, the force-receiving-body-side deformable body being elastically deformable by the action of force or moment received by the force receiving body, and a support-body-side deformable body that connects the tilting structure and the support body, the support-body-side deformable body being elastically deformable by the action of force or moment received by the force receiving body, and the tilting structure includes a first tilting body that is disposed in a plane including the first direction and a second direction orthogonal to the first direction, the first tilting body extending in a direction different from the first direction and being elastically deformable by the action of force in the first direction.

In the force sensor described above, the force-receiving-body-side deformable body may extend in the first direction.

In the force sensor described above, the support-body-side deformable body may extend in the first direction.

In the force sensor described above, the first tilting body may extend in the second direction.

In the force sensor described above, the first tilting body may include a first force-receiving-body-side facing surface to which the force-receiving-body-side deformable body is connected, the first force-receiving-body-side facing surface facing the force receiving body, and a second force-receiving-body-side facing surface that is disposed on both sides of the first force-receiving-body-side facing surface in the second direction, the second force-receiving-body-side facing surface facing the force receiving body, and the first force-receiving-body-side facing surface may be located on the side of the support body with respect to the second force-receiving-body-side facing surface.

In the force sensor described above, a center of the first tilting body in the second direction may be located on the side of the support body with respect to both ends in the second direction.

In the force sensor described above, a center of the first tilting body in the second direction may be located on the side of the force receiving body with respect to both ends in the second direction.

In the force sensor described above, the tilting structure may further include a second tilting body that is disposed between the first tilting body and the support body, the second tilting body being disposed in a plane including the first direction and the second direction, extending in a direction different from the first direction, and being elastically deformable by the action of force in the first direction, and a pair of connecting bodies connecting one of the both ends of the first tilting body in the second direction and a corresponding one of the both ends of the second tilting body in the second direction, the force-receiving-body-side deformable body may be connected to the first tilting body, and the support-body-side deformable body may be connected to the second tilting body.

In the force sensor described above, the force-receiving-body-side deformable body may be located between both the ends of the first tilting body in the second direction.

In the force sensor described above, the support-body-side deformable body may be located between both the ends of the second tilting body in the second direction.

In the force sensor described above, the force-receiving-body-side deformable body and the support-body-side deformable body may be located at positions overlapping each other when viewed in the first direction.

In the force sensor described above, the tilting structure may be formed symmetrically with respect to the force-receiving-body-side deformable body and the support-body-side deformable body in the second direction.

In the force sensor described above, the spring constant of the second tilting body relative to force acting in the first direction may be different from the spring constant of the first tilting body relative to force acting in the first direction.

In the force sensor described above, the second tilting body may extend in the second direction.

In the force sensor described above, the second tilting body may include a first support-body-side facing surface to which the support-body-side deformable body is connected, the first support-body-side facing surface facing the support body, and a second support-body-side facing surface that is disposed on both sides of the first support-body-side facing surface in the second direction, the second support-body-side facing surface facing the support body, and the first support-body-side facing surface may be located on the side of the force receiving body with respect to the second support-body-side facing surface.

In the force sensor described above, a center of the second tilting body in the second direction may be located on the side of the force receiving body with respect to both ends in the second direction.

In the force sensor described above, a center of the second tilting body in the second direction may be located on the side of the support body with respect to both ends in the second direction.

In the force sensor described above, the force receiving body and the first tilting body may be connected by the two force-receiving-body-side deformable bodies, and the support-body-side deformable body connects the first tilting body and the support body.

In the force sensor described above, the two force-receiving-body-side deformable bodies may be located at both the ends of the first tilting body in the second direction.

In the force sensor described above, the support-body-side deformable body may be located between the two force-receiving-body-side deformable bodies in the second direction.

In the force sensor described above, the strain body may be formed symmetrically with respect to the support-body-side deformable body in the second direction.

In the force sensor described above, the first tilting body may extend in the second direction.

In the force sensor described above, the first tilting body may include a first support-body-side facing surface to which the support-body-side deformable body is connected, the first support-body-side facing surface facing the support body, and a second support-body-side facing surface that is disposed on both sides of the first support-body-side facing surface in the second direction, the second support-body-side facing surface facing the support body, and the first support-body-side facing surface may be located on the side of the force receiving body with respect to the second support-body-side facing surface.

In the force sensor described above, a center of the first tilting body in the second direction may be located on the side of the force receiving body with respect to both ends in the second direction.

In the force sensor described above, the force-receiving-body-side deformable body may be connected to the force receiving body via a force-receiving-body-side seat, and the support-body-side deformable body may be connected to the support body via a support-body-side seat.

In the force sensor described above, the detection element may include a fixed electrode substrate provided on the force receiving body or the support body and a displacement electrode substrate provided on the tilting structure, the displacement electrode substrate facing the fixed electrode substrate, and the displacement electrode substrate may be disposed at both ends of the tilting structure in the second direction.

In the force sensor described above, the displacement electrode substrate may be provided on the tilting structure via a columnar member.

In the force sensor described above, the displacement electrode substrate may be provided on the columnar member via a reinforcing substrate.

In the force sensor described above, the detection element may include a strain gauge provided on the strain body.

In the force sensor described above, the force receiving body and the support body may be connected by the four strain bodies, the four strain bodies may include a first strain body, a second strain body, a third strain body, and a fourth strain body, the first direction may be a Z-axis direction in an XYZ three-dimensional coordinate system, the first strain body may be disposed on a negative side in the Y-axis direction relative to a center of the force receiving body, the second strain body may be disposed on a positive side in the X-axis direction relative to the center of the force receiving body, the third strain body may be disposed on a positive side in the Y-axis direction relative to the center of the force receiving body, and the fourth strain body may be disposed on a negative side in the X-axis direction relative to the center of the force receiving body, the second direction of the first strain body and the third strain body may be the X-axis direction, and the second direction of the second strain body and the fourth strain body may be the Y-axis direction.

In the force sensor described above, at least one of the planar shape of the force receiving body and the planar shape of the support body may be circular.

In the force sensor described above, at least one of the planar shape of the force receiving body and the planar shape of the support body may be rectangular.

In the force sensor described above, the tilting structure of the strain body may be linearly formed along the second direction when viewed in the first direction.

In the force sensor described above,
the tilting structure of the strain body may be formed into a curved shape when viewed in the first direction.

In the force sensor described above,
an exterior body that covers the strain body from the outside when viewed in the first direction may further be provided.

In the force sensor described above,
the exterior body may be fixed to the support body, and is apart from the force receiving body.

In the force sensor described above,
a cushioning material may be interposed between the exterior body and the force receiving body.

According to the present invention, detection accuracy can be improved.

BRIEF DESCRIPTION OF DRAWING

FIG. 8 is a table illustrating changes in capacitance value of each capacitative element in the strain body in FIG. 4.

FIG. 9 is a table illustrating changes in capacitance value of each capacitative element in the force sensor in FIG. 5.

FIG. 10 is a table illustrating main-axis sensitivity and cross-axis sensitivity based on the changes in capacitance value in FIG. 9.

DETAILED DESCRIPTION

Figure 1:
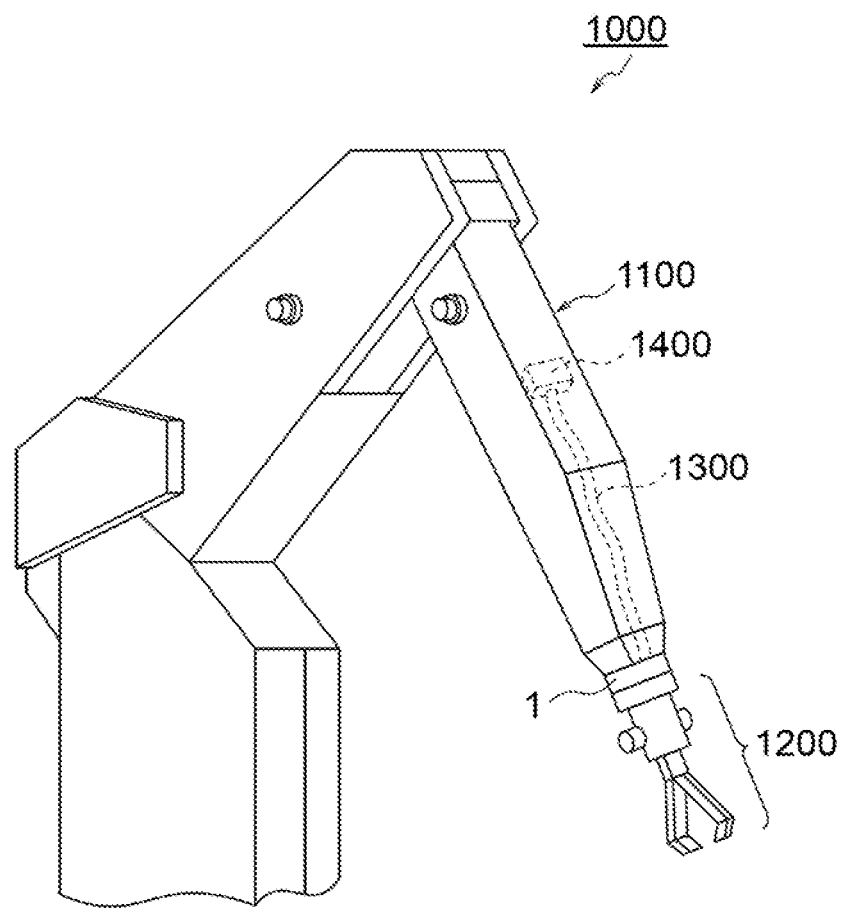
FIG. 1 is a perspective view illustrating one example of a robot to which a force sensor in a first embodiment is applied.

Embodiments of the present invention will be described below with reference to the drawings. It should be noted that in the drawings accompanying the present specification, scale, a lengthwise and crosswise dimensional ratio, and others are suitably modified and exaggerated from real ones for convenience of illustration and ease of understanding.

It should be noted that terms such as "parallel", "orthogonal", and "equal", dimensions, values of physical properties, and others that are used in the present specification and that specify shapes, geometrical conditions, and physical properties, as well as the degrees thereof are not restricted by strict meanings, and interpreted inclusive of ranges of degrees at which similar functions can be expected.

First Embodiment

First, a force sensor in a first embodiment of the present invention is described by use of FIGS. 1 to 23B.

Before describing the force sensor according to the present embodiment, an example of applying the force sensor to a robot is described with reference to FIG. 1. FIG. 1 is a view illustrating one example of a robot to which the force sensor in the present embodiment is applied.

As illustrated in FIG. 1, an industrial robot 1000 includes a robot main body 1100, an end effector 1200, an electric cable 1300, a controller 1400, and a force sensor 1. The robot main body 1100 includes an arm portion of the robot.

The force sensor 1 is provided between the robot main body 1100 and the end effector 1200.

The electric cable 1300 extends inside the robot main body 1100. The electric cable 1300 is connected to a connector (not illustrated) of the force sensor 1.

It should be noted that the controller 1400 is disposed inside the robot main body 1100 in FIG. 1, but may be disposed in any other place (e.g., a control board outside the robot). Moreover, the form of attaching the force sensor 1 to the robot is not limited to the form illustrated in FIG. 1.

The force sensor 1 detects force or moment acting on the end effector 1200 that functions as a gripper. An electric signal indicating the detected force or moment is transmitted to the controller 1400 of the industrial robot 1000 via the electric cable 1300. The controller 1400 controls the operations of the robot main body 1100 and the end effector 1200 on the basis of the received electric signal.

It should be noted that the force sensor 1 is not limited to industrial robots, and is applicable to various robots such as collaborative robots, life support robots, medical robots, and service robots.

Figure 2:
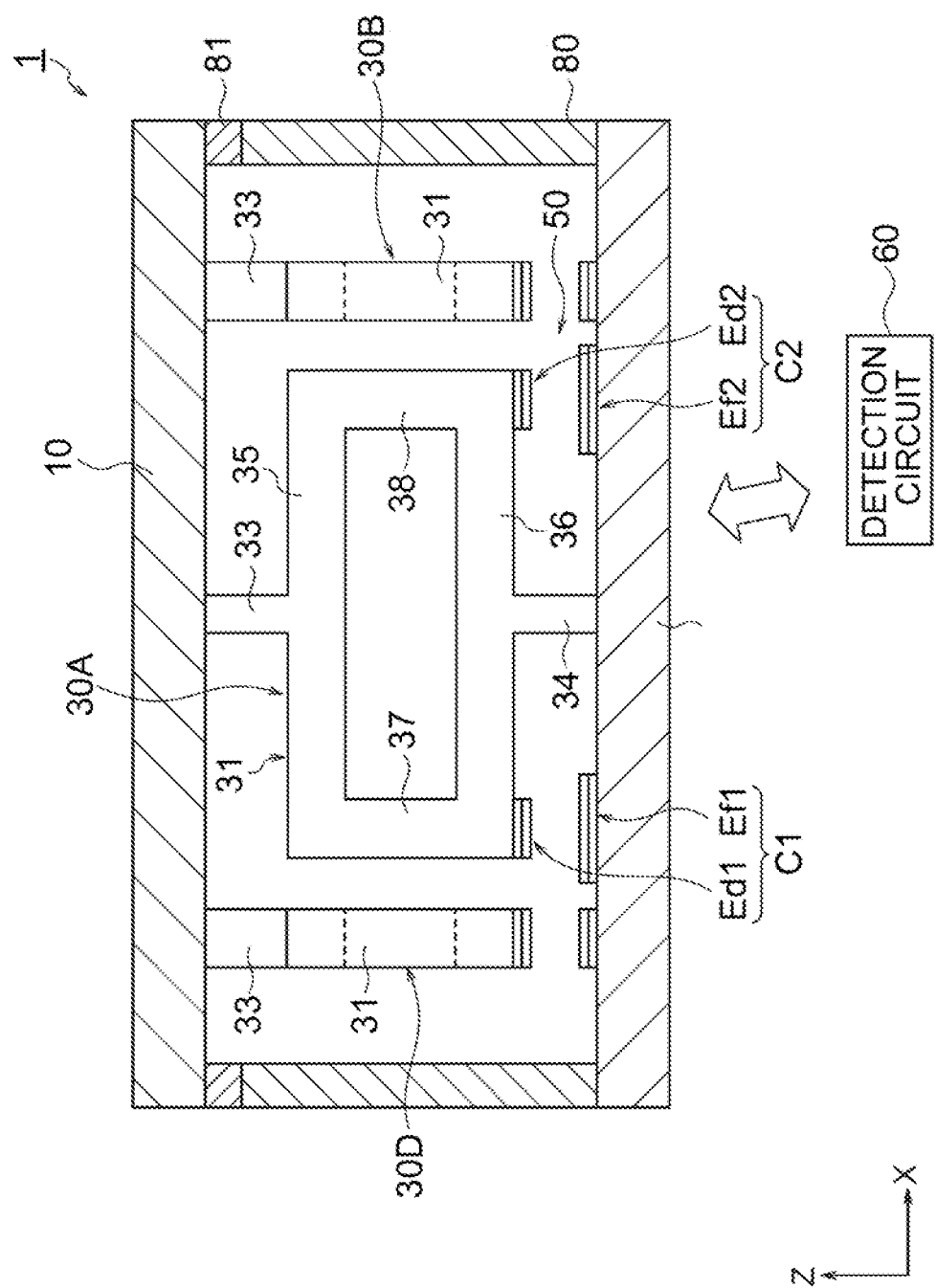
FIG. 2 is a sectional view illustrating the force sensor in the first embodiment, and is a view corresponding to a section along the line A-A in FIG. 3 described later.
Figure 3:
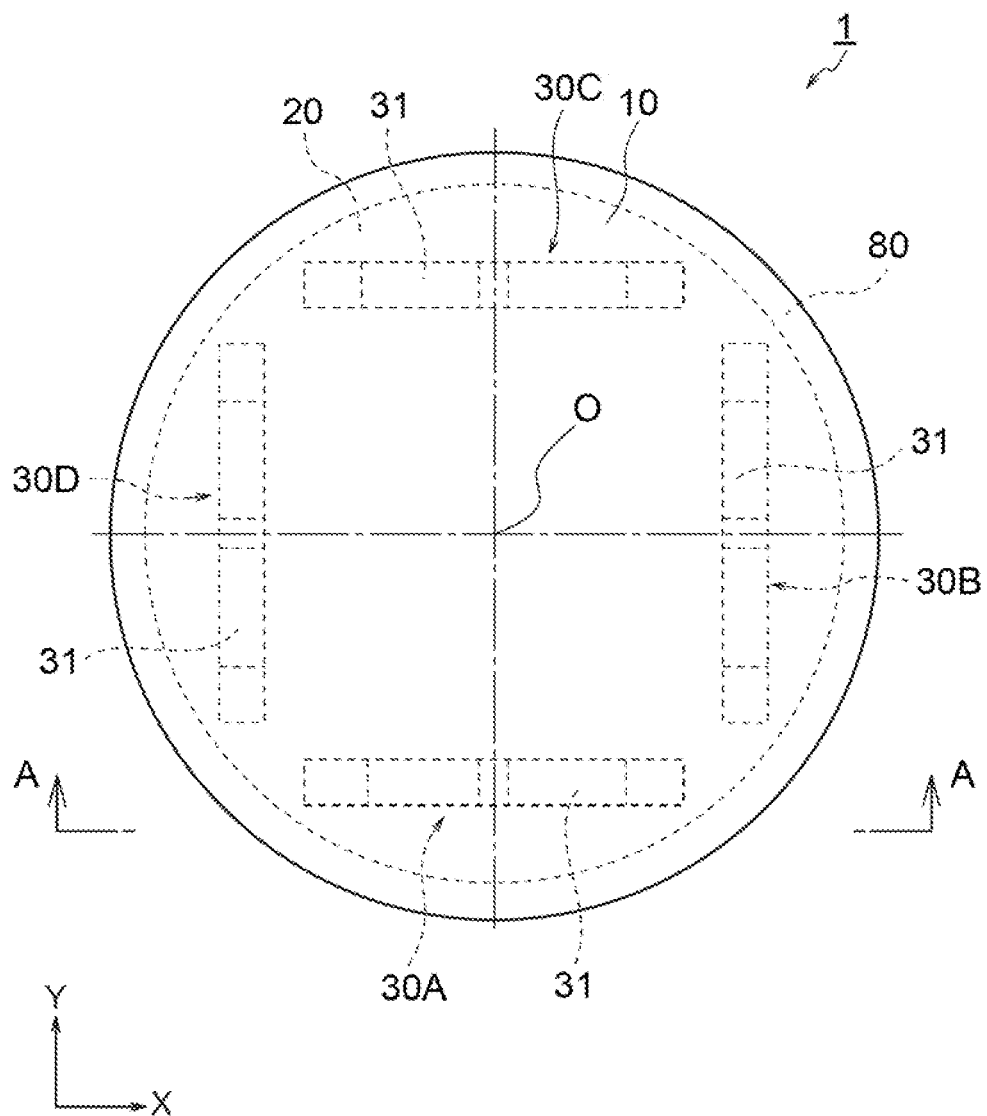
FIG. 3 is a plan view illustrating the force sensor in FIG. 2.
Figure 4:
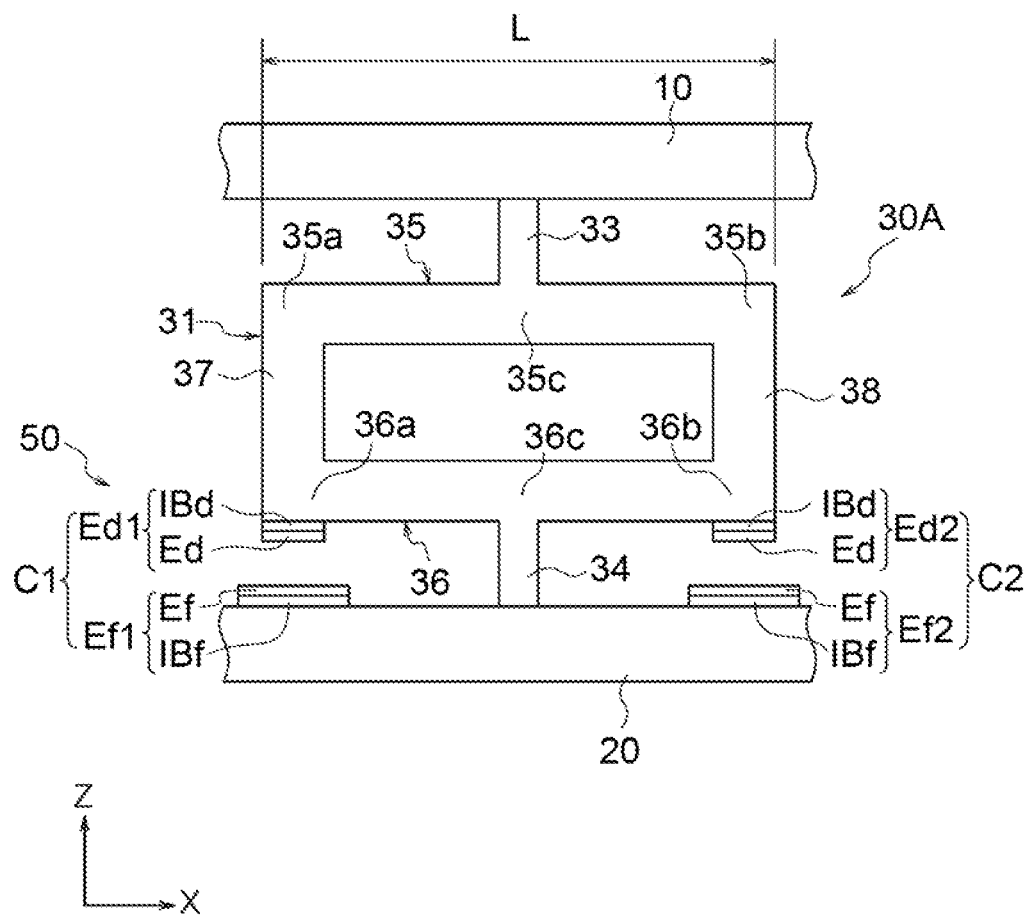
FIG. 4 is a front view illustrating a strain body in FIG. 2.
Figure 5:
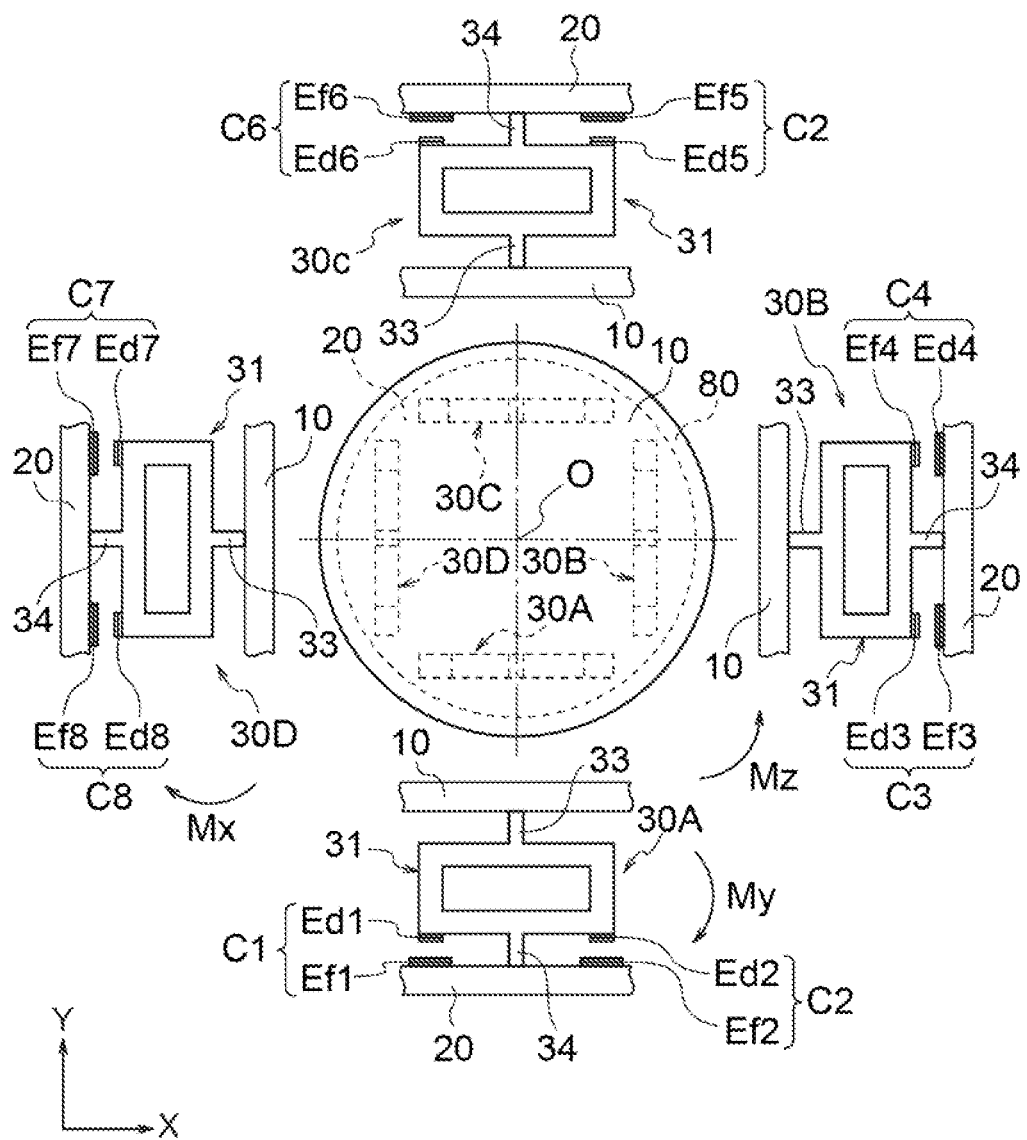
FIG. 5 is a view in which the strain body of the force sensor illustrated in FIG. 3 is developed in a plane.

The force sensor according to the embodiment of the present invention is described below with reference to FIGS. 2 to 5. FIG. 2 is a sectional view illustrating the force sensor in the first embodiment, and is a view corresponding to a section along the line A-A in FIG. 3. FIG. 3 is a plan view illustrating the force sensor in FIG. 2. FIG. 4 is a front view illustrating a strain body in FIG. 2. FIG. 5 is a view in which the strain body of the force sensor illustrated in FIG. 3 is developed in a plane.

The following description is given in a situation where an XYZ three-dimensional coordinate system is defined, a Z-axis direction (corresponding to first direction) is a vertical direction, and the force sensor 1 is disposed in such a way that a force receiving body 10 is disposed on an upper side and a support body 20 is disposed on a lower side. Thus, the force sensor 1 in the present embodiment is not exclusively used in a posture with the Z-axis direction as a vertical direction. The force receiving body 10 and the support body 20 may be disposed on either the upper side or the lower side, respectively.

The force sensor 1 has a function of outputting, as an electric signal, force acting in a predetermined axial direction and moment (or torque) acting around a predetermined rotation axis. However, without being limited thereto, the force sensor 1 may be configured to output either one of the force and moment as an electric signal, and may be further configured to output an axis component of at least one of the force and moment as an electric signal.

As Illustrated in FIGS. 2 and 3, the force sensor 1 includes the force receiving body 10, the support body 20, strain bodies 30A to 30D, a detection element 50, a detection circuit 60, and an exterior body 80. Each component is described in more detail below.

The force receiving body 10 receives action of force or moment to be targeted for detection. By receiving the action, the force receiving body 10 moves relative to the support body 20. In the case of the example of FIG. 1 described above, the force receiving body 10 is fixed to the end effector 1200 by a bolt or the like, and receives force or moment from the end effector 1200. The strain bodies 30A to 30D are connected to the force receiving body 10.

As illustrated in FIG. 3, in the present embodiment, the planar shape of the force receiving body 10 is circular. The force receiving body 10 may be formed into a flat-plate shape.

As illustrated in FIG. 2, the support body 20 supports the force receiving body 10. The support body 20 is disposed on a negative side of the force receiving body 10 in the Z-axis direction. The force receiving body 10 and the support body 20 are disposed at positions different from each other in the Z-axis direction, and the support body 20 is apart from the force receiving body 10. In the case of the example of FIG. 1, the support body 20 is fixed to the tip of the robot main body 1100 (or arm portion) by a bolt or the like, and supported by the robot main body 1100. The strain bodies 30A to 30D are connected to the support body 20.

As illustrated in FIG. 3, in the present embodiment, the planar shape of the support body 20 is circular, as in the force receiving body 10. The support body 20 may be formed into a flat-plate shape. It should be noted that at least one of the planar shape of the force receiving body 10 and the planar shape of the support body 20 may be circular. In this case, one of the planar shape of the force receiving body 10 and the planar shape of the support body 20 may be circular, and the other may have a shape other than a circular shape.

As illustrated in FIGS. 2 and 3, the strain bodies 30A to 30D connect the force receiving body 10 and the support body 20. More specifically, the strain bodies 30A to 30D are disposed between the force receiving body 10 and the support body 20, and are connected to the force receiving body 10 and also connected to the support body 20. The force receiving body 10 is supported by the support body 20 via the strain bodies 30A to 30D.

In the present embodiment, the force receiving body 10 and the support body 20 are connected to each other by the four strain bodies 30A to 30D. The four strain bodies 30A to 30D include a first strain body 30A, a second strain body 30B, a third strain body 30C, and a fourth strain body 30D. As illustrated in FIG. 3, when viewed in the Z-axis direction, the first strain body 30A is disposed on a negative side in a Y-axis direction relative to a center O of the force receiving body 10. Similarly, when viewed in the Z-axis direction, the second strain body 30B is disposed on a positive side in an X-axis direction relative to the center O of the force receiving body 10, and the third strain body 30C is disposed on a positive side in the Y-axis direction relative to the center O of the force receiving body 10. The fourth strain body 30D is disposed on the negative side in the X-axis direction relative to the center O of the force receiving body 10. In other words, the center O of the force receiving body 10 is disposed between the first strain body 30A and the third strain body 30C, and the center O of the force receiving body 10 is disposed between the second strain body 30B and the fourth strain body 30D. It should be noted that the number of strain bodies connecting the force receiving body 10 and the support body 20 is not limited to four but may be two or three, may be five or more, and may be any number. The force receiving body 10 and the support body 20 may be connected by only one strain body. In this case, if the detection element 50 comprises two capacitive elements as illustrated in FIG. 4A, two axis components of force can be detected. The detection element 50 may comprise only one capacitive element, and detect one axis component of force.

As illustrated in FIG. 3, tilting structures 31 (described later) of the four strain bodies 30A to 30D according to the present embodiment are annularly disposed. Specifically, as described above, the force receiving body 10 and the support body 20 are formed with a circular shape when viewed in the Z-axis direction, and the four strain bodies 30A to 30D are disposed so that the tilting structures 31 form a rectangular annular shape. The tilting structure 31 of each of the strain bodies 30A to 30D is linearly formed along a second direction when viewed in the Z-axis direction. Specifically, the second direction of the first strain body 30A and the second direction of the third strain body 30C correspond to the X-axis direction. The tilting structure 31 of the first strain body 30A and the tilting structure 31 of the third strain body 30C are linearly formed along the X-axis direction. The second direction of the second strain body 30B and the second direction of the fourth strain body 30D correspond to the Y-axis direction. The tilting structure 31 of the second strain body 30B and the tilting structure 31 of the fourth strain body 30D are linearly formed along the Y-axis direction. It should be noted that the four strain bodies 30A to 30D are not exclusively annularly disposed, and may be each disposed at any position irregularly.

Next, the strain bodies 30A to 30D according to the present embodiment are more specifically described. The strain bodies 30A to 30D according to the present embodiment are configured to produce strain and cause displacement by being elastically deformed by the action of force or moment received by the force receiving body 10. Here, the first strain body 30A with the X-axis direction as the second direction is described by way of example among the four strain bodies 30A to 30D described above. The second strain body 30B, the third strain body 30C, and the fourth strain body 30D have similar structures, for which detailed description is therefore omitted here.

As illustrated in FIGS. 2 and 4, the first strain body 30A includes the tilting structure 31 disposed between the force receiving body 10 and the support body 20, a force-receiving-body-side deformable body 33 connecting the force receiving body 10 and the tilting structure 31, and a support-body-side deformable body 34 connecting the tilting structure 31 and the support body 20.

The tilting structure 31 includes a first tilting body 35 that is disposed in a plane (corresponding to XZ plane) including the Z-axis direction and the X-axis direction (corresponding to the second direction of the first strain body 30A) orthogonal to the Z-axis direction and that extends in a direction different from the Z-axis direction. The first tilting body 35 according to the present embodiment extends in the X-axis direction (corresponding to the second direction of the first strain body 30A). The first tilting body 35 is disposed between the force receiving body 10 and the support body 20, and is apart from the force receiving body 10 and also apart from the support body 20. In the present embodiment, the first tilting body 35 extends in the X-axis direction. More specifically, as illustrated in FIG. 4, the first tilting body 35 linearly extends in the X-axis direction from one end 35a of the first tilting body 35 to the other end 35b, and a central portion 35c of the first tilting body 35 in the X-axis direction is located at the same position in the Z-axis direction as both the ends 35a and 35b. The entire surface of the first tilting body 35 on the side of the force receiving body 10 is formed into a flat shape.

In the present embodiment, as illustrated in FIGS. 2 and 4, the tilting structure 31 further includes a second tilting body 36 disposed between the first tilting body 35 and the support body 20, and a pair of connecting bodies 37 and 38 connecting the first tilting body 35 and the second tilting body 36.

The tilting structure 31 includes the second tilting body 36 that is disposed in the plane (corresponding to XZ plane) including the Z-axis direction and the X-axis direction (corresponding to the second direction of the first strain body 30A) orthogonal to the Z-axis direction and that extends in a direction different from the Z-axis direction. The second tilting body 36 according to the present embodiment extends in the X-axis direction. The second tilting body 36 is apart from the first tilting body 35 and also apart from the support body 20 in the Z-axis direction. In the present embodiment, the second tilting body 36 extends in the X-axis direction. More specifically, as illustrated in FIG. 4, the second tilting body 36 linearly extends in the X-axis direction from one end 36a of the second tilting body 36 to the other end 36b, and a central portion 36c of the second tilting body 36 in the X-axis direction is located at the same position in the Z-axis direction as both the ends 36a and 36b. The entire surface of the second tilting body 36 on the side of the force receiving body 10 is formed into a flat shape.

The pair of connecting bodies 37 and 38 connect either one of the both ends 35a and 35b of the first tilting body 35 in the X-axis direction and a corresponding one of the both ends 36a and 36b of the second tilting body 36 in the X-axis direction. More specifically, as illustrated in FIG. 4, the connecting body 37 disposed on the negative side in the X-axis direction connects the end 35a of the first tilting body 35 on the negative side in the X-axis direction and the end 36a of the second tilting body 36 on the negative side in the X-axis direction. The connecting body 38 disposed on the positive side in the X-axis direction connects the end 35b of the first tilting body 35 on the positive side in the X-axis direction and the end 36b of the second tilting body 36 on the positive side in the X-axis direction. Each of the connecting bodies 37 and 38 extends in the Z-axis direction.

Thus, the tilting structure 31 according to the present embodiment is formed into a rectangular frame shape as illustrated in FIG. 4 when viewed in the Y-axis direction (corresponding to a direction orthogonal to the Z-axis direction and the X-axis direction).

The first tilting body 35 is elastically deformable by the action of force in the Z-axis direction. The second tilting body 36 is elastically deformable by the action of force in the Z-axis direction. The spring constant of the first tilting body 35 relative to force acting in the Z-axis direction may be equal to the spring constant of the second tilting body 36 relative to force acting in the Z-axis direction. The spring constant can be adjusted mainly by the dimension of a member in the Z-axis direction, or the type of material to be used. For example, the spring constant may be adjusted as in a first modification illustrated in FIG. 11 described later.

The force-receiving-body-side deformable body 33 extends in the Z-axis direction, and is connected to the first tilting body 35 of the tilting structure 31. More specifically, the force-receiving-body-side deformable body 33 has an upper end connected to the force receiving body 10, and a lower end connected to the first tilting body 35. Thus, the force receiving body 10 and the first tilting body 35 are connected by one force-receiving-body-side deformable body 33. In the present embodiment, the force-receiving-body-side deformable body 33 is located between both the ends 35a and 35b of the first tilting body 35 in the X-axis direction. Specifically, the force-receiving-body-side deformable body 33 is located between the pair of connecting bodies 37 and 38. More specifically, the force-receiving-body-side deformable body 33 is located in the center of the first tilting body 35 in the X-axis direction, and is connected to the central portion 35c of the first tilting body 35.

The support-body-side deformable body 34 extends in the Z-axis direction, and is connected to the second tilting body 36 of the tilting structure 31. More specifically, the support-body-side deformable body 34 has a lower end connected to the support body 20 and an upper end connected to the second tilting body 36. Thus, the support body 20 and the second tilting body 36 are connected by one support-body-side deformable body 34. In the present embodiment, the support-body-side deformable body 34 is located between both the ends 36a and 36b of the second tilting body 36 in the X-axis direction. Specifically, the support-body-side deformable body 34 is located between the pair of connecting bodies 37 and 38. More specifically, the support-body-side deformable body 34 is located in the center of the second tilting body 36 in the X-axis direction, and is connected to the central portion 36c of the second tilting body 36.

The force-receiving-body-side deformable body 33 and the support-body-side deformable body 34 are disposed at positions overlapping each other when viewed in the Z-axis direction. Specifically, the force-receiving-body-side deformable body 33 and the support-body-side deformable body 34 are disposed at the same position in the X-axis direction. In the present embodiment, the force-receiving-body-side deformable body 33 and the support-body-side deformable body 34 are disposed in the center of the tilting structure 31 in the X-axis direction. Thus, the tilting structure 31 is formed symmetrically with respect to the force-receiving-body-side deformable body 33 and the support-body-side deformable body 34 in the X-axis direction.

The force-receiving-body-side deformable body 33 is elastically deformable by the action of force or moment received by the force receiving body 10. The force-receiving-body-side deformable body 33 may be elastically deformable mainly in response to force acting in the X-axis direction. The spring constant of the force-receiving-body-side deformable body 33 relative to force acting in the X-axis direction may be lower than the spring constant of the connecting bodies 37 and 38 relative to force acting in the X-axis direction.

The support-body-side deformable body 34 is elastically deformable by the action of force or moment received by the force receiving body 10. The support-body-side deformable body 34 may be elastically deformable mainly in response to force acting in the X-axis direction. The spring constant of the support-body-side deformable body 34 relative to force acting in the X-axis direction may be lower than the spring constant of the connecting bodies 37 and 38 relative to force acting in the X-axis direction. The spring constant of the support-body-side deformable body 34 relative to force acting in the X-axis direction may be equal to the spring constant of the force-receiving-body-side deformable body 33 relative to force acting in the X-axis direction.

The first strain body 30A configured as above may be formed by machining from a plate material manufactured by a metal material such as an aluminum alloy or an iron alloy or the like, or may be formed by casting. When formed by machining, the tilting structure 31, the force-receiving-body-side deformable body 33, and the support-body-side deformable body 34 are formed into a plate shape in such a way that the Y-axis direction is a thickness direction, and are integrally formed from a continuous plate material. This enables the first strain body 30A to be easily manufactured. The first strain body 30A formed as above may be fixed to each of the force receiving body 10 and the support body 20 by a bolt, adhesive, or the like. Alternatively, the force receiving body 10, the support body 20, and the strain bodies 30A to 30D may be integrally formed from a continuous block material by machining (e.g., cutting), or may be formed by casting.

The detection element 50 is configured to detect displacement caused by elastic deformation produced in the first strain body 30A described above. The detection element 50 according to the present embodiment is configured as an element that detects capacitance. As illustrated in FIG. 4, the detection element 50 includes a fixed electrode substrate provided on the support body 20 or the force receiving body 10, and a displacement electrode substrate provided on the tilting structure 31. In the example illustrated in FIG. 4, the detection element 50 includes two fixed electrode substrates Ef1 and Ef2 and two displacement electrode substrates Ed1 and Ed2, as electrodes for the first strain body 30A.

The two fixed electrode substrates Ef1 and Ef2 include a first fixed electrode substrate Ef1 disposed on the negative side in the X-axis direction and a second fixed electrode substrate Ef2 disposed on the positive side in the X-axis direction. In the present embodiment, the fixed electrode substrates Ef1 and Ef2 are provided on the surface of the support body 20 on the side of the force receiving body 10. The fixed electrode substrates Ef1 and Ef2 may be joined to the surface of the support body 20 on the side of the force receiving body 10 by adhesive, or may be fixed thereto by a bolt or the like. The fixed electrode substrates Ef1 and Ef2 each include a fixed electrode Ef facing the corresponding displacement electrode substrates Ed1 and Ed2 and an insulator IBf (see FIG. 4) interposed between the fixed electrode Ef and the support body 20. It should be noted that the fixed electrode substrates Ef1 and Ef2 may be provided on the surface of the force receiving body 10 on the side of the support body 20.

The two displacement electrode substrates Ed1 and Ed2 include a first displacement electrode substrate Ed1 disposed on the negative side in the X-axis direction and a second displacement electrode substrate Ed2 disposed on the positive side in the X-axis direction. In the present embodiment, the displacement electrode substrates Ed1 and Ed2 are provided on the surface of the second tilting body 36 of the tilting structure 31 on the side of the support body 20. The displacement electrode substrates Ed1 and Ed2 may be joined to the surface of the second tilting body 36 on the side of the support body 20 by adhesive, or may be fixed thereto by a bolt or the like. The displacement electrode substrates Ed1 and Ed2 each include a displacement electrode Ed facing the corresponding fixed electrode substrates Ef1 and Ef2 and an insulator IBd (see FIG. 4) interposed between the displacement electrode Ed and the second tilting body 36. It should be noted that when the fixed electrode substrates Ef1 and Ef2 are provided on the surface of the force receiving body 10 on the side of the support body 20, the displacement electrode substrates Ed1 and Ed2 may be provided on the surface of the first tilting body 35 of the tilting structure 31 on the side of the force receiving body 10.

The first fixed electrode substrate Ef1 faces the first displacement electrode substrate Ed1, and the second fixed electrode substrate Ef2 faces the second displacement electrode substrate Ed2. A first capacitative element C1 is constituted of the first fixed electrode substrate Ef1 and the first displacement electrode substrate Ed1, and a second capacitative element C2 is constituted of the second fixed electrode substrate Ef2 and the second displacement electrode substrate Ed2. The first capacitative element C1 and the second capacitative element C2 are configured as the detection element 50 for the first strain body 30A.

The first displacement electrode substrate Ed1 and the second displacement electrode substrate Ed2 are disposed at positions different from each other in the X-axis direction. In the present embodiment, the first displacement electrode substrate Ed1 is disposed on the negative side in the X-axis direction with respect to the support-body-side deformable body 34, and the second displacement electrode substrate Ed2 is disposed on the positive side in the X-axis direction with respect to the support-body-side deformable body 34. When the dimension of the tilting structure 31 (or the second tilting body 36) in the X-axis direction is L, the displacement electrode substrates Ed1 and Ed2 may be disposed within a range of L/4 or more and L/2 or less from the center of the tilting structure 31 in the X-axis direction.

In the present embodiment, the displacement electrode substrates Ed1 and Ed2 are disposed at both ends of the tilting structure 31 in the X-axis direction. More specifically, the first displacement electrode substrate Ed1 is disposed at the end 36a on the negative side in the X-axis direction of the second tilting body 36, and the second displacement electrode substrate Ed2 is disposed at the end 36b on the positive side in the X-axis direction of the second tilting body 36 of the tilting structure 31.

The first fixed electrode substrate Ef1 is disposed at the position facing the first displacement electrode substrate Ed1, and is disposed below the first displacement electrode substrate Ed1. The second fixed electrode substrate Ef2 is disposed at the position facing the second displacement electrode substrate Ed2, and is disposed below the second displacement electrode substrate Ed2.

The first capacitive element C1 and the second capacitive element C2 are disposed at the same position in the Y-axis direction. Specifically, the first displacement electrode substrate Ed1 and the second displacement electrode substrate Ed2 are disposed at the same position in the Y-axis direction, and the first fixed electrode substrate Ef1 and the second fixed electrode substrate Ef2 are also disposed at the same position in the Y-axis direction.

In the present embodiment, the planar shapes of the fixed electrode substrates Ef1 and Ef2 are rectangular. The planar shapes of the displacement electrode substrates Ed1 and Ed2 are also rectangular. However, the planar shapes of the fixed electrode substrates Ef1 and Ef2 and the displacement electrode substrates Ed1 and Ed2 are not exclusively rectangular, and may be any other shape, such as a circular, polygonal, or elliptical shape.

When viewed in the Z-axis direction, the first fixed electrode substrate Ef1 may be larger than the first displacement electrode substrate Ed1. For example, the planar shape of the first fixed electrode substrate Ef1 may be larger than the planar shape of the first displacement electrode substrate Ed1. The first displacement electrode substrate Ed1 may overlap the first fixed electrode substrate Ef1 as a whole when viewed in the Z-axis direction even when the first displacement electrode substrate Ed1 is displaced in the X-axis direction, the Y-axis direction, or the Z-axis direction. In other words, the size of the displacement electrode Ed and the size of the fixed electrode Ef may be set so that the displacement electrode Ed and the fixed electrode Ef constituting the first capacitive element C1 overlap even when the first displacement electrode substrate Ed1 is displaced in the X-axis direction, the Y-axis direction, and the Z-axis direction. Thus, even when the first displacement electrode substrate Ed1 is displaced, changing of the facing area of the displacement electrode Ed and the fixed electrode Ef can be prevented, and an influence of a change in the facing area on a change in capacitance value can also be prevented. Thus, a capacitance value can be changed in accordance with a change in the distance between the displacement electrode Ed and the fixed electrode Ef. Here, the facing area refers to an area in which the displacement electrode Ed and the fixed electrode Ef overlap when viewed in the Z-axis direction. When the tilting structure 31 is tilted, the displacement electrode Ed smaller than the fixed electrode Ef inclines, and the facing area can vary, but the tilting angle of the displacement electrode Ed in this case is small. As a result, the distance between the displacement electrode Ed and the fixed electrode Ef dominates a change in capacitance value. Thus, in the present specification, variation of the facing area due to the inclination of the displacement electrode Ed is not considered, and a change in capacitance value is considered to be attributed to a change in the distance between the displacement electrode Ed and the fixed electrode Ef. It should be noted that in FIG. 6 and others described later, inclination of the tilting structure 31 is exaggerated for clarity of the drawing. The planar shape of the first fixed electrode substrate Ef1 is not exclusively larger than the planar shape of the first displacement electrode substrate Ed1, and the planar shape of the first displacement electrode substrate Ed1 may be larger than the planar shape of the first fixed electrode substrate Ef1.

Similarly, the planar shape of the second fixed electrode substrate Ef2 may be larger than the planar shape of the second displacement electrode substrate Ed2 when viewed in the Z-axis direction. It should be noted that the planar shape of the second displacement electrode substrate Ed2 may be larger than the planar shape of the second fixed electrode substrate Ef2.

The planar shape of the fixed electrode Ef and the planar shape of the insulator IBf of each of the fixed electrode substrates Ef1 and Ef2 may have the same size. However, without being limited thereto, the planar shape of the fixed electrode Ef and the planar shape of the insulator IBf may have sizes different from each other. The same also applies to the planar shape of the displacement electrode Ed and the planar shape of the insulator IBd of each of the displacement electrode substrates Ed1 and Ed2.

The first fixed electrode substrate Ef1 and the second fixed electrode substrate Ef2 may be separately formed and apart from each other as illustrated in FIG. 4. However, without being limited thereto, the first fixed electrode substrate Ef1 and the second fixed electrode substrate Ef2 may be integrated and configured by one common fixed electrode substrate. Alternatively, when the first fixed electrode substrate Ef1 and the second fixed electrode substrate Ef2 are separately formed, the first displacement electrode substrate Ed1 and the second displacement electrode substrate Ed2 may be integrated and configured by one common displacement electrode substrate.

The configurations of the first strain body 30A and the corresponding detection element 50 described above are also applicable to the second strain body 30B, the third strain body 30C, and the fourth strain body 30D.

Specifically, as illustrated in FIG. 5, the detection element 50 further includes, as electrodes for the second strain body 30B, two fixed electrode substrates Ef3 and Ef4 provided on the support body 20, and two displacement electrode substrates Ed3 and Ed4 provided on the second tilting body 36 of the tilting structure 31. The two fixed electrode substrates Ef3 and Ef4 include a third fixed electrode substrate Ef3 and a fourth fixed electrode substrate Ef4. The two displacement electrode substrates Ed3 and Ed4 include a third displacement electrode substrate Ed3 and a fourth displacement electrode substrate Ed4. The third fixed electrode substrate Ef3 faces the third displacement electrode substrate Ed3, and the fourth fixed electrode substrate Ef4 faces the fourth displacement electrode substrate Ed4. A third capacitive element C3 is constituted of the third fixed electrode substrate Ef3 and the third displacement electrode substrate Ed3, and a fourth capacitive element C4 is constituted of the fourth fixed electrode substrate Ef4 and the fourth displacement electrode substrate Ed4.

The third displacement electrode substrate Ed3 and the third fixed electrode substrate Ef3 are disposed on the negative side in the Y-axis direction with respect to the support-body-side deformable body 34. The fourth displacement electrode substrate Ed4 and the fourth fixed electrode substrate Ef4 are disposed on the positive side in the Y-axis direction with respect to the support-body-side deformable body 34. The third capacitative element C3 and the fourth capacitative element C4 are disposed at the same position in the X-axis direction. The fixed electrode substrates Ef3 and Ef4 have a configuration similar to that of the fixed electrode substrates Ef1 and Ef2 described above. The displacement electrode substrates Ed3 and Ed4 have a configuration similar to that of the displacement electrode substrates Ed1 and Ed2 described above.

The detection element 50 further includes, as electrodes for the third strain body 30C, two fixed electrode substrates Ef5 and Ef6 provided on the support body 20, and two displacement electrode substrates Ed5 and Ed6 provided on the second tilting body 36 of the tilting structure 31. The two fixed electrode substrates Ef5 and Ef6 include a fifth fixed electrode substrate Ef5 and a sixth fixed electrode substrate Ef6. The two displacement electrode substrates Ed5 and Ed6 include a fifth displacement electrode substrate Ed5 and a sixth displacement electrode substrate Ed6. The fifth fixed electrode substrate Ef5 faces the fifth displacement electrode substrate Ed5, and the sixth fixed electrode substrate Ef6 faces the sixth displacement electrode substrate Ed6. A fifth capacitative element C5 is constituted of the fifth fixed electrode substrate Ef5 and the fifth displacement electrode substrate Ed5, and a sixth capacitative element C6 is constituted of the sixth fixed electrode substrate Ef6 and the sixth displacement electrode substrate Ed6.

The fifth displacement electrode substrate Ed5 and the fifth fixed electrode substrate Ef5 are disposed on the positive side in the X-axis direction with respect to the support-body-side deformable body 34. The sixth displacement electrode substrate Ed6 and the sixth fixed electrode substrate Ef6 are disposed on the negative side in the X-axis direction with respect to the support-body-side deformable body 34. The fifth capacitative element C5 and the sixth capacitative element C6 are disposed at the same position in the Y-axis direction. The fixed electrode substrates Ef5 and Ef6 have a configuration similar to that of the fixed electrode substrates Ef1 and Ef2 described above. The displacement electrode substrates Ed5 and Ed6 have a configuration similar to that of the displacement electrode substrates Ed1 and Ed2 described above.

The detection element 50 further includes, as electrodes for the fourth strain body 30D, two fixed electrode substrates Ef7 and Ef8 provided on the support body 20, and two displacement electrode substrates Ed7 and Ed8 provided on the second tilting body 36 of the tilting structure 31. The two fixed electrode substrates Ef7 and Ef8 include a seventh fixed electrode substrate Ef7 and an eighth fixed electrode substrate Ef8. The two displacement electrode substrates Ed7 and Ed8 include a seventh displacement electrode substrate Ed7 and an eighth displacement electrode substrate Ed8. The seventh fixed electrode substrate Ef7 faces the seventh displacement electrode substrate Ed7, and the eighth fixed electrode substrate Ef8 faces the eighth displacement electrode substrate Ed8. A seventh capacitative element C7 is constituted of the seventh fixed electrode substrate Ef7 and the seventh displacement electrode substrate Ed7, and an eighth capacitative element C8 is constituted of the eighth fixed electrode substrate Ef8 and the eighth displacement electrode substrate Ed8.

The seventh displacement electrode substrate Ed7 and the seventh fixed electrode substrate Ef7 are disposed on the positive side in the Y-axis direction with respect to the support-body-side deformable body 34. The eighth displacement electrode substrate Ed8 and the eighth fixed electrode substrate Ef8 are disposed on the negative side in the Y-axis direction with respect to the support-body-side deformable body 34. The seventh capacitative element C7 and the eighth capacitative element C8 are disposed at the same position in the X-axis direction. The fixed electrode substrates Ef7 and Ef8 have a configuration similar to that of the fixed electrode substrates Ef1 and Ef2 described above. The displacement electrode substrates Ed7 and Ed8 have a configuration similar to that of the displacement electrode substrates Ed1 and Ed2 described above.

Each of the fixed electrode substrates Ef1 to Ef8 described above may be a ceramic substrate, glass epoxy substrate, or FPC board (or flexible printed circuit board) in which electrode materials are stacked. The FPC board is a flexible printed circuit board formed into a thin film shape, and may be wholly joined to the support body 20. Each of the fixed electrode substrates Ef1 to Ef8 may be bonded to the support body 20 by adhesive. The same also applies to each of the displacement electrode substrates Ed1 to Ed8. Each of the displacement electrode substrates Ed1 to Ed8 may be bonded to the second tilting body 36 by adhesive.

It should be noted that the detection element 50 is not exclusively configured as a capacitative element that detects capacitance. For example, the detection element 50 may be constituted by a strain gauge that detects strain produced by the action of force or moment received by the force receiving body 10. The detection element 50 may be constituted by a piezoelectric element that generates a charge when strain is produced. Moreover, the detection element 50 may be constituted by an optical sensor that detects displacement by utilizing reflection of light, a sensor that detects displacement by utilizing eddy current, or a sensor that detects displacement by utilizing Hall effect. Particularly, the optical sensor that utilizes reflection of light, the sensor that utilizes eddy current, and the sensor that utilizes Hall effect are similar to a detection principle of capacitance, and can therefore easily replace a capacitative element that detects capacitance. An example in which the detection element 50 is constituted by a strain gauge will be described later.

As illustrated in FIG. 2, the detection circuit 60 outputs an electric signal indicating force or moment acting on the strain bodies 30A to 30D on the basis of a detection result by the detection element 50. The detection circuit 60 may have a calculation function constituted by, for example, a microprocessor. The detection circuit 60 may also have an A/D conversion function of converting an analog signal received from the detection element 50 described above into a digital signal, or a function of amplifying a signal. The detection circuit 60 may include a terminal that outputs an electric signal which is transmitted to the controller 1400 described above from the terminal via the electric cable 1300 (see FIG. 1).

As illustrated in FIGS. 2 and 3, the exterior body 80 is configured to cover the four strain bodies 30A to 30D from the outside when viewed in the Z-axis direction. The exterior body 80 is a cylindrical housing that configures the force sensor 1. The strain bodies 30A to 30D are housed in the exterior body 80. In the present embodiment, the planar sectional shape (corresponding to a shape in a section along an XY plane) of the exterior body 80 is a circular frame shape.

As illustrated in FIG. 2, the exterior body 80 is fixed to the support body 20, and is apart from the force receiving body 10. The force receiving body 10 is disposed in one opening (corresponding to an upper opening in FIG. 2) of the exterior body 80, and the support body 20 is disposed in the other opening (corresponding to a lower opening in FIG. 2).

More specifically, the support body 20 is fixed to the exterior body 80 in such a way as to close the lower opening of the exterior body 80. The exterior body 80 may be manufactured integrally with the support body 20. On the other hand, a gap is provided between the force receiving body 10 and the exterior body 80, and the force receiving body 10 is displaceable in response to the action of force or moment received from the end effector 1200. It should be noted that a cushioning material 81 may be interposed in the gap between the force receiving body 10 and the exterior body 80 in order to ensure waterproofness and dustproofness. The cushioning material 81 may be formed of an elastically deformable soft material such as rubber or a sponge. It should be noted that the exterior body 80 may be manufactured integrally not with the support body 20 but with the force receiving body 10. In this case, a gap may be provided between the exterior body 80 and the support body 20. Alternatively, a part of the exterior body 80 on the side of the force receiving body 10 may be manufactured integrally with the force receiving body 10, and a part of the exterior body 80 on the side of the support body 20 may be manufactured integrally with the support body 20. In this case, the exterior body 80 is configured separately into a part on the side of the force receiving body 10 and a part on the side of the support body 20. A gap may be provided between the part on the side of the force receiving body 10 and the part on the side of the support body 20.

Figure 6:
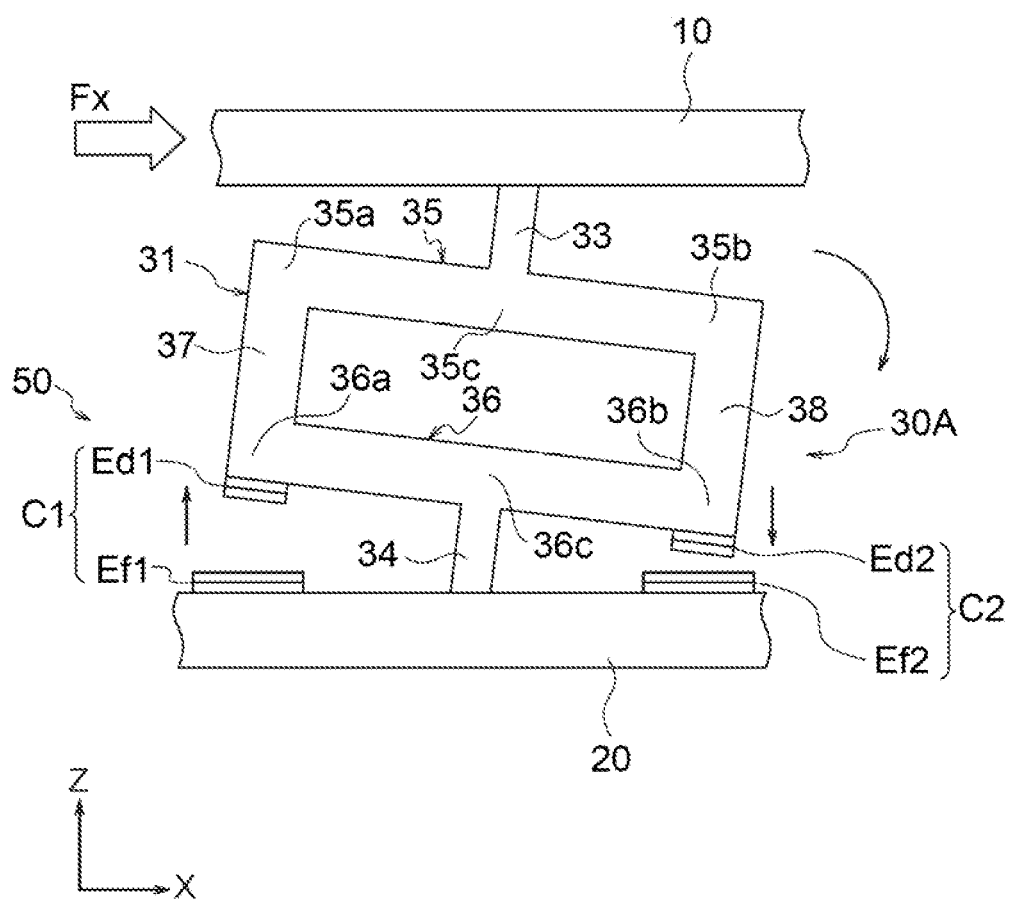
FIG. 6 is a front view schematically illustrating a deformation state of the strain body in FIG. 4 when receiving force on a positive side in an X-axis direction.
Figure 7A:
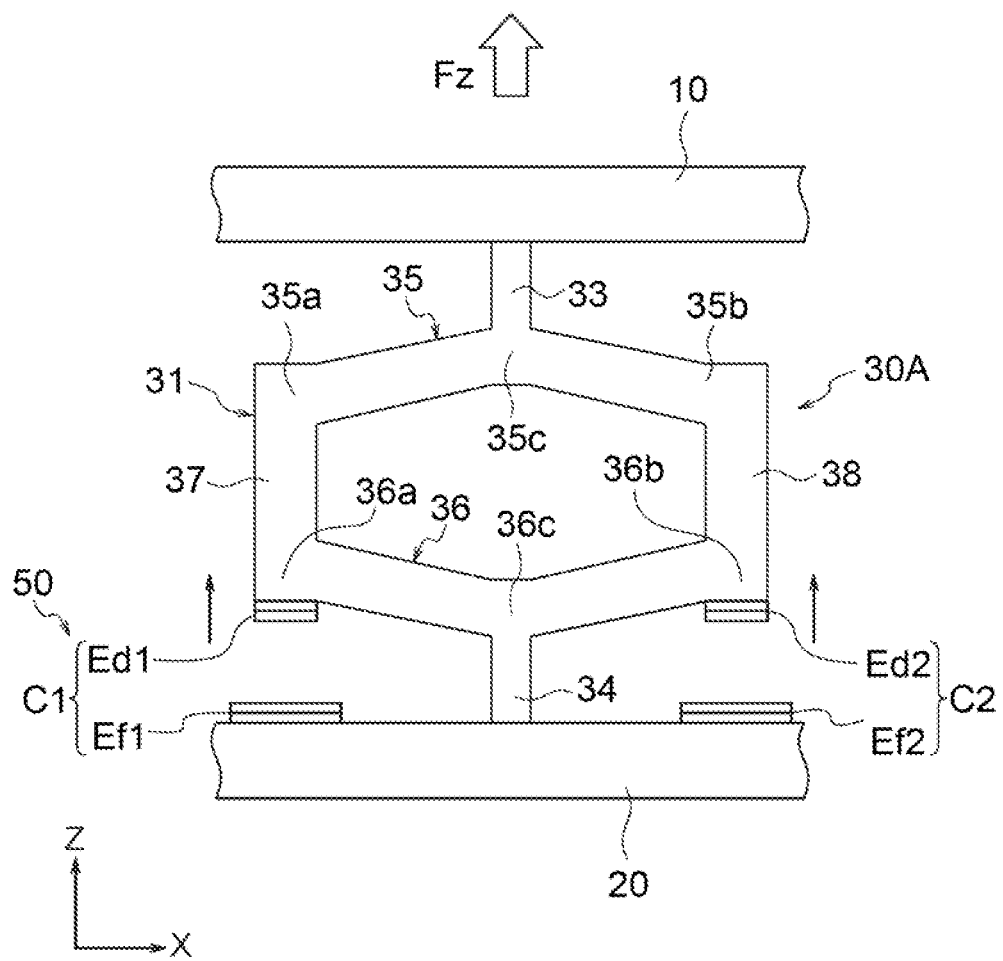
FIG. 7A is a front view schematically illustrating a deformation state of the strain body in FIG. 4 when receiving force on the positive side in a Z-axis direction.
Figure 7B:
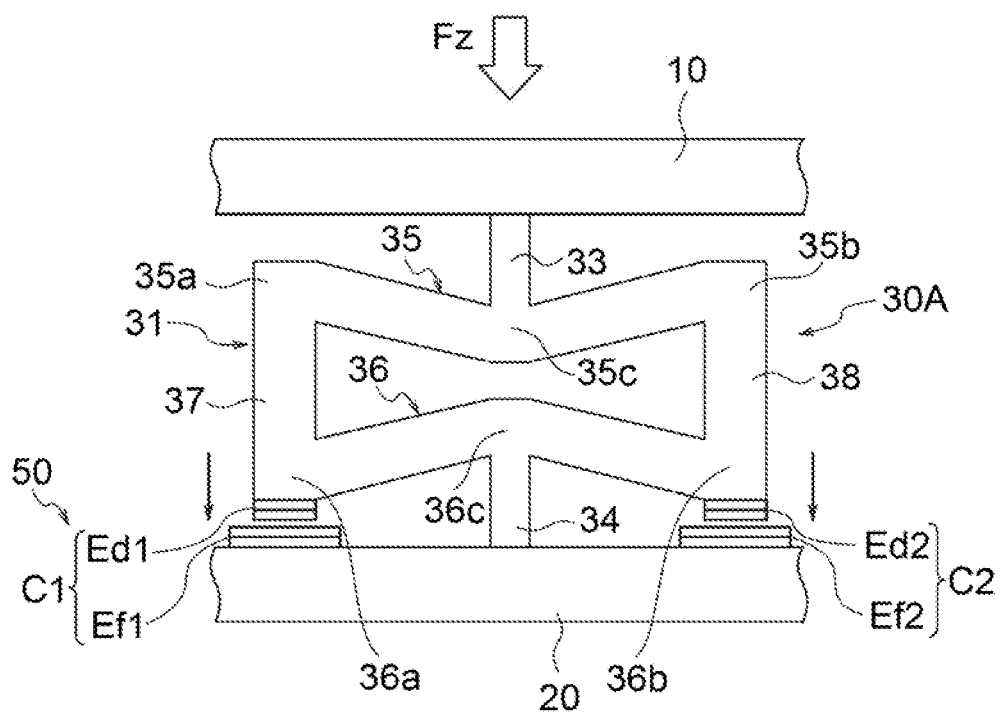
FIG. 7B is a front view schematically illustrating a deformation state of the strain body in FIG. 4 when receiving force on a negative side in the Z-axis direction.

Next, a method of detecting force or moment acting on the force sensor 1 in the present embodiment having such a configuration as above is described with reference to FIGS. 6 to 7B. FIG. 6 is a front view schematically illustrating a deformation state of the strain body in FIG. 4 when receiving force on the positive side in the X-axis direction. FIG. 7A is a front view schematically illustrating a deformation state of the strain body in FIG. 4 when receiving force on the positive side in the Z-axis direction. FIG. 7B is a front view schematically illustrating a deformation state of the strain body in FIG. 4 when receiving force on the negative side in the Z-axis direction.

When the force receiving body 10 receives the action of force or moment, the force or moment is transmitted to the first to fourth strain bodies 30A to 30D. More specifically, the force or moment is transmitted to the force-receiving-body-side deformable body 33, the tilting structure 31, and the support-body-side deformable body 34, and elastic deformation is produced in the force-receiving-body-side deformable body 33, the support-body-side deformable body 34, and the tilting structure 31. This causes displacement to the tilting structure 31. Thus, the distance between each of the fixed electrode substrates Ef1 to Ef8 and each of the corresponding displacement electrode substrates Ed1 to Ed8 of the detection element 50 changes, and the capacitance value of each of the capacitative elements C1 to C8 changes. The detection element 50 detects this change in capacitance value as displacement caused to the strain bodies 30A to 30D. In this case, the change in capacitance value of each of the capacitative elements C1 to C8 can be different. Thus, the detection circuit 60 can detect the direction and magnitude of the force or moment acting on the force receiving body 10, on the basis of the change in capacitance value of each of the capacitative elements C1 to C8 detected by the detection element 50.

Here, first, the first strain body 30A is taken for example to describe changes in capacitance value of the first capacitative element C1 and the second capacitative element C2, on which force Fx in the X-axis direction, force Fy in the Y-axis direction, and force Fz in the Z-axis direction act.

(When +FX acts)

When the force Fx acts on the first strain body 30A on the positive side in the X-axis direction, the force-receiving-body-side deformable body 33 and the support-body-side deformable body 34 of the first strain body 30A are elastically deformed in the X-axis direction as illustrated in FIG. 6. Since the tilting structure 31 according to the present embodiment is connected to the force receiving body 10 via one force-receiving-body-side deformable body 33 and also connected to the support body 20 via one support-body-side deformable body 34, the force-receiving-body-side deformable body 33 and the support-body-side deformable body 34 can be elastically deformed to about the same degree. Moreover, since the first tilting body 35 and the second tilting body 36 of the tilting structure 31 according to the present embodiment are connected via the two connecting bodies 37 and 38 extending in the Z-axis direction, the force-receiving-body-side deformable body 33 and the support-body-side deformable body 34 can be elastically deformed more than the connecting bodies 37 and 38. More specifically, the upper end of the force-receiving-body-side deformable body 33 is displaced to the positive side in the X-axis direction more than the lower end. Accordingly, the force-receiving-body-side deformable body 33 inclines relative to the Z-axis direction in such a way as to fall down to the positive side in the X-axis direction while being elastically deformed. Moreover, the upper end of the support-body-side deformable body 34 is displaced to the positive side in the X-axis direction more than the lower end. Accordingly, the support-body-side deformable body 34 inclines relative to the Z-axis direction in such a way as to fall down to the positive side in the X-axis direction while being elastically deformed. Thus, as illustrated in FIG. 6, the tilting structure 31 (including the first tilting body 35, the second tilting body 36, and the connecting bodies 37 and 38) can be tilted as a whole. In this case, the tilting structure 31 turns clockwise around the Y-axis when viewed toward the positive side in the Y-axis direction (when viewed toward the page surface of FIG. 6), and is tilted relative to the Z-axis direction. In this way, the force-receiving-body-side deformable body 33 and the support-body-side deformable body 34 of the first strain body 30A can be elastically deformed by the force Fx on the positive side in the X-axis direction. In the tilting structure 31, minute elastic deformation can be produced, but no such magnitude of elastic deformation as the elastic deformation of the force-receiving-body-side deformable body 33 and the support-body-side deformable body 34 is produced. In this case, the end 36a on the negative side in the X-axis direction of the second tilting body 36 rises, and the end 36b on the positive side in the X-axis direction lowers.

As illustrated in FIG. 6, when the tilting structure 31 of the first strain body 30A turns clockwise, the first displacement electrode substrate Ed1 moves away from the first fixed electrode substrate Ef1. Accordingly, the inter-electrode distance (corresponding to distance in the Z-axis direction) between the first displacement electrode substrate Ed1 and the first fixed electrode substrate Ef1 increases, and the capacitance value of the first capacitative element C1 decreases. On the other hand, the second displacement electrode substrate Ed2 moves closer to the second fixed electrode substrate Ef2. Accordingly, the inter-electrode distance between the second displacement electrode substrate Ed2 and the second fixed electrode substrate Ef2 decreases, and the capacitance value of the second capacitative element C2 increases.

(When −Fx Acts)

Although not illustrated, a phenomenon opposite to the case illustrated in FIG. 6 occurs when the force Fx acts on the first strain body 30A on the negative side in the X-axis direction. Specifically, the capacitance value of the first capacitative element C1 increases, and the capacitance value of the second capacitative element C2 decreases.

(When +Fy Acts)

When the force Fy acts on the first strain body 30A on the positive side in the Y-axis direction (not illustrated), the first strain body 30A turns around the X-axis (corresponding to counterclockwise toward the positive side in the X-axis direction). Accordingly, the first strain body 30A is elastically deformed in such a way as to fall down to the positive side in the Y-axis direction and thus incline relative to the Z-axis direction. Thus, the first strain body 30A is elastically deformed in such a way as to bend in the thickness direction. However, as described above, the first capacitative element C1 and the second capacitative element C2 are disposed at the same position in the Y-axis direction. Thus, even though the first strain body 30A turns around the X-axis, the capacitance value increases in a region of the first capacitative element C1, and the capacitance value decreases in another region. Therefore, no change in capacitance value appears in the whole first capacitative element C1. Similarly, no change in capacitance value appears in the whole second capacitative element C2.

(When −Fy Acts)

When the force Fy acts on the first strain body 30A on the negative side in the Y-axis direction as well, no changes in capacitance value appear in the whole first capacitative element C1 and the whole second capacitative element C2.

(When +Fz Acts)

When the force Fz acts on the first strain body 30A on the positive side in the Z-axis direction, the first tilting body 35 and the second tilting body 36 of the tilting structure 31 are elastically deformed as illustrated in FIG. 7A. More specifically, while the first tilting body 35 is elastically deformed, the force-receiving-body-side deformable body 33 is pulled up to the positive side in the Z-axis direction. Accordingly, the first tilting body 35 is pulled up with the force-receiving-body-side deformable body 33 in the central portion 35c of the first tilting body 35 in the X-axis direction as illustrated in FIG. 7A. In this instance, while the first tilting body 35 is elastically deformed in such a way as to project upward (e.g., in an inverted V-shape manner), the connecting bodies 37 and 38 are pulled up to the positive side in the Z-axis direction. Thus, the second tilting body 36 is pulled up at both the ends 36a and 36b thereof in the X-axis direction as illustrated in FIG. 7A. In this instance, the second tilting body 36 is elastically deformed in such a way as to project downward (e.g., in a V-shape).

As illustrated in FIG. 7A, when the first tilting body 35 and the second tilting body 36 are elastically deformed, the first displacement electrode substrate Ed1 moves away from the first fixed electrode substrate Ef1. Thus, the capacitance value of the first capacitative element C1 decreases. Moreover, the second displacement electrode substrate Ed2 moves away from the second fixed electrode substrate Ef2. Thus, the capacitance value of the second capacitative element C2 decreases.

(When −Fz Acts)

When the force Fz acts on the first strain body 30A on the negative side in the Z-axis direction, the first tilting body 35 and the second tilting body 36 of the tilting structure 31 are elastically deformed as illustrated in FIG. 7B. More specifically, while the first tilting body 35 is elastically deformed, the force-receiving-body-side deformable body 33 is pulled down to the negative side in the Z-axis direction. Accordingly, the first tilting body 35 is pulled down by the force-receiving-body-side deformable body 33 in the central portion 35c of the first tilting body 35 in the X-axis direction as illustrated in FIG. 7B. In this instance, while the first tilting body 35 is elastically deformed in such a way as to project downward (e.g., a V-shape), the connecting bodies 37 and 38 are pulled down to the negative side in the Z-axis direction. Thus, the second tilting body 36 is pulled down at both the ends 36a and 36b thereof in the X-axis direction as illustrated in FIG. 7B. In this instance, the second tilting body 36 is elastically deformed in such a way as to project upward (e.g., an inverted V-shape).

As illustrated in FIG. 7B, when the first tilting body 35 and the second tilting body 36 are elastically deformed, the first displacement electrode substrate Ed1 moves closer to the first fixed electrode substrate Ef1. Thus, the capacitance value of the first capacitative element C1 increases. Moreover, the second displacement electrode substrate Ed2 moves closer to the second fixed electrode substrate Ef2. Thus, the capacitance value of the second capacitative element C2 increases.

Here, changes in capacitance value of each of the capacitative elements C1 and C2 provided on the first strain body 30A illustrated in FIG. 4 are shown in FIG. 8. FIG. 8 is a table showing changes in capacitance value of each of the capacitative elements C1 and C2 in the first strain body 30A in FIG. 4.

FIG. 8 illustrates changes in capacitance value of the capacitative elements C1 and C2 with regard to the force Fx in the X-axis direction, the force Fy in the Y-axis direction, and the force Fz in the Z-axis direction. In FIG. 8, the case where the capacitance value decreases is indicated by "− (minus)", and the case where the capacitance value increases is indicated by "+(plus)". For example, "−" is indicated for C1 of the row of Fx in the table illustrated in FIG. 8, which shows that the capacitance value of the first capacitative element C1 decreases when the force of +Fx acts as described above. On the other hand, "+" is indicated for C2 of the row of Fx in the table illustrated in FIG. 8, which shows that the capacitance value of the second capacitative element C2 increases when the force of +Fx acts as described above. In FIG. 8, the numerical value "0 (zero)" indicates that no changes in capacitance value of the capacitative elements C1 and C2 appear.

The forces Fx and Fz acting on the force receiving body 10 in the force sensor 1 in which the force receiving body 10 and the support body 20 are connected by only the first strain body 30A can be calculated from the table illustrated in FIG. 8 by the following equations. It should be noted that in the following equations, force or moment and a change amount of a capacitance value are connected by "=" for convenience. However, since force or moment and a capacitance value are physical quantities different from each other, force is actually calculated by converting a change amount of a capacitance value. C1 and C2 in the following equations each indicate a change amount of a capacitance value in each of the capacitative elements.

$$Fx = -C1 + C2 \quad \text{[Equation 1]}$$

$$Fz = -C1 - C2 \quad \text{[Equation 2]}$$

Next, changes in capacitance value of each of the capacitative elements C1 to C8 when the force Fx in the X-axis direction, the force Fy in the Y-axis direction, the force Fz in the Z-axis direction, moment Mx around the X-axis, moment My around the Y-axis, and moment Mz around the Z-axis act in the force sensor 1 illustrated in FIG. 5 are described with reference to FIGS. 9 and 10. FIG. 9 is a table illustrating changes in capacitance value of each capacitative element in the force sensor in FIG. 5. FIG. 10 is a table illustrating main-axis sensitivity and cross-axis sensitivity based on the changes in capacitance value in FIG. 9.

(When +Fx Acts)

First, the case where the force Fx acts on the force receiving body 10 on the positive side in the X-axis direction is described.

In this case, the first strain body 30A is elastically deformed in a manner similar to the first strain body 30A illustrated in FIG. 6, the capacitance value of the first capacitative element C1 decreases, and the capacitance value of the second capacitative element C2 increases. This is indicated as "– (minus)" in C1 and indicated as "+ (plus)" in C2 of the row of Fx in the table illustrated in FIG. 9.

The second strain body 30B turns around the Y-axis (corresponding to clockwise toward the positive side in the Y-axis direction). However, as described above, the third capacitative element C3 and the fourth capacitative element C4 are disposed at the same position in the X-axis direction. Thus, as in the first strain body 30A on which the force Fy in the Y-axis direction described above acts, no changes in capacitance value appear in the entire third capacitative element C3 and the entire fourth capacitative element C4. This is indicated as "0 (zero)" in C3 and C4 of the row of Fx in the table illustrated in FIG. 9.

The third strain body 30C is elastically deformed in a manner similar to the first strain body 30A illustrated in FIG. 6. Thus, the capacitance value of the fifth capacitative element C5 increases, and the capacitance value of the sixth capacitative element C6 decreases. This is indicated as "+" in C5 and indicated as "–" in C6 of the row of Fx in the table illustrated in FIG. 9.

The fourth strain body 30D turns around the Y-axis in a manner similar to the second strain body 30B. However, as described above, the seventh capacitative element C7 and the eighth capacitative element C8 are disposed at the same position in the X-axis direction. Thus, no changes in capacitance value appear in the entire seventh capacitative element C7 and the entire eighth capacitative element C8. This is indicated as "0 (zero)" in C7 and C8 of the row of Fx in the table illustrated in FIG. 9.

(When +Fy Acts)

Next, the case where the force Fy acts on the force receiving body 10 on the positive side in the Y-axis direction is described. In the following description as well, signs in the table in FIG. 9 are determined as described above depending on changes in capacitance value.

In this case, the first strain body 30A turns around the X-axis (corresponding to counterclockwise toward the positive side in the X-axis direction). However, as described above, the first capacitative element C1 and the second capacitative element C2 are disposed at the same position in the Y-axis direction. Thus, no changes in capacitance value appear in the entire first capacitative element C1 and the entire second capacitative element C2.

The second strain body 30B is elastically deformed in a manner similar to the first strain body 30A illustrated in FIG. 6, the capacitance value of the third capacitative element C3 decreases, and the capacitance value of the fourth capacitative element C4 increases.

The third strain body 30C turns around the X-axis in a manner similar to the first strain body 30A. However, the fifth capacitative element C5 and the sixth capacitative element C6 are disposed at the same position in the Y-axis direction. Thus, no changes in capacitance value appear in the entire fifth capacitative element C5 and the entire sixth capacitative element C6.

The fourth strain body 30D is elastically deformed in a manner similar to the first strain body 30A illustrated in FIG. 6, the capacitance value of the seventh capacitative element C7 increases, and the capacitance value of the eighth capacitative element C8 decreases.

(When +Fz Acts)

Next, the case where the force Fz acts on the force receiving body 10 on the positive side in the Z-axis direction is described. In the following description as well, signs in the table in FIG. 9 are determined as described above depending on changes in capacitance value.

In this case, each of the strain bodies 30A to 30D is elastically deformed in a manner similar to the first strain body 30A illustrated in FIG. 7A. Accordingly, the capacitance value of each of the capacitative elements C1 to C8 decreases.

(When +Mx Acts)

Next, the case where the moment Mx (see FIG. 5) around the X-axis (corresponding to clockwise toward the positive side in the X-axis direction) acts on the force receiving body 10 is described. In the following description as well, signs in the table in FIG. 9 are determined as described above depending on changes in capacitance value.

In this case, the first strain body 30A is elastically deformed in a manner similar to the first strain body 30A illustrated in FIG. 7B, the capacitance value of the first capacitative element C1 increases, and the capacitance value of the second capacitative element C2 increases.

The force-receiving-body-side deformable body 33 is located at the center O of the force receiving body 10 in the Y-axis direction in the second strain body 30B, and elastic deformation of the second strain body 30B is therefore smaller than elastic deformation of the first strain body 30A and the third strain body 30C. Here, for simplification of description, it is considered that the second strain body 30B is not elastically deformed. Thus, the capacitance value of the third capacitative element C3 does not change, and the capacitance value of the fourth capacitative element C4 does not change either.

The third strain body 30C is elastically deformed in a manner similar to the first strain body 30A illustrated in FIG. 7A, the capacitance value of the fifth capacitative element C5 decreases, and the capacitance value of the sixth capacitative element C6 decreases.

The force-receiving-body-side deformable body 33 is located at the center O of the force receiving body 10 in the Y-axis direction in the fourth strain body 30D, and elastic deformation of the fourth strain body 30D is therefore smaller than elastic deformation of the first strain body 30A and the third strain body 30C. Here, for simplification of description, it is considered that the fourth strain body 30D is not elastically deformed. Thus, the capacitance value of the seventh capacitative element C7 does not change, and the capacitance value of the eighth capacitative element C8 does not change either.

(When +My Acts)

Next, the case where the moment My (see FIG. 5) around the Y-axis (corresponding to clockwise toward the positive side in the Y-axis direction) acts on the force receiving body 10 is described. In the following description as well, signs in the table in FIG. 9 are determined as described above depending on changes in capacitance value.

In this case, the force-receiving-body-side deformable body 33 is located at the center O of the force receiving body 10 in the X-axis direction in the first strain body 30A, and elastic deformation of the first strain body 30A is therefore smaller than elastic deformation of the second strain body 30B and the fourth strain body 30D. Here, for simplification of description, it is considered that the first strain body 30A is not elastically deformed. Thus, the capacitance value of the first capacitative element C1 does not change, and the capacitance value of the second capacitative element C2 does not change either.

The second strain body 30B is elastically deformed in a manner similar to the first strain body 30A illustrated in FIG. 7B, the capacitance value of the third capacitative element C3 increases, and the capacitance value of the fourth capacitative element C4 increases.

The force-receiving-body-side deformable body 33 is located at the center O of the force receiving body 10 in the X-axis direction in the third strain body 30C, and elastic deformation of the third strain body 30C is therefore smaller than elastic deformation of the second strain body 30B and the fourth strain body 30D. Here, for simplification of description, it is considered that the third strain body 30C is not elastically deformed. Thus, the capacitance value of the fifth capacitative element C5 does not change, and the capacitance value of the sixth capacitative element C6 does not change either.

The fourth strain body 30D is elastically deformed in a manner similar to the first strain body 30A illustrated in FIG. 7A, the capacitance value of the seventh capacitative element C7 decreases, and the capacitance value of the eighth capacitative element C8 decreases.

(When +Mz Acts)

Next, the case where the moment Mz (see FIG. 5) around the Z-axis (corresponding to clockwise toward the positive side in the Z-axis direction) acts on the force receiving body 10 is described. In the following description as well, signs in the table in FIG. 9 are determined as described above depending on changes in capacitance value.

In this case, the first strain body 30A is elastically deformed as in the case where the force Fx on the positive side in the X-axis direction acts. Accordingly, the first strain body 30A is elastically deformed in a manner similar to the first strain body 30A illustrated in FIG. 6, the capacitance value of the first capacitative element C1 decreases, and the capacitance value of the second capacitative element C2 increases.

The second strain body 30B is elastically deformed as in the case where the force Fy on the positive side in the Y-axis direction acts. Accordingly, the second strain body 30B is elastically deformed in a manner similar to the first strain body 30A illustrated in FIG. 6, the capacitance value of the third capacitative element C3 decreases, and the capacitance value of the fourth capacitative element C4 increases.

The third strain body 30C is elastically deformed as in the case where the force Fx on the negative side in the X-axis direction acts. Accordingly, the capacitance value of the fifth capacitative element C5 decreases, and the capacitance value of the sixth capacitative element C6 increases.

The fourth strain body 30D is elastically deformed as in the case where the force Fy on the negative side in the Y-axis direction acts. Accordingly, the capacitance value of the seventh capacitative element C7 decreases, and the capacitance value of the eighth capacitative element C8 increases.

In this way, when a change in capacitance value of each of the capacitative elements C1 to C8 is detected, the direction and magnitude of the force or moment acting on the force receiving body 10 is detected. Then, as illustrated in FIG. 9, the capacitance value of each of the capacitative elements C1 to C8 changes.

The forces Fx, Fy, and Fz, and the moments Mx, My, and Mz acting on the force receiving body 10 can be calculated from the table illustrated in FIG. 9 by the following equations. Thus, six axis components of force can be detected. It should be noted that in the following equations, force or moment and a change amount of a capacitance value are connected by "=" for convenience. However, since force or moment and a capacitance value are physical quantities different from each other, force or moment is actually calculated by converting a change amount of a capacitance value. C1 to C8 in the following equations each indicate a change amount of a capacitance value in each of the capacitative elements.

$$Fx = -C1 + C2 + C5 - C6 \qquad \text{[Equation 3]}$$

$$Fy = -C3 + C4 + C7 - C8 \qquad \text{[Equation 4]}$$

$$Fz = -C1 - C2 - C3 - C4 - C5 - C6 - C7 - C8 \qquad \text{[Equation 5]}$$

$$Mx = +C1 + C2 - C5 - C6 \qquad \text{[Equation 6]}$$

$$My = +C3 + C4 - C7 - C8 \qquad \text{[Equation 7]}$$

$$Mz = -C1 + C2 - C3 + C4 - C5 + C6 - C7 + C8 \qquad \text{[Equation 8]}$$

As described above, the force sensor 1 illustrated in FIG. 5 can detect the forces Fx, Fy, and Fz, and the moments Mx, My, and Mz as indicated by [Equation 3] to [Equation 8] described above, and is therefore capable of detecting six axis components of force. However, the force sensor 1 is not exclusively capable of detecting six axis components of force, and is capable of detecting any axis components depending on the number of strain bodies or the structure and shape of a strain body. For example, when the force receiving body 10 and the support body 20 are connected by only the first strain body 30A illustrated in FIG. 4, the force sensor 1 can detect the forces Fx and Fz as indicated by [Equation 1] and [Equation 2] described above, and is therefore capable of detecting two axis components of force.

If changes in capacitance value of each of the capacitative elements C1 to C8 illustrated in FIG. 9 are applied to [Equation 3] to [Equation 8] described above, a table indicating main-axis sensitivity and cross-axis sensitivity illustrated in FIG. 10 is obtained. VFx illustrated in FIG. 10 is an output when the force Fx in the X-axis direction acts, VFy is an output when the force Fy in the Y-axis direction acts, and VFz is an output when the force Fz in the Z-axis direction acts. VMx is an output when the moment Mx around the X-axis direction acts, VMy is an output when the moment My around the Y-axis direction acts, and VMz is an output when the moment Mz around the Z-axis direction acts.

The numerical values indicated in the table of FIG. 10 are numerical values obtained by substituting "+1" for the capacitative element given the sign "+" and "−1" for the capacitative element given the sign "−" on the right sides of [Equation 3] to [Equation 8] described above, with regard to each of the forces Fx, Fy, and Fz and each of the moments Mx, My, and Mz described on the table of FIG. 9. For example, the numerical value "4" listed in the square where the column of Fx and the row of VFx cross each other is a numerical value obtained by substituting "+1" for C2 and C5, and substituting "−1" for C1 and C6 on the basis of the row of Fx in FIG. 9 in [Equation 3] indicating Fx. The numerical value "0" listed in the square where the column of Fx and the row of VFy cross each other is a numerical value obtained by substituting 0 for C1, C2, C5, and C6 on the basis of the row of Fy in FIG. 9 in [Equation 3] indicating Fx.

As illustrated in FIG. 10, VFx has a numerical value "4" with regard to the force Fx, whereas VFy, VFz, VMx, VMy, and VMz each have a numerical value "0". Accordingly, with regard to the force Fx, there is no cross-axis sensitivity, and only main-axis sensitivity can be detected. With regard to each of the forces Fy and Fz and each of the moments Mx, My, and Mz as well, there is no cross-axis sensitivity, and only main-axis sensitivity can be detected. Specifically, the force sensor 1 that can inhibit the occurrence of cross-axis sensitivity can be obtained.

It should be noted that the case where cross-axis sensitivity occurs is also possible. For example, when the force Fz acts on the positive side in the Z-axis direction with regard to the first strain body 30A, a change amount of a capacitance value of the first capacitative element C1 may be different from a change amount of a capacitance value of the second capacitative element C2. In this case, cross-axis sensitivity can occur for the force Fz. When the force Fz and the moments Mx and My act on the force receiving body 10, the first strain body 30A is displaced in the Z-axis direction, so that in the row of Fz, the row of Mx, and the row of My in the table illustrated in FIG. 9, change amounts of capacitance values may be different even though the same sign is given. In this case, cross-axis sensitivity can occur for the force Fz and the moments Mx and My. Cross-axis sensitivity can occur with regard to the forces Fx and Fy and the moment Mz as well. For example, when the moment Mx acts on the force receiving body 10, capacitance value does not change and the numerical value "0" is therefore listed in the third capacitative element C3, the fourth capacitative element C4, the seventh capacitative element C7, and the eighth capacitative element C8 as illustrated in FIG. 9, but capacitance values may change and cross-axis sensitivity may occur. The same also applies to the moments My and Mz.

With regard to the capacitative elements for which the numerical value "0" is listed in the rows of Fx and Fy as well, capacitance values may change, and cross-axis sensitivity may occur.

However, even when cross-axis sensitivity occurs, a correction calculation can be performed by deriving an inverse matrix of a matrix (a matrix of six rows and six columns corresponding the table illustrated in FIG. 10, also referred to as a characteristic matrix) of cross-axis sensitivity, and multiplying this inverse matrix by an output (or characteristic matrix) of the force sensor. As a result, cross-axis sensitivity can be reduced, and the occurrence of cross-axis sensitivity can be inhibited.

Thus, according to the present embodiment, each of the strain bodies 30A to 30D connecting the force receiving body 10 and the support body 20 has the tilting structure 31 connected to the force-receiving-body-side deformable body 33 and the support-body-side deformable body 34, and the tilting structure 31 includes the first tilting body 35 that is disposed in a plane including the Z-axis direction and the X-axis direction orthogonal to the Z-axis direction and that extends in a direction different from the Z-axis direction. The first tilting body 35 is elastically deformable by the action of force in the Z-axis direction. Accordingly, the tilting structure 31 can be elastically deformed more easily by the action of force in the Z-axis direction. Thus, displacement of each of the displacement electrode substrates Ed1 to Ed8 can be increased, and detection sensitivity of force or moment can be enhanced. As a result, detection accuracy of the force sensor 1 can be improved.

According to the present embodiment, the configuration of each of the strain bodies 30A to 30D can be simplified. Six axis components can be detected only by connecting at least three strain bodies to the force receiving body 10 and the support body 20. Thus, the force sensor 1 can be lowered in cost.

According to the present embodiment, the force-receiving-body-side deformable body 33 extends in the Z-axis direction. Accordingly, when force or moment acts on the force receiving body 10, the force-receiving-body-side deformable body 33 can be elastically deformed more. Thus, the strain bodies 30A to 30D can be elastically deformed more easily, and displacement of the displacement electrode substrates Ed1 to Ed8 provided on the strain bodies 30A to 30D can be increased. Therefore, detection sensitivity of force or moment can be enhanced more, and detection accuracy of the force sensor 1 can be improved more.

According to the present embodiment, the support-body-side deformable body 34 extends in the Z-axis direction. Accordingly, when force or moment acts on the force receiving body 10, the support-body-side deformable body 34 can be elastically deformed more. Thus, the strain bodies 30A to 30D can be elastically deformed more easily, and displacement of the displacement electrode substrates Ed1 to Ed8 provided on the strain bodies 30A to 30D can be increased. Therefore, detection sensitivity of force or moment can be enhanced more, and detection accuracy of the force sensor 1 can be improved more.

According to the present embodiment, the first tilting body 35 of each of the strain bodies 30A to 30D extends in the second direction. Specifically, the first tilting body 35 of each of the strain bodies 30A and 30C extends in the X-axis direction, and the first tilting body 35 of each of the strain bodies 30B and 30D extends in the Y-axis direction. Accordingly, when receiving the action of force in the Z-axis direction, the first tilting body 35 can be elastically deformed more easily. Thus, displacement of the displacement electrode substrates Ed1 to Ed8 can be increased more, and detection sensitivity of force or moment can be enhanced more.

According to the present embodiment, the force-receiving-body-side deformable body 33 is connected to the first tilting body 35, and the support-body-side deformable body 34 is connected to the second tilting body 36 that is connected to the first tilting body 35 via the connecting bodies 37 and 38. The second tilting body 36 is elastically deformable by the action of force in the X-axis direction. Accordingly, the tilting structure 31 can be elastically deformed more easily by the action of force in the Z-axis direction. Thus, displacement of each of the displacement electrode substrates Ed1 to Ed8 can be increased more, and detection sensitivity of force or moment can be enhanced more. As a result, detection accuracy of the force sensor 1 can be improved more.

According to the present embodiment, the force-receiving-body-side deformable body 33 is located between both the ends 35a and 35b of the first tilting body 35 in the X-axis direction. Accordingly, the first tilting body 35 can be elastically deformed more easily by the action of force in the Z-axis direction. Thus, displacement of each of the displacement electrode substrates Ed1 to Ed8 can be increased more easily, and detection sensitivity of force or moment can be enhanced.

According to the present embodiment, the support-body-side deformable body 34 is located between both the ends 36a and 36b of the second tilting body 36 in the X-axis direction. Accordingly, the second tilting body 36 can be elastically deformed more easily by the action of force in the Z-axis direction. Thus, displacement of each of the displacement electrode substrates Ed1 to Ed8 can be increased more easily, and detection sensitivity of force or moment can be enhanced.

According to the present embodiment, the force-receiving-body-side deformable body 33 and the support-body-side deformable body 34 are disposed at positions overlapping each other when viewed in the Z-axis direction. Accordingly, the force-receiving-body-side deformable body 33 and the support-body-side deformable body 34 can be disposed at the same position in the second direction. Thus, when the force Fz in the Z-axis direction acts on the force receiving body 10, displacement of the force receiving body 10 in a direction (corresponding to the X-axis direction or the Y-axis direction) orthogonal to the Z-axis direction can be inhibited, and the force receiving body 10 can be displaced along the Z-axis direction. In this case, the occurrence of cross-axis sensitivity described above can be inhibited.

According to the present embodiment, the tilting structure 31 is formed symmetrically with respect to the force-receiving-body-side deformable body 33 and the support-body-side deformable body 34 in the second direction. Accordingly, inclination of the tilting structure 31 can be increased. Thus, displacement of each of the displacement electrode substrates Ed1 to Ed8 can be increased more, and detection sensitivity of force or moment can be enhanced more. When force in the Z-axis direction acts, displacement of the first displacement electrode substrate Ed1 can be equalized to displacement of the second displacement electrode substrate Ed2. Therefore, calculation of force or moment can be facilitated.

According to the present embodiment, the displacement electrode substrates Ed1 to Ed8 of the detection element 50 are disposed at both ends of the tilting structure 31 in the second direction. Accordingly, displacement of each of the displacement electrode substrates Ed1 to Ed8 can be increased more, and detection sensitivity of force or moment can be enhanced more.

According to the present embodiment, the first strain body 30A is disposed on the negative side in the Y-axis direction relative to the center O of the force receiving body 10, the second strain body 30B is disposed on the positive side in the X-axis direction, the third strain body 30C is disposed on the positive side in the Y-axis direction, and the fourth strain body 30D is disposed on the negative side in the X-axis direction. The second direction of the first strain body 30A and the third strain body 30C is set to the X-axis direction, and the second direction of the second strain body 30B and the fourth strain body 30D is set to the Y-axis direction. Accordingly, when viewed in the Z-axis direction, the first to fourth strain bodies 30A to 30D can be annularly disposed relative to the center O of the force receiving body 10.

Moreover, the first to fourth strain bodies 30A to 30D can be equally disposed around the center O of the force receiving body 10. Thus, detection accuracy of force or moment in any direction can be improved, and deterioration in the detection accuracy of force or moment depending on directions can be inhibited.

According to the present embodiment, the planar shape of the force receiving body 10 and the planar shape of the support body 20 are circular. Accordingly, the force receiving body 10 and the support body 20 can be formed along the shape of the arm portion of the robot main body 1100 and the end effector 1200.

According to the present embodiment, the tilting structure 31 of each of the strain bodies 30A to 30D is linearly formed along the second direction when viewed in the Z-axis direction. Accordingly, the tilting structure 31 can be formed into a plate shape. For example, the tilting structure 31 can be easily manufactured from a plate material.

(First Modification)

Figure 11:
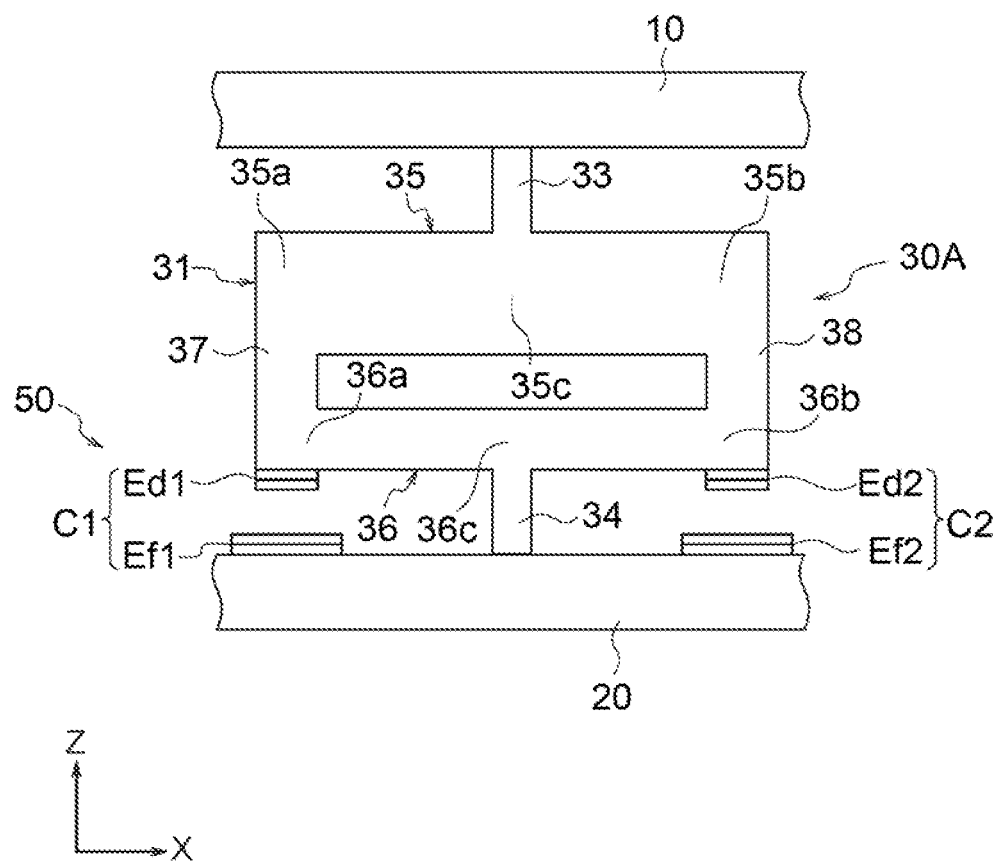
FIG. 11 is a front view illustrating a modification of the strain body in FIG. 4.

It should be noted that in the example described above in the present embodiment, the spring constant of the first tilting body 35 relative to force acting in the Z-axis direction is equal to the spring constant of the second tilting body 36 relative to force acting in the Z-axis direction. However, without being limited thereto, the spring constant of the second tilting body 36 relative to force acting in the Z-axis direction may be different from the spring constant of the first tilting body 35 relative to force acting in the Z-axis direction, for example, as illustrated in FIG. 11. For example, the spring constant of the second tilting body 36 relative to force acting in the Z-axis direction may be lower than the spring constant of the first tilting body 35 relative to force acting in the Z-axis direction. FIG. 11 is a front view illustrating a modification of the strain body in FIG. 4.

According to a first modification illustrated in FIG. 11, when force in the Z-axis direction acts on the tilting structure 31, elastic deformation of the first tilting body 35 can be inhibited, and elastic deformation of the second tilting body 36 can be increased. Thus, the second tilting body 36 is greatly pulled up at both the ends 36a and 36b thereof in the X-axis direction, and displacement of each of the displacement electrode substrates Ed1 and Ed2 provided on the second tilting body 36 can be increased. Thus, detection sensitivity of force or moment can be enhanced more.

Although the dimension of the first tilting body 35 in the Z-axis direction is increased in order to increase the above-described spring constant of the first tilting body 35 in the example illustrated in FIG. 11, the spring constant of the first tilting body 35 is increased by any means. The above-described spring constant of the second tilting body 36 may be decreased. It should be noted that the spring constant of the second tilting body 36 relative to force acting in the Z-axis direction may be higher than the spring constant of the first tilting body 35 relative to force acting in the Z-axis direction. In this case, the fixed electrode substrates Ef1 and Ef2 may be provided on the surface of the force receiving body 10 on the side of the support body 20, and the displacement electrode substrates Ed1 and Ed2 may be provided on the surface of the first tilting body 35 of the tilting structure 31 on the side of the force receiving body 10.

(Second Modification)

Figure 12:
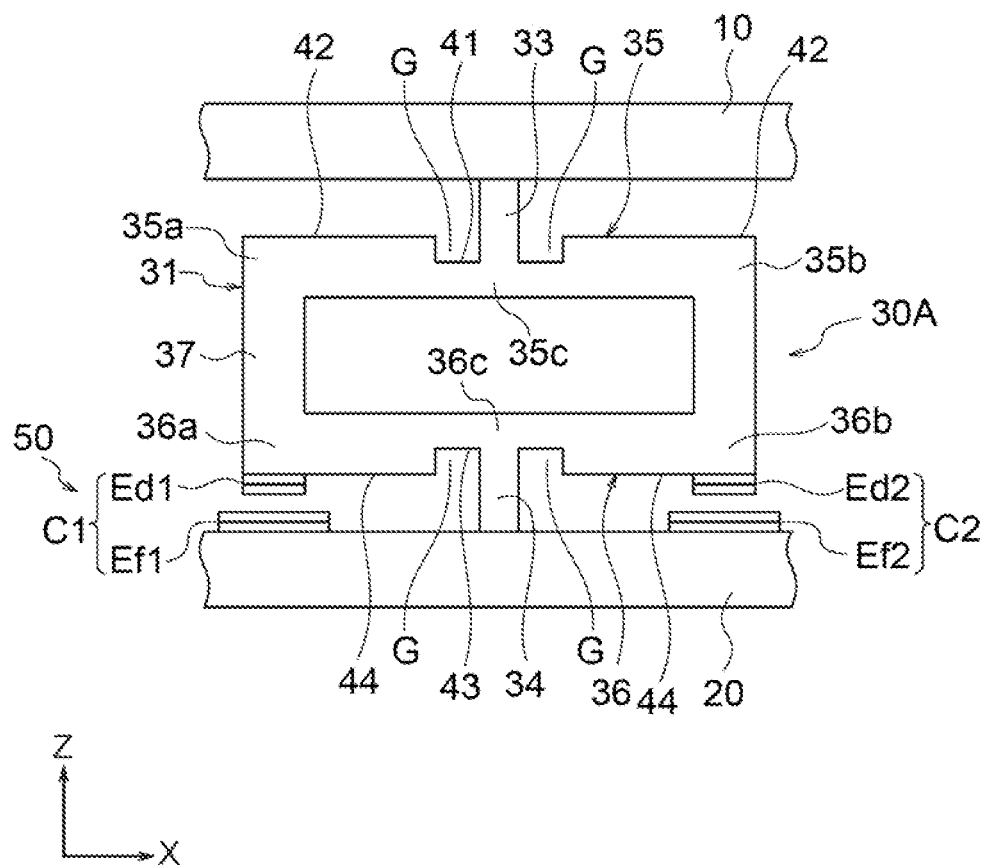
FIG. 12 is a plan view illustrating another modification of the strain body in FIG. 4.

It should be noted that in the example described above in the present embodiment, the entire surface of the first tilting body 35 of the first strain body 30A on the side of the force receiving body 10 is formed into a flat shape, and the entire surface of the second tilting body 36 on the side of the support body 20 is formed into a flat shape. However, the present embodiment is not limited thereto. For example, as illustrated in FIG. 12, the surface of the first tilting body 35 on the side of the force receiving body 10 may be formed into a recessed shape around the force-receiving-body-side deformable body 33. Moreover, the surface of the second tilting body 36 on the side of the support body 20 may be formed into a recessed shape around the support-body-side deformable body 34. FIG. 12 is a plan view illustrating another modification of the strain body in FIG. 4.

More specifically, as illustrated in FIG. 12, the first tilting body 35 may include a first force-receiving-body-side facing surface 41 and a second force-receiving-body-side facing surface 42 that face the force receiving body 10. The force-receiving-body-side deformable body 33 is connected to the first force-receiving-body-side facing surface 41. The second force-receiving-body-side facing surface 42 is disposed on both sides of the first force-receiving-body-side facing surface 41 in the X-axis direction. The first force-receiving-body-side facing surface 41 is located on the side of the support body 20 with respect to the second force-receiving-body-side facing surface 42. The first force-receiving-body-side facing surface 41 is formed around the force-receiving-body-side deformable body 33. The first force-receiving-body-side facing surface 41 is farther from the force receiving body 10 than the second force-receiving-body-side facing surface 42. In this way, the surface of the first tilting body 35 on the side of the force receiving body 10 is formed into a recessed shape, and the force-receiving-body-side deformable body 33 is connected to the portion that is formed into a recessed shape. The first force-receiving-body-side facing surface 41 is formed over the central portion 35*c* of the first tilting body 35 and a portion in its vicinity, and a groove G is formed around the force-receiving-body-side deformable body 33 (corresponding to both sides in the X-axis direction in the example illustrated in FIG. 12). Each of the first force-receiving-body-side facing surface 41 and the second force-receiving-body-side facing surface 42 may be formed into a flat shape. It should be noted that in the example illustrated in FIG. 12, the force-receiving-body-side deformable body 33 and the first tilting body 35 of the tilting structure 31 are integrally formed into a continuous shape, and the first force-receiving-body-side facing surface 41 is illustrated on both sides of the force-receiving-body-side deformable body 33.

Thus, according to a second modification, the first tilting body 35 includes the first force-receiving-body-side facing surface 41 located on the side of the support body 20 with respect to the second force-receiving-body-side facing surface 42, and the force-receiving-body-side deformable body 33 is connected to the first force-receiving-body-side facing surface 41. Accordingly, the dimension of the force-receiving-body-side deformable body 33 in the Z-axis direction can be made longer. Thus, the force sensor 1 can be reduced in height and made compact without reducing the dimension of the force-receiving-body-side deformable body 33 in the Z-axis direction.

It should be noted that although not illustrated, the entire surface of the second tilting body 36 on the side of the support body 20 may be formed into a flat shape when the first tilting body 35 includes the first force-receiving-body-side facing surface 41 located on the side of the support body 20 with respect to the second force-receiving-body-side facing surface 42.

Similarly, the second tilting body 36 may include a first support-body-side facing surface 43 and a second support-body-side facing surface 44 that face the support body 20. The support-body-side deformable body 34 is connected to the first support-body-side facing surface 43. The second support-body-side facing surface 44 is disposed on both sides of the first support-body-side facing surface 43 in the X-axis direction. The first support-body-side facing surface 43 is located on the side of the force receiving body 10 with respect to the second support-body-side facing surface 44. The first support-body-side facing surface 43 is formed around the support-body-side deformable body 34. The first support-body-side facing surface 43 is farther from the support body 20 than the second support-body-side facing surface 44. In this way, the surface of the second tilting body 36 on the side of the support body 20 is formed into a recessed shape, and the support-body-side deformable body 34 is connected to the portion that is formed into a recessed shape. The first support-body-side facing surface 43 is formed over the central portion 36*c* of the second tilting body 36 and a portion in its vicinity, and a groove G is formed around the support-body-side deformable body 34 (corresponding to both sides in the X-axis direction in the example illustrated in FIG. 12). Each of the first support-body-side facing surface 43 and the second support-body-side facing surface 44 may be formed into a flat shape. It should be noted that in the example illustrated in FIG. 12, the support-body-side deformable body 34 and the second tilting body 36 of the tilting structure 31 are integrally formed into a continuous shape, and the first support-body-side facing surface 43 is illustrated on both sides of the support-body-side deformable body 34.

Thus, according to the second modification, the second tilting body 36 includes the first support-body-side facing surface 43 located on the side of the force receiving body 10 with respect to the second support-body-side facing surface 44, and the support-body-side deformable body 34 is connected to the first support-body-side facing surface 43. Accordingly, the dimension of the support-body-side deformable body 34 in the Z-axis direction can be made longer. Thus, the force sensor 1 can be reduced in height and made compact without shortening the dimension of the support-body-side deformable body 34 in the Z-axis direction.

Figure 13:
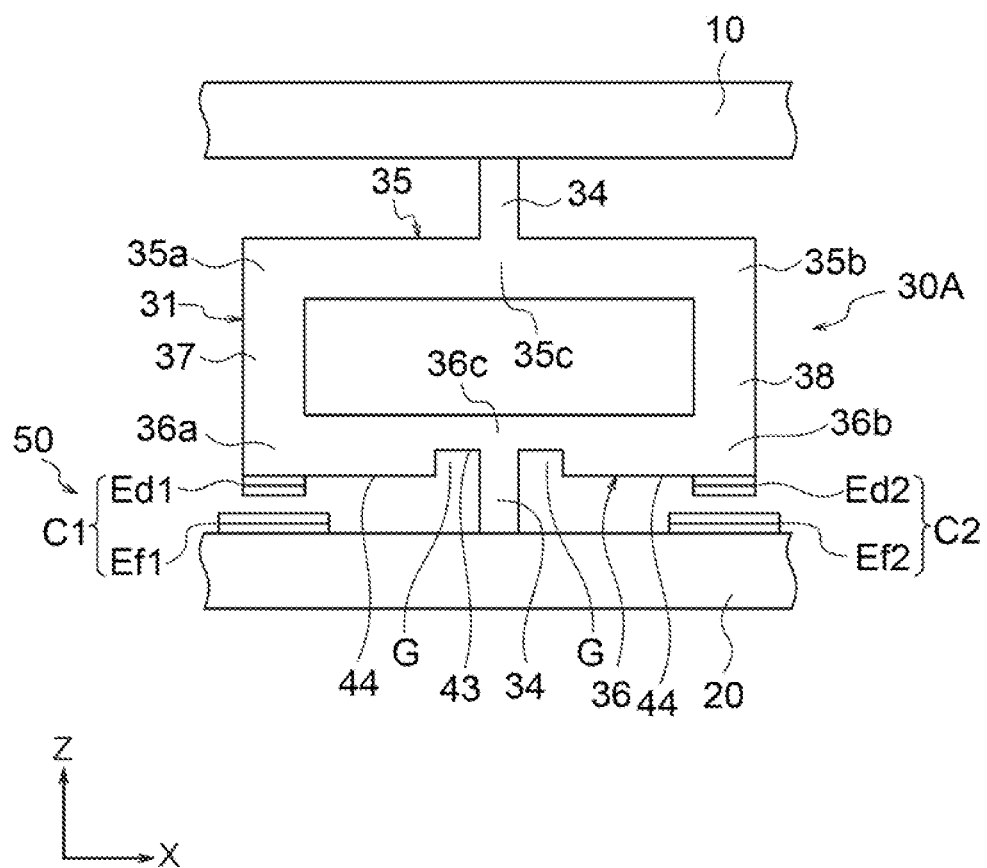
FIG. 13 is a plan view illustrating another modification of the strain body in FIG. 4.

It should be noted that when the second tilting body 36 includes the first support-body-side facing surface 43 located on the side of the force receiving body 10 with respect to the second support-body-side facing surface 44, the entire surface of the first tilting body 35 on the side of the force receiving body 10 may be formed into a flat shape as illustrated in FIG. 13. In the example illustrated in FIG. 13, the first tilting body 35 does not include the first force-receiving-body-side facing surface 41 described above, and the groove G is not formed around the force-receiving-body-side deformable body 33. The groove G is formed around the support-body-side deformable body 34 on the surface of the second tilting body 36 on the side of the support body 20. FIG. 13 is a plan view illustrating another modification of the strain body in FIG. 4.

(Third Modification)

Figure 14:
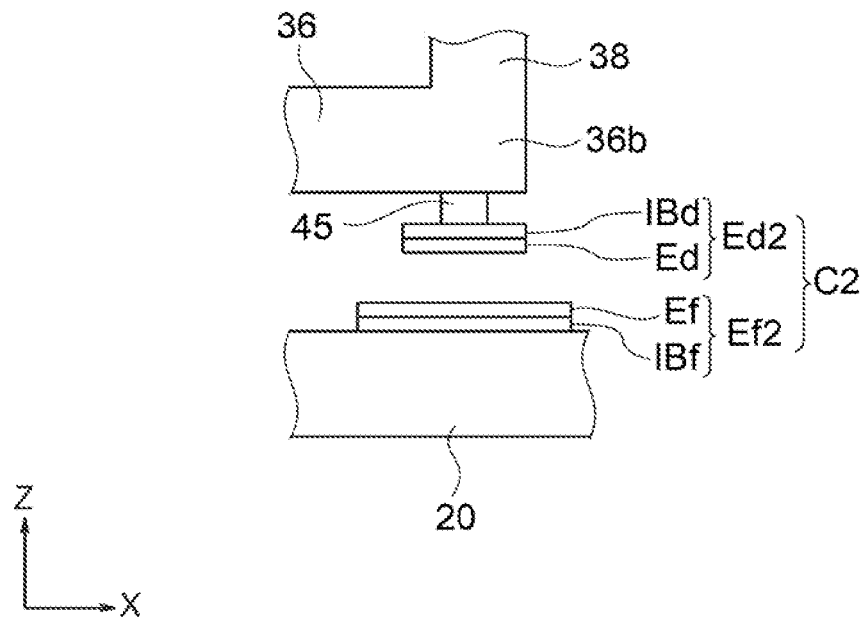
FIG. 14 is a partially enlarged front view illustrating another modification of the strain body in FIG. 4.

In the example described above in the present embodiment, the displacement electrode substrates Ed1 and Ed2 of the first strain body 30A are provided on the surface of the second tilting body 36 of the tilting structure 31 on the side of support body 20. However, the present embodiment is not limited thereto. For example, as illustrated in FIG. 14, the displacement electrode substrates Ed1 and Ed2 may be provided on the surface of the second tilting body 36 on the side of the support body 20 via a columnar member 45. FIG. 14 is a partially enlarged front view illustrating another modification of the strain body in FIG. 4.

In the example illustrated in FIG. 14, the planar shape of the columnar member 45 may be smaller than the planar shape of each of the displacement electrode substrates Ed1 and Ed2. The planar shape of the columnar member 45 may be rectangular or circular, and may be any shape. The columnar member 45 may be joined to the second tilting body 36 by adhesive, or may be fixed thereto by a bolt or the like. The displacement electrode substrates Ed1 and Ed2 may be joined to the columnar member 45 by adhesive, or may be fixed thereto by a bolt or the like.

Thus, according to the third modification, the displacement electrode substrates Ed1 and Ed2 are provided to the second tilting body 36 via the columnar member 45. Accordingly, detection of displacement can be stabilized. Specifically, when force acts on the first strain body 30A, the second tilting body 36 of the tilting structure 31 can be elastically deformed, and stress can be generated in the portions of the second tilting body 36 in the vicinity of the displacement electrode substrates Ed1 and Ed2. Generation of such stress causes the drift of hysteresis or zero-point voltage (corresponding to output voltage when no load is applied). On the contrary, as illustrated in FIG. 14, the influence of stress generated in the second tilting body 36 on the displacement electrode substrates Ed1 and Ed2 can be reduced by providing the displacement electrode substrates Ed1 and Ed2 to the second tilting body 36 via the columnar member 45. Thus, detection of displacement can be stabilized.

(Fourth Modification)

Figure 15:
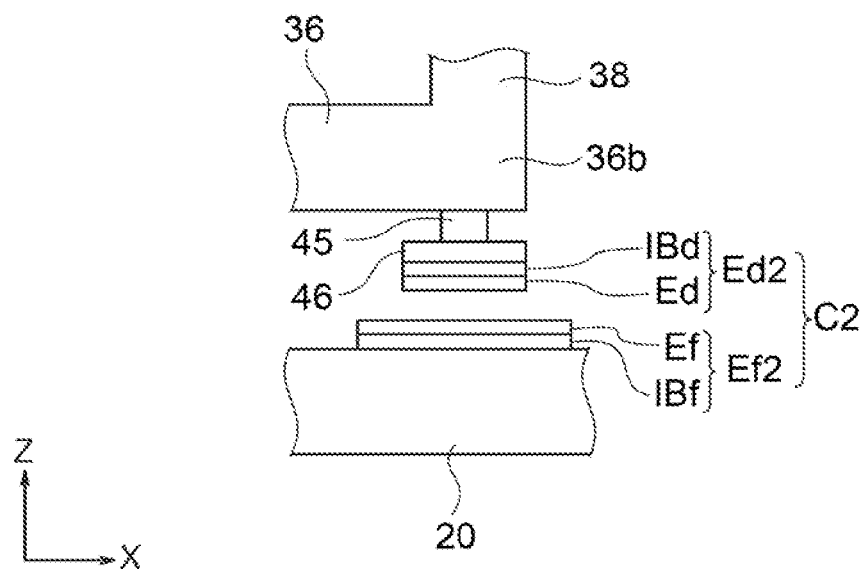
FIG. 15 is a partially enlarged front view illustrating another modification of the strain body in FIG. 4.

As illustrated in FIG. 15, the displacement electrode substrates Ed1 and Ed2 may be provided on the columnar member 45 described above via a reinforcing substrate 46. FIG. 15 is a partially enlarged front view illustrating another modification of the strain body in FIG. 4.

In the example illustrated in FIG. 15, the planar shape of the reinforcing substrate 46 may be equal to the planar shape of each of the displacement electrode substrates Ed1 and Ed2. The reinforcing substrate 46 may be joined to the columnar member 45 by adhesive, or may be fixed thereto by a bolt or the like. In this case, the displacement electrode substrates Ed1 and Ed2 may be joined to the reinforcing substrate 46 by adhesive. The spring constant of the reinforcing substrate 46 relative to force acting in the Z-axis direction may be higher than the spring constant of the displacement electrode substrates Ed1 and Ed2 relative to force acting in the Z-axis direction. Accordingly, deformation of the displacement electrode substrates Ed1 and Ed2 can be inhibited. The reinforcing substrate 46 may be configured by a metal material, and may be of the same material as the force receiving body 10, the support body 20, and the strain bodies 30A to 30D in order to inhibit deformation due to temperature changes, for example. In this case, the reinforcing substrate 46 may be configured by an aluminum alloy or an iron alloy. The reinforcing substrate 46 may be manufactured integrally with the columnar member 45 described above. Deformation of the displacement electrode substrates Ed1 and Ed2 can be inhibited by using such a reinforcing substrate 46. For example, even when FPC substrates are used for the displacement electrode substrates Ed1 and Ed2, deformation of the displacement electrode substrates Ed1 and Ed2 can be effectively inhibited.

(Fifth Modification)

Figure 16:
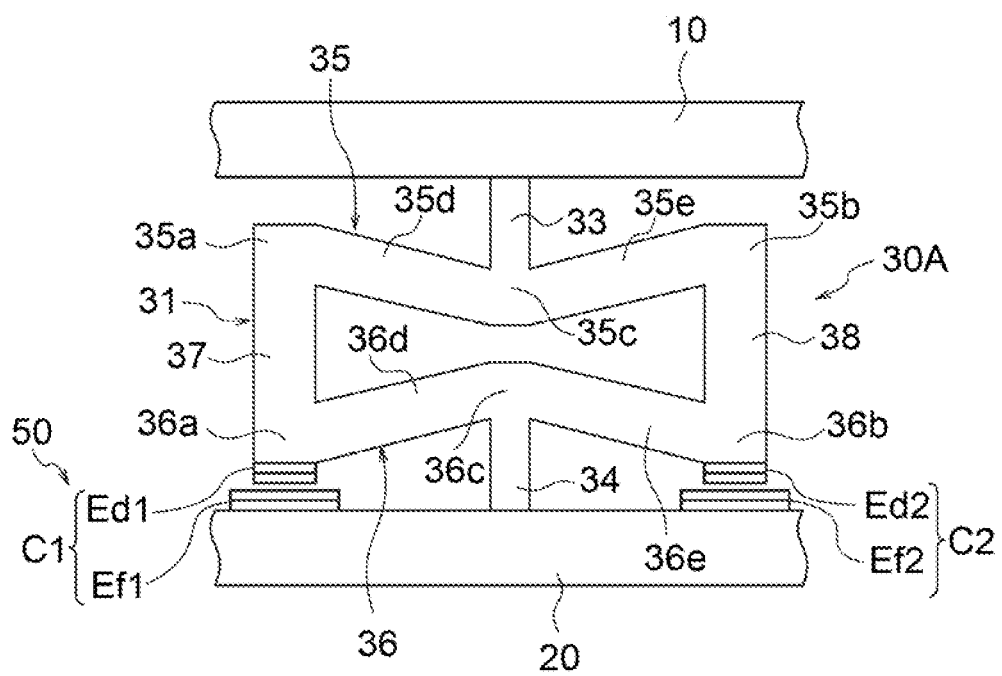
FIG. 16 is a front view illustrating another modification of the strain body in FIG. 4.
Figure 16:
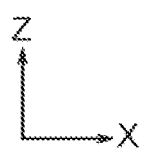

In the example described above in the present embodiment, the first tilting body 35 and the second tilting body 36 linearly extend in the X-axis direction (corresponding to the second direction of the first strain body 30A). However, without being limited thereto, the first tilting body 35 and the second tilting body 36 can have any shape as long as the first tilting body 35 and the second tilting body 36 are disposed in a plane including the Z-axis direction (corresponding to first direction) and the X-axis direction, and extend in a direction different from the Z-axis direction. For example, the first tilting body 35 and the second tilting body 36 may have a shape illustrated in FIG. 16. Here, FIG. 16 is a front view illustrating another modification of the strain body in FIG. 4. It should be noted that the first strain body 30A illustrated in FIG. 16 has a shape similar to that of the first strain body 30A when receiving the force Fz on the negative side in the Z-axis direction as illustrated in FIG. 7B, but is illustrated as the first strain body 30A when receiving no action of force or moment in FIG. 16.

In the first strain body 30A illustrated in FIG. 16, the central portion 35c of the first tilting body 35 in the X-axis direction is located on the side of the support body 20 (or on the side of the second tilting body 36) with respect to both the ends 35a and 35b in the X-axis direction. More specifically, the first tilting body 35 includes a first-tilting-body negative-side portion 35d disposed on the negative side in the X-axis direction with respect to the central portion 35c, and a first-tilting-body positive-side portion 35e disposed on the positive side in the X-axis direction with respect to the central portion 35c. The first-tilting-body negative-side portion 35d is a portion connecting the negative-side end 35a and the central portion 35c, and is inclined in such a way as to extend toward the negative side in the Z-axis direction while extending toward to the positive side in the X-axis direction. The first-tilting-body negative-side portion 35d extends in a direction inclined relative to the Z-axis direction (corresponding to a direction different from the Z-axis direction) in the XZ plane. The first-tilting-body positive-side portion 35e is a portion connecting the positive-side end 35b and the central portion 35c, and is inclined in such a way as to extend toward the positive side in the Z-axis direction while extending toward the positive side in the X-axis direction. The first-tilting-body positive-side portion 35e extends in a direction inclined relative to the Z-axis direction (corresponding to a direction different from the Z-axis direction) in the XZ plane. In this way, the first tilting body 35 in the modification illustrated in FIG. 16 is schematically formed into a V-shape.

The central portion 36c of the second tilting body 36 in the X-axis direction is located on the side of the force receiving body 10 (or on the side of the first tilting body 35) with respect to both the ends 36a and 36b in the X-axis direction. More specifically, the second tilting body 36 includes a second-tilting-body negative-side portion 36d disposed on the negative side in the X-axis direction with respect to the central portion 36c, and a second-tilting-body positive-side portion 36e disposed on the positive side in the X-axis direction with respect to the central portion 36c. The second-tilting-body negative-side portion 36d is a portion connecting the negative-side end 36a and the central portion 36c, and is inclined in such a way as to extend toward the positive side in the Z-axis direction while extending toward the positive side in the X-axis direction. The second-tilting-body negative-side portion 36d extends in a direction inclined relative to the Z-axis direction (corresponding to a direction different from the Z-axis direction) in the XZ plane. The second-tilting-body positive-side portion 36e is a portion connecting the positive-side end 36b and the central portion 36c, and is inclined in such a way as to extend toward the negative side in the Z-axis direction while extending toward the positive side in the X-axis direction. The second-tilting-body positive-side portion 36e extends in a direction inclined relative to the Z-axis direction (corresponding to a direction different from the Z-axis direction) in the XZ plane. In this way, the second tilting body 36 in the modification illustrated in FIG. 16 is schematically formed into an inverted V-shape.

Thus, according to the modification illustrated in FIG. 16, the central portion 35c of the first tilting body 35 in the X-axis direction is located on the side of the support body 20 with respect to both the ends 35a and 35b in the X-axis direction. Accordingly, the central portion 35c of the first tilting body 35 in the X-axis direction can be kept far from the force receiving body 10, and the dimension of the force-receiving-body-side deformable body 33 in the Z-axis direction can be made longer. Thus, the force sensor 1 can be reduced in height and made compact without reducing the dimension of the force-receiving-body-side deformable body 33 in the Z-axis direction.

Moreover, according to the modification illustrated in FIG. 16, the central portion 36c of the second tilting body 36 in the X-axis direction is located on the side of the force receiving body 10 with respect to both the ends 36a and 36b in the X-axis direction. Accordingly, the central portion 36c of the second tilting body 36 in the X-axis direction can be kept far from the support body 20, and the dimension of the support-body-side deformable body 34 in the Z-axis direction can be made longer. Thus, the force sensor 1 can be reduced in height and made compact without reducing the dimension of the support-body-side deformable body 34 in the Z-axis direction.

(Sixth Modification)

Figure 17:
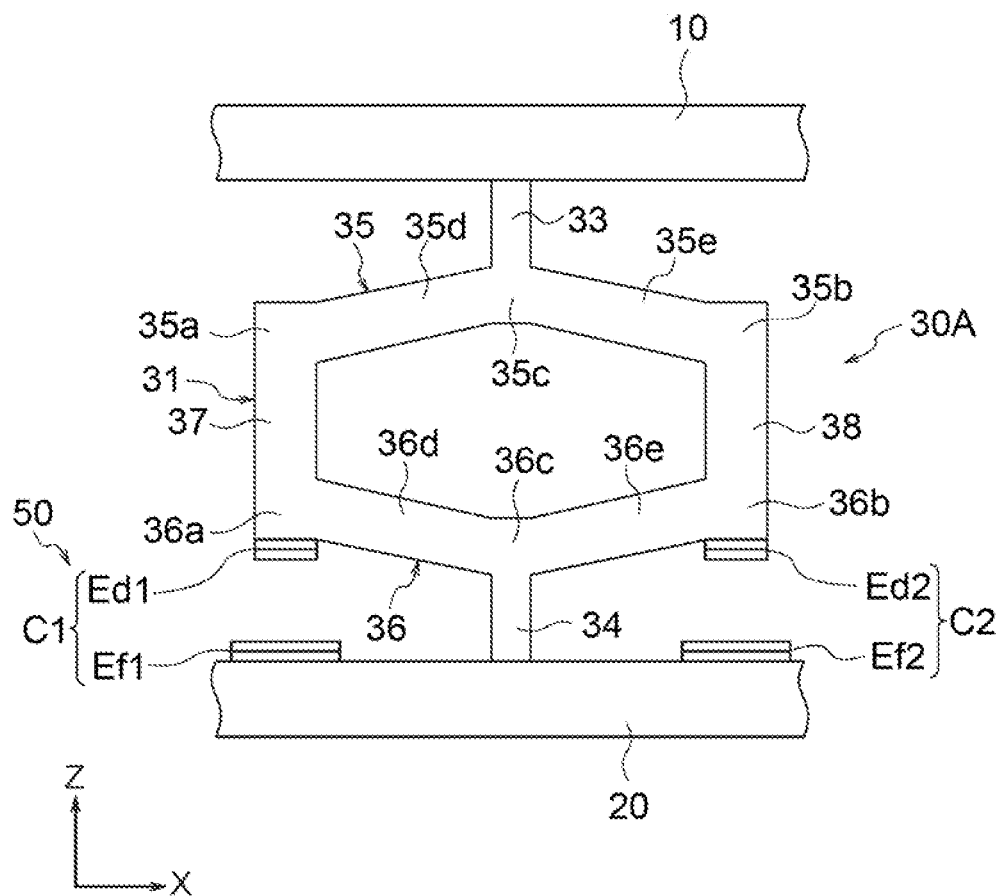
FIG. 17 is a front view illustrating another modification of the strain body in FIG. 4.

In the example described above in the present embodiment, the first tilting body 35 and the second tilting body 36 linearly extend in the X-axis direction (corresponding to the second direction of the first strain body 30A). However, without being limited thereto, the first tilting body 35 and the second tilting body 36 can have any shape as long as the first tilting body 35 and the second tilting body 36 are disposed in a plane including the Z-axis direction (corresponding to first direction) and the X-axis direction, and extend in a direction different from the Z-axis direction. For example, the first tilting body 35 and the second tilting body 36 may have a shape illustrated in FIG. 17. Here, FIG. 17 is a front view illustrating another modification of the strain body in FIG. 4. It should be noted that the first strain body 30A illustrated in FIG. 17 shows a shape similar to that of the first strain body 30A when receiving the force Fz on the positive side in the Z-axis direction as illustrated in FIG. 7A, but is illustrated as the first strain body 30A when receiving no action of force or moment in FIG. 17.

In the first strain body 30A illustrated in FIG. 17, the central portion 35c of the first tilting body 35 in the X-axis direction is located on the side of the force receiving body 10 (or on the side opposite to the second tilting body 36) with respect to both the ends 35a and 35b in the X-axis direction. More specifically, the above-described first-tilting-body negative-side portion 35d of the first tilting body 35 is inclined in such a way as to extend toward the positive side in the Z-axis direction while extending toward the positive side in the X-axis direction. The first-tilting-body positive-side portion 35e is inclined in such a way as to extend toward the negative side in the Z-axis direction while extending toward the positive side in the X-axis direction. In this way, the first tilting body 35 in the modification illustrated in FIG. 17 is schematically formed into an inverted V-shape.

The central portion 36c of the second tilting body 36 in the X-axis direction is located on the side of the support body 20 (or on the side opposite to the first tilting body 35) with respect to both the ends 36a and 36b in the X-axis direction. More specifically, the above-described second-tilting-body negative-side portion 36d of the second tilting body 36 is inclined in such a way as to extend toward the negative side in the Z-axis direction while extending toward the positive side in the X-axis direction. The second-tilting-body positive-side portion 36e is inclined in such a way as to extend toward the positive side in the Z-axis direction while extending toward the positive side in the X-axis direction. In this way, the second tilting body 36 in the modification illustrated in FIG. 17 is schematically formed into a V-shape.

Thus, according to the modification illustrated in FIG. 17, the central portion 35c of the first tilting body 35 in the X-axis direction is located on the side of the force receiving body 10 with respect to both the ends 35a and 35b in the X-axis direction. Accordingly, the force sensor 1 can be increased in height without increasing the dimension of the force-receiving-body-side deformable body 33 in the Z-axis direction.

Moreover, according to the modification illustrated in FIG. 17, the central portion 36c of the second tilting body 36 in the X-axis direction is located on the side of the support body 20 with respect to both the ends 36a and 36b in the X-axis direction. Accordingly, the force sensor 1 can be increased in height without increasing the dimension of the support-body-side deformable body 34 in the Z-axis direction.

(Seventh Modification)

Figure 18:
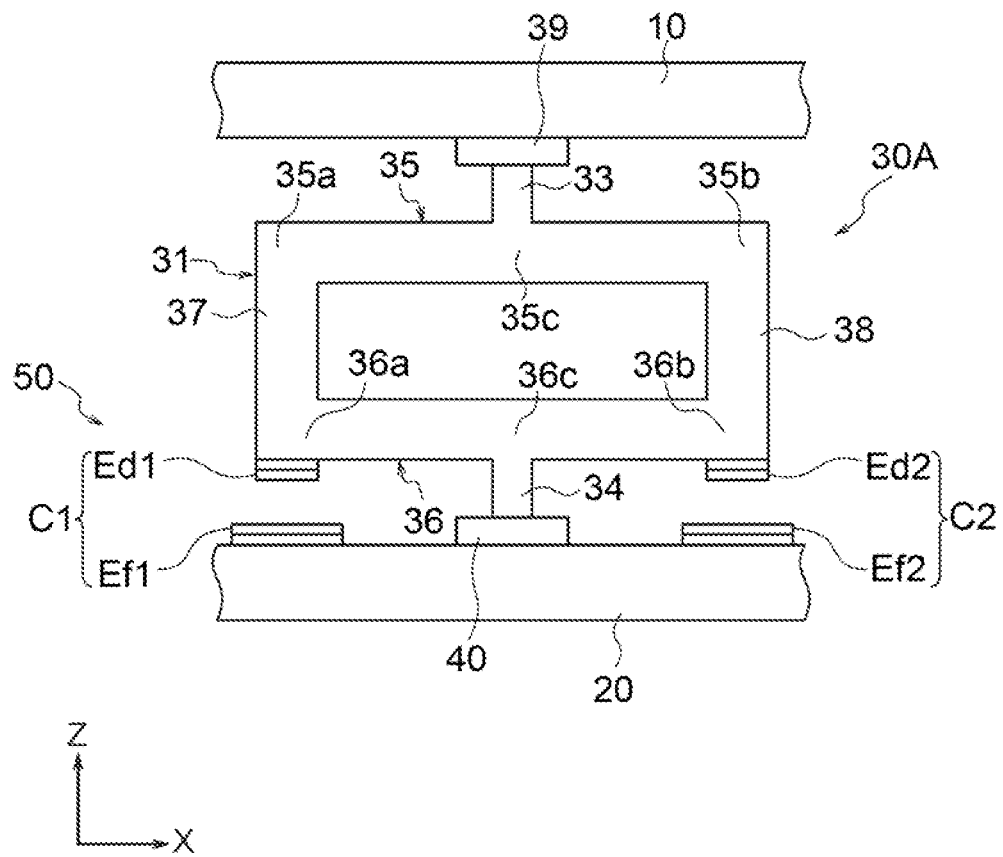
FIG. 18 is a front view illustrating another modification of the strain body in FIG. 4.

In the example described above in the present embodiment, the upper end of the force-receiving-body-side deformable body 33 is connected to the force receiving body 10. However, without being limited thereto, the force-receiving-body-side deformable body 33 may be connected to the force receiving body 10 via a force-receiving-body-side seat 39, for example, as illustrated in FIG. 18. Accordingly, the force-receiving-body-side deformable body 33 can be stably attached to the force receiving body 10 by the force-receiving-body-side seat 39. For example, the force-receiving-body-side seat 39, the force-receiving-body-side deformable body 33, and the first tilting body 35 may be integrally formed. In this case, the force-receiving-body-side seat 39 may be fixed to the force receiving body 10 by a bolt, adhesive, or the like. Alternatively, the force-receiving-body-side seat 39 and the force-receiving-body-side deformable body 33 may be separately formed and fixed to each other by a bolt, adhesive, or the like.

Similarly, without being limited to the configuration of having the lower end connected to the support body 20, the support-body-side deformable body 34 may be connected to the support body 20 via a support-body-side seat 40, for example, as illustrated in FIG. 18. Accordingly, the support-body-side deformable body 34 can be stably attached to the support body 20 by the support-body-side seat 40. For example, the support-body-side seat 40, the support-body-side deformable body 34, and the second tilting body 36 may be integrally formed. In this case, the support-body-side seat 40 may be fixed to the support body 20 by a bolt, adhesive, or the like. Alternatively, the support-body-side seat 40 and the support-body-side deformable body 34 may be separately formed and fixed to each other by a bolt, adhesive, or the like.

Furthermore, the force-receiving-body-side seat 39, the force-receiving-body-side deformable body 33, the tilting structure 31, the support-body-side deformable body 34, and the support-body-side seat 40 may be integrally formed. In this case, the force-receiving-body-side seat 39 may be fixed to the force receiving body 10 by a bolt, adhesive, or the like, and the support-body-side seat 40 may be fixed to the support body 20 by a bolt, adhesive, or the like.

It should be noted that the force-receiving-body-side seat 39 and the support-body-side seat 40 are not exclusively applied to the first strain body 30A illustrated in FIG. 18, and can also be applied to the other strain bodies 30A to 30D including the first strain body 30A illustrated in FIG. 11.
(Eighth Modification)

In the example described above in the present embodiment, the planar shape of the force receiving body 10 is circular, and the tilting structure 31 is linearly formed along the second direction when viewed in the Z-axis direction. However, the present embodiment is not limited thereto.

Figure 19:
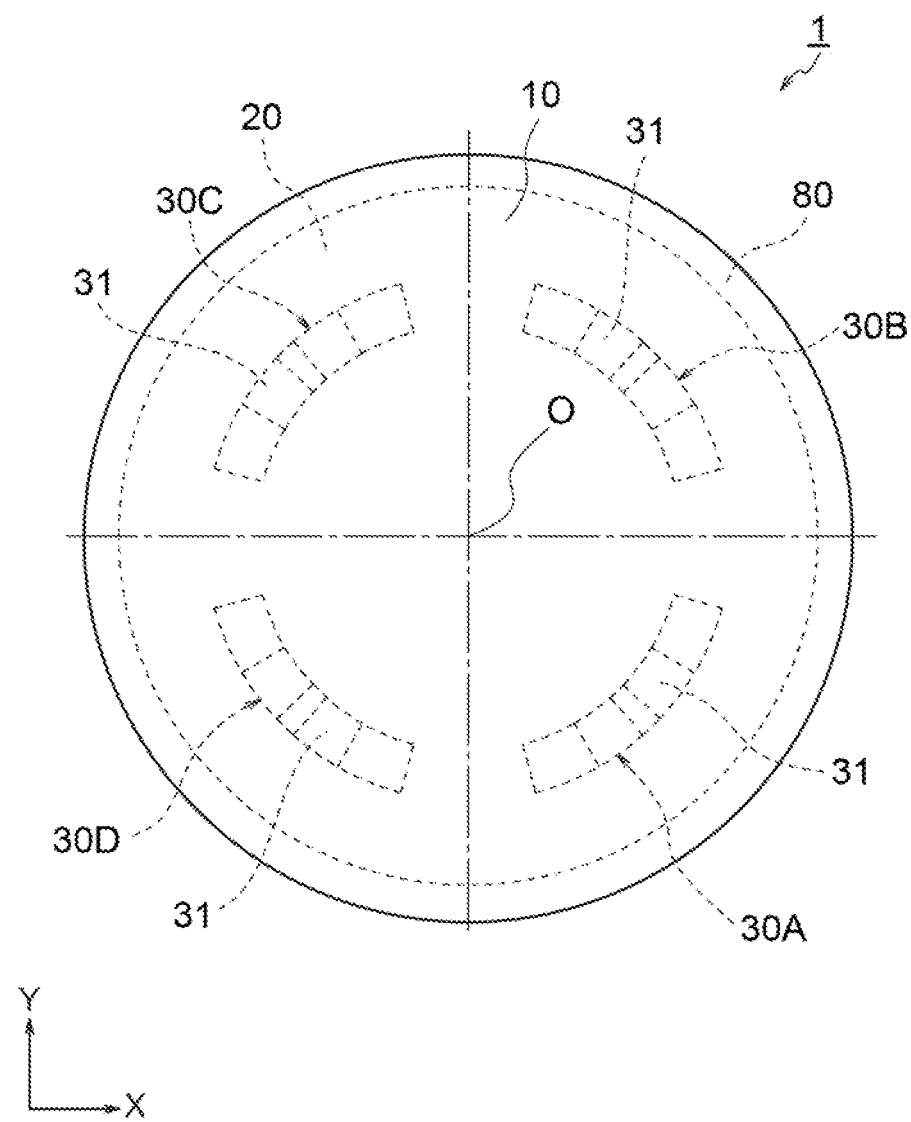
FIG. 19 is a plan view illustrating another modification of the force sensor in FIG. 3.
Figure 20:
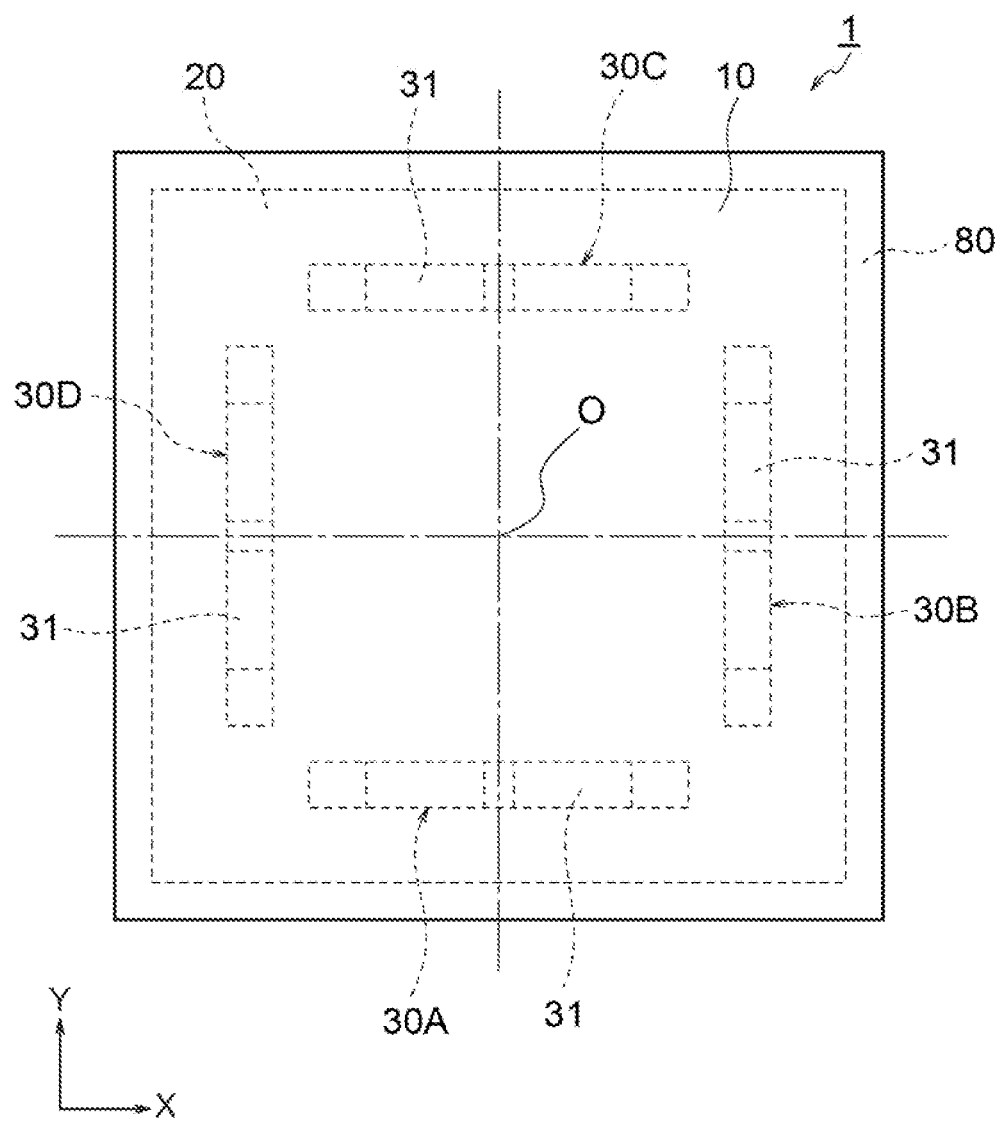
FIG. 20 is a plan view illustrating another modification of the force sensor in FIG. 3.

For example, as illustrated in FIG. 19, the tilting structure 31 may be formed into a curved shape when viewed in the Z-axis direction. FIG. 19 is a plan view illustrating another modification of the force sensor in FIG. 3. In this case, the tilting structure 31 may be formed into a curved shape concentrically with the force receiving body 10. Specifically, the tilting structures 31 of the four strain bodies 30A to 30D may be disposed in such a way as to form a circular annular shape. It should be noted that when the tilting structure 31 of each of the strain bodies 30A to 30D is formed into a curved shape, the planar shape of the force receiving body 10 may be rectangular as illustrated in FIG. 20 described later. In this case, the planar shape of the support body 20 may be rectangular.

For example, as illustrated in FIG. 20, the planar shape of the force receiving body 10 may be rectangular. In this case, the planar shape of the support body 20 may also be rectangular. Accordingly, the force receiving body 10 and the support body 20 can be formed along the disposition of the strain bodies 30A to 30D, and the force sensor 1 having satisfactory space efficiency can be obtained. The planar sectional shape of the exterior body 80 may be a rectangular shape. Specifically, at least one of the planar shape of the force receiving body 10 and the planar shape of the support body 20 may be rectangular. In this case, one of the planar shape of the force receiving body 10 and the planar shape of the support body 20 may be rectangular, and the other may be a shape other than a rectangular shape. It should be noted that the planar shape of the force receiving body 10 may be a shape other than a rectangular shape, such as a polygonal or elliptical shape. The same also applies to the support body 20. In compliance with the planar shapes of the force receiving body 10 and the support body 20, the planar sectional shape of the exterior body 80 may also be any other shape, such as a polygonal frame or an elliptical frame.
(Ninth Modification)

Figure 21A:
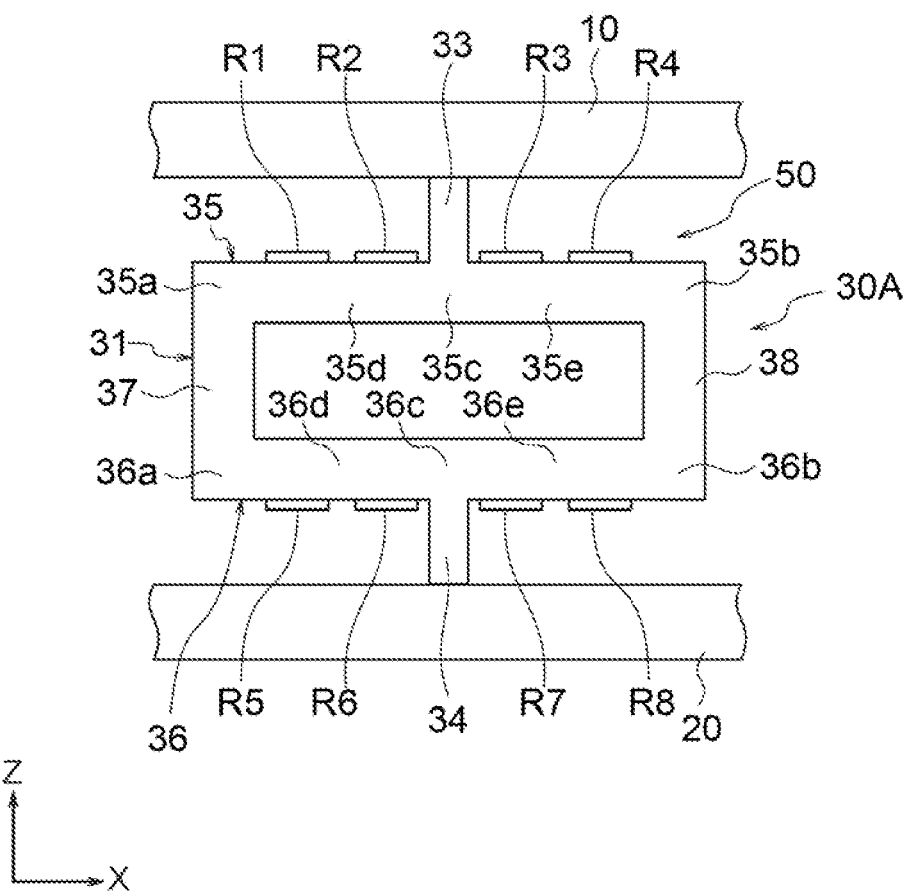
FIG. 21A is a front view of a strain body illustrating a modification of a detection element in FIG. 4.
Figure 21B:
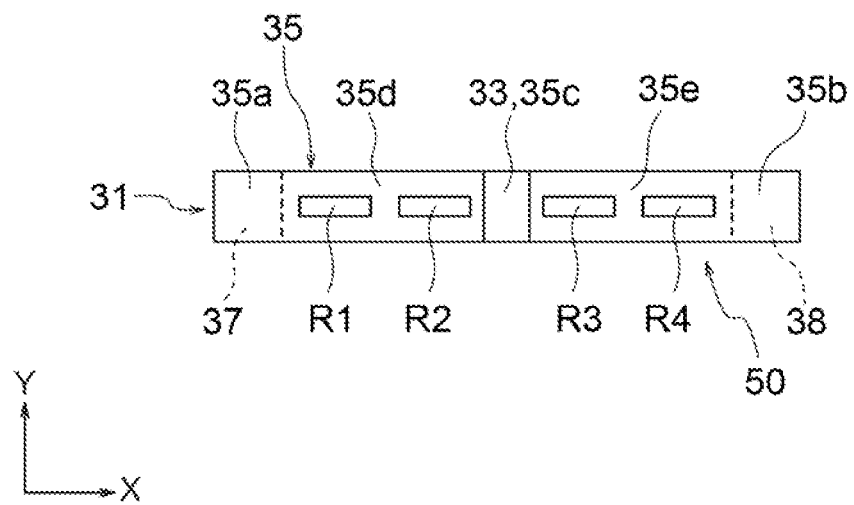
FIG. 21B is a plan view illustrating the detection element in FIG. 21A.
Figure 21C:
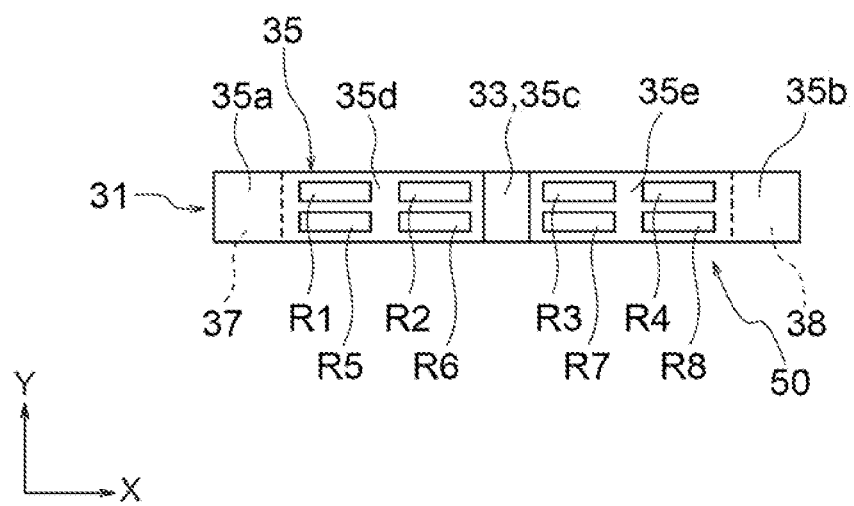
FIG. 21C is a plan view illustrating a modification of FIG. 21B.
Figure 22A:
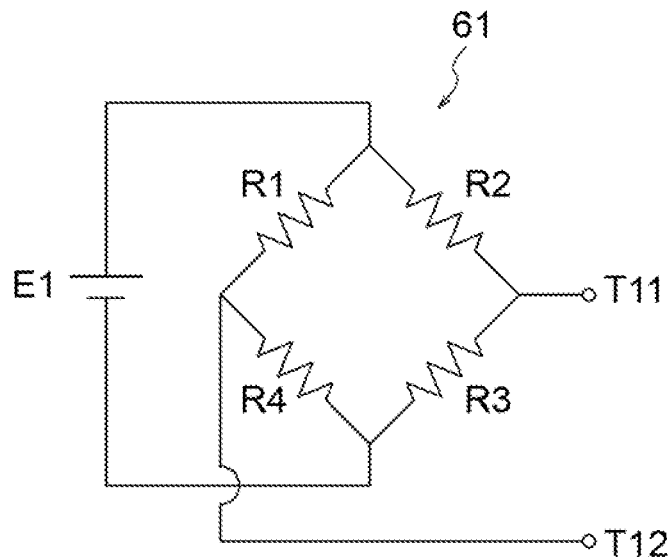
FIG. 22A is a view illustrating a Wheatstone bridge circuit for a detection element provided on a first tilting body illustrated in FIG. 21A.
Figure 22B:
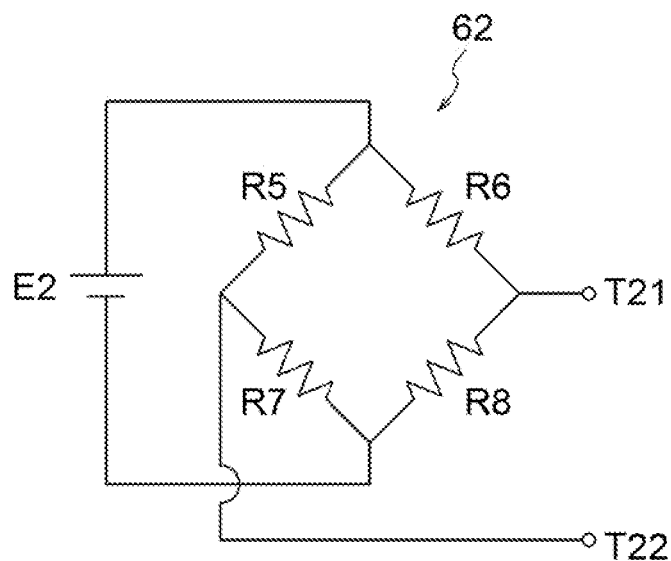
FIG. 22B is a view illustrating a Wheatstone bridge circuit for a detection element provided on a second tilting body illustrated in FIG. 21A.
Figure 23A:
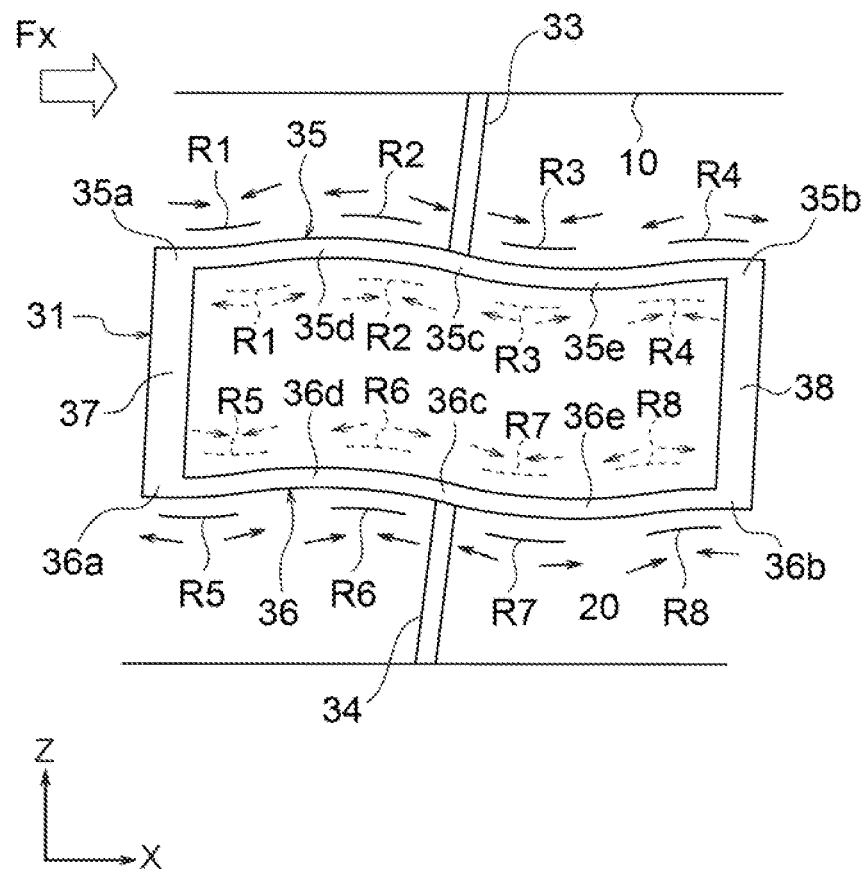
FIG. 23A is a schematic view illustrating a deformation state of the strain body in FIG. 21A when receiving force on the positive side in the X-axis direction.
Figure 23B:
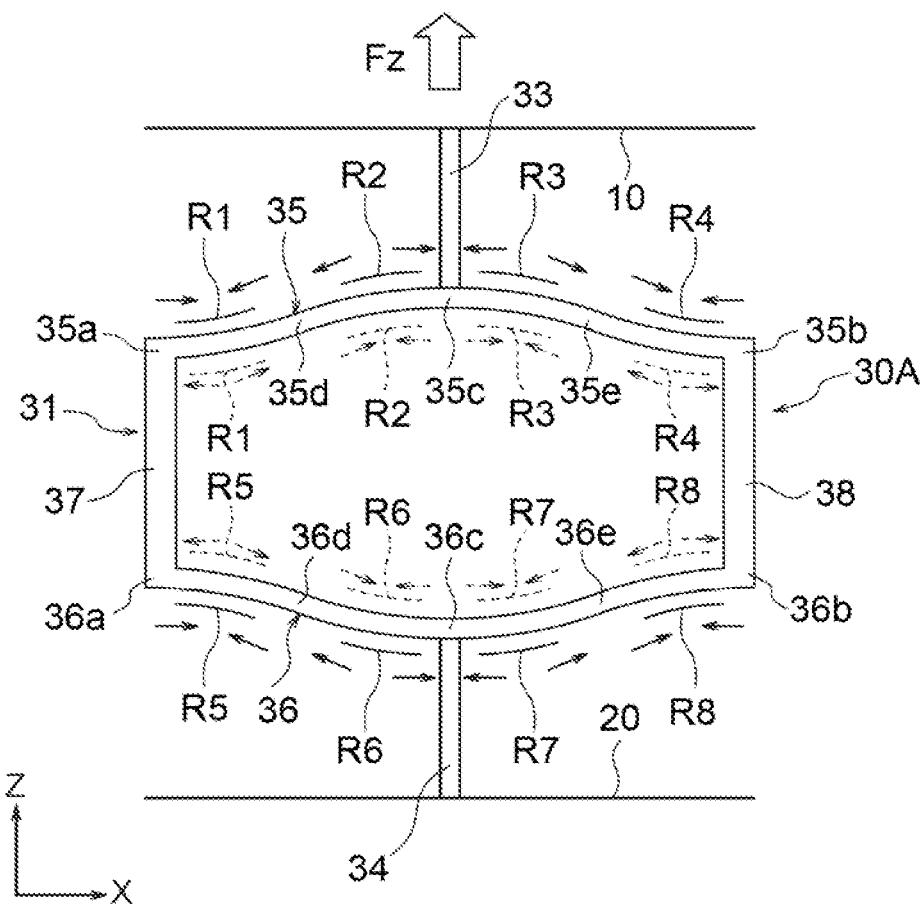
FIG. 23B is a schematic view illustrating a deformation state of the strain body in FIG. 21A when receiving force on the positive side in the Z-axis direction.

In the example described above in the present embodiment, the detection element 50 is configured as an element that detects capacitance. However, without being limited thereto, the detection element 50 may be constituted by a strain gauge that detects strain produced by the action of force or moment received by the force receiving body 10. For example, as illustrated in FIG. 21A, the detection element 50 may have a strain gauge provided on the first strain body 30A. FIG. 21A is a front view of a strain body illustrating a modification of the detection element in FIG. 4. FIG. 21B is a plan view illustrating the detection element in FIG. 21A. FIG. 21C is a plan view illustrating a modification of FIG. 21B. FIG. 22A is a view illustrating a Wheatstone bridge circuit for a detection element provided on a first tilting body illustrated in FIG. 21A. FIG. 22B is a view illustrating a Wheatstone bridge circuit for a detection element provided on a second tilting body illustrated in FIG. 21A. FIG. 23A is a schematic view illustrating a deformation state of the strain body in FIG. 21A when receiving force on the positive side in the X-axis direction. FIG. 23B is a schematic view illustrating a deformation state of the strain body in FIG. 21A when receiving force on the positive side in the Z-axis direction.

As illustrated in FIG. 21A, the strain gauges R1 to R8 may be provided on the tilting structure 31. It should be noted that as illustrated in FIGS. 23A and 23B, the dimension of each of the connecting bodies 37 and 38 of the tilting structure 31 in the X-axis direction according to the present embodiment may be larger than the dimension of each of the connecting bodies 37 and 38 of the tilting structure 31 in the X-axis direction in FIG. 4. In other words, the spring constant of each of the connecting bodies 37 and 38 according to the present embodiment relative to force acting in the X-axis direction may be higher than the spring constant of each of the connecting bodies 37 and 38 in FIG. 4 relative to force acting in the X-axis direction.

More specifically, the strain gauges R1 to R4 may be attached to the surface of the first tilting body 35 of the tilting structure 31 on the side of the force receiving body 10. For example, the two strain gauges R1 and R2 may be attached to the upper surface of the first-tilting-body negative-side portion 35*d* of the first tilting body 35, and the two strain gauges R3 and R4 may be attached to the upper surface of the first-tilting-body positive-side portion 35*e*. In the first-tilting-body negative-side portion 35*d*, one strain gauge R1 may be located on the side of the end 35*a* that is located on the negative side in the X-axis direction (or on the side of the connecting body 37), and the other strain gauge R2 may be located on the side of the central portion 35*c* (or on the side of the force-receiving-body-side deformable body 33). In the first-tilting-body positive-side portion 35*e*, one strain gauge R3 may be located on the side of the central portion 35*c* (or on the side of the force-receiving-body-side deformable body 33), and the other strain gauge R4 may be located on the side of the end 35*b* that is located on the positive side in the X-axis direction (or on the side of the connecting body 38). As illustrated in FIG. 21B, the four strain gauges R1 to R4 provided on the first tilting body 35 may be located in the center of the first tilting body 35 in the Y-axis direction.

As illustrated in FIG. 22A, the detection circuit 60 may have a Wheatstone bridge circuit 61 that outputs an electric signal on the basis of detection results by the four strain gauges R1 to R4 attached to the first tilting body 35. This Wheatstone bridge circuit 61 is configured so that bridge voltage as an electric signal relevant to strain detected by each of the strain gauges R1 to R4 is generated between output terminals T11 and T12 by applying predetermined voltage from a bridge voltage source E1. In the Wheatstone bridge circuit 61, the strain gauge R1 and the strain gauge R3 face each other, and the strain gauge R2 and the strain gauge R4 face each other. Accordingly, the force Fx in the X-axis direction can be detected as will be described later, and the influence of the force Fz in the Z-axis direction on the detection of the force Fx can be prevented. Specifically, the force Fx as main-axis sensitivity can be detected, and occurrence of cross-axis sensitivity can be prevented.

As Illustrated in FIG. 21A, the strain gauges R5 to R8 may be attached to the surface of the second tilting body 36 of the tilting structure 31 on the side of the support body 20. For example, the two strain gauges R5 and R6 may be attached to the lower surface of the second-tilting-body negative-side portion 36*d* of the second tilting body 36, and the two strain gauges R7 and R8 may be attached to the lower surface of the second-tilting-body positive-side portion 36e. In the second-tilting-body negative-side portion 36d, one strain gauge R5 may be located on the side of the end 36a that is located on the negative side in the X-axis direction (or on the side of the connecting body 37), and the other strain gauge R6 may be located on the side of the central portion 36c (or on the side of the support-body-side deformable body 34). In the second-tilting-body positive-side portion 36e, one strain gauge R7 may be located on the side of the central portion 36c (or on the side of the support-body-side deformable body 34), and the other strain gauge R8 may be located on the side of the end 36b that is located on the positive side in the X-axis direction (or on the side of the connecting body 38). The strain gauges R5 to R8 provided on the second tilting body 36 may be disposed in a manner similar to the strain gauges R1 to R4 provided on the first tilting body 35 illustrated in FIG. 21B.

As illustrated in FIG. 22B, the detection circuit 60 may further have a Wheatstone bridge circuit 62 that outputs an electric signal on the basis of detection results by the four strain gauges R5 to R8 attached to the second tilting body 36. This Wheatstone bridge circuit 62 is configured so that bridge voltage as an electric signal relevant to strain detected by each of the strain gauges R5 to R8 is generated between output terminals T21 and T22 by applying predetermined voltage from a bridge voltage source E2. In the Wheatstone bridge circuit 62, the strain gauge R5 and the strain gauge R8 face each other, and the strain gauge R6 and the strain gauge R7 face each other. Accordingly, the force Fz in the Z-axis direction can be detected as will be described later, and the influence of the force Fx in the X-axis direction on the detection of the force Fz can be prevented. Specifically, the force Fz as main-axis sensitivity can be detected, and occurrence of cross-axis sensitivity can be prevented.

It should be noted that the strain gauges R5 to R8 provided on the second tilting body 36 may be provided on the first tilting body 35. Specifically, the eight strain gauges R1 to R8 may be provided on the first tilting body 35. In this case, as illustrated in FIG. 21C, two columns of strain gauges along the X-axis direction may be formed on the surface of the first tilting body 35 on the side of the force receiving body 10. Accordingly, attachment of the eight strain gauges R1 to R8 does not need to be performed on the surface of the second tilting body 36 on the side of the support body 20, and can thus be performed only on the surface of the first tilting body 35 on the side of the force receiving body 10, so that manufacturing work can be more efficient. Alternatively, the eight strain gauges R1 to R8 may be provided on the surface of the second tilting body 36 on the side of the support body 20. In this case, attachment of the eight strain gauges R1 to R8 does not need to be performed on the surface of the first tilting body 35 on the side of the force receiving body 10, and can thus be performed only on the surface of the second tilting body 36 on the side of the support body 20, so that manufacturing work can be more efficient.

Due to such a configuration, when the force receiving body 10 receives the action of force or moment, the tilting structure 31 and the support-body-side deformable body 34 are elastically deformed primarily, and the first tilting body 35 and the second tilting body 36 of the tilting structure 31 are also elastically deformed. When the first tilting body 35 is elastically deformed, strain is produced in the first tilting body 35, and this strain is detected by the strain gauges R1 to R4 provided on the first tilting body 35.

For example, when the force Fx acts on the positive side in the X-axis direction, the force-receiving-body-side deformable body 33 and the support-body-side deformable body 34 of the tilting structure 31 are inclined relative to the Z-axis direction, and the entire tilting structure 31 can tilt, as illustrated in FIG. 6. To describe in more detail, the first tilting body 35 and the second tilting body 36 are elastically deformed in such a way as to curve, as illustrated in FIG. 23A. Compressive stress is produced in a part of the first-tilting-body negative-side portion 35d on the side of the end 35a that is located on the negative side in the X-axis direction, and the resistance value decreases in response to compressive strain in the strain gauge R1 located in this part. Tensile stress is produced in a part of the first-tilting-body negative-side portion 35d on the side of the central portion 35c, and the resistance value increases in response to tensile strain in the strain gauge R2 located in this part. Compressive stress is produced in a part of the first-tilting-body positive-side portion 35e on the side of the central portion 35c, and the resistance value decreases in response to compressive strain in the strain gauge R3 located in this part. Tensile stress is produced in a part of the first-tilting-body positive-side portion 35e on the side of the end 35b that is located on the positive side in the X-axis direction, and the resistance value increases in response to tensile strain in the strain gauge R4 located in this part.

In this way, the resistance values change in the strain gauges R1 to R4, and an electric signal indicating the force Fx in the X-axis direction acting on the first strain body 30A is output from each of output terminals T11 and T12 of the Wheatstone bridge circuit 61 illustrated in FIG. 22A.

In each of the strain gauges R5 to R8 provided on the second tilting body 36, stress in a direction opposite to that in each of the strain gauges R1 to R4 provided on the first tilting body 35 is produced, and the resistance values change. However, no electric signal is output from the output terminals T21 and T22 of the Wheatstone bridge circuit 62 illustrated in FIG. 22B.

For example, when the force Fz acts on the positive side in the Z-axis direction, the first tilting body 35 and the second tilting body 36 of the tilting structure 31 are elastically deformed, as illustrated in FIG. 7A. To describe in more detail, the first tilting body 35 and the second tilting body 36 are elastically deformed in such a way as to curve, as illustrated in FIG. 23B. Compressive stress is produced in a part of the second-tilting-body negative-side portion 36d on the side of the end 36a that is located on the negative side in the X-axis direction, and the resistance value decreases in response to compressive strain in the strain gauge R5 located in this part. Tensile stress is produced in a part of the second-tilting-body negative-side portion 36d on the side of the central portion 36c, and the resistance value increases in response to tensile strain in the strain gauge R6 located in this part. Tensile stress is produced in a part of the second-tilting-body positive-side portion 36e on the side of the central portion 36c, and the resistance value increases in response to tensile strain in the strain gauge R7 located in this part. Compressive stress is produced in a part of the second-tilting-body positive-side portion 36e on the side of the end 36b that is located on the positive side in the X-axis direction, and the resistance value decreases in response to compressive strain in the strain gauge R8 located in this part.

In this way, the resistance values change in the strain gauges R5 to R8, and an electric signal indicating the force Fz in the Z-axis direction acting on the first strain body 30A is output from each of output terminals T21 and T22 of the Wheatstone bridge circuit 62 illustrated in FIG. 22B.

In each of the strain gauges R1 to R4 provided on the first tilting body 35, stress in the same direction as that in the strain gauges R5 to R8 provided on the second tilting body 36, and the resistance value thus changes. However, no electric signal is output from the output terminals T11 and T12 of the Wheatstone bridge circuit 61 illustrated in FIG. 22A.

By using the strain gauges R1 to R8 provided on the first strain body 30A illustrated in FIG. 21A, the force Fx in the X-axis direction and the force Fz in the Z-axis direction can be detected, and two axis components of force can be detected. For example, by providing a strain gauge in each of the strain bodies 30A to 30D illustrated in FIG. 5, the forces Fx, Fy, and Fz and the moments Mx, My, and Mz can be detected, and six axis components of force can be detected.

In the example described in FIG. 21A, FIG. 23A, and FIG. 23B, the strain gauges R1 to R4 are attached to the surface of the first tilting body 35 on the side of the force receiving body 10. However, without being limited thereto, the strain gauges R1 to R4 may be attached to the surface of the first tilting body 35 on the side of the support body 20 (or the surface on the side of the second tilting body 36), as indicated by broken lines in FIGS. 23A and 23B. In this case, although the relation between compression and tension in the strain gauges R1 to R4 is converse, the force Fz in the Z-axis direction can be detected in a similar manner. The example in which the strain gauges R5 to R8 are attached to the surface of the second tilting body 36 on the side of the support body 20 is also described above. However, without being limited thereto, the strain gauges R5 to R8 may be attached to the surface of the second tilting body 36 on the side of the force receiving body 10 (or the surface on the side of the first tilting body 35), as indicated by broken lines in FIGS. 23A and 23B. In this case, although the relation between compression and tension in the strain gauges R5 to R8 is converse, the force Fx in the X-axis direction can be detected in a similar manner.

In the example described in FIGS. 21A to 23B, the four strain gauges R1 to R4 attached to the first tilting body 35 constitute the Wheatstone bridge circuit 61 illustrated in FIG. 22A, and thereby detect the force Fx in the X-axis direction. However, without being limited thereto, the four strain gauges R1 to R4 may detect the force Fz in the Z-axis direction. In this case, for example, in the Wheatstone bridge circuit 61 illustrated in FIG. 22A, the strain gauge R3 and the strain gauge R4 may be interchanged with each other. Similarly, in the example described in FIGS. 21A to 23B, the four strain gauges R5 to R8 attached to the second tilting body 36 constitute the Wheatstone bridge circuit 62 illustrated in FIG. 22B, and thereby detect the force Fz in the Z-axis direction. However, without being limited thereto, the four strain gauges R5 to R8 may detect the force Fx in the X-axis direction. In this case, for example, in the Wheatstone bridge circuit 62 illustrated in FIG. 22B, the strain gauge R7 and the strain gauge R8 may be interchanged with each other.

Second Embodiment

Next, a force sensor in a second embodiment of the present invention is described by use of FIGS. 24 to 28.

The second embodiment illustrated in FIGS. 24 to 28 is different from the first embodiment illustrated in FIGS. 1 to 238 mainly in that a force receiving body and a first tilting body are connected by two force-receiving-body-side deformable bodies, and a support-body-side deformable body connects the first tilting body and a support body. In other respects, the configuration according to the second embodiment is substantially the same as that according to the first embodiment. It should be noted that the same reference signs are given in FIGS. 24 to 28 to the same parts as those in the first embodiment illustrated in FIGS. 1 to 23B, and thus detailed description is omitted.

Figure 24:
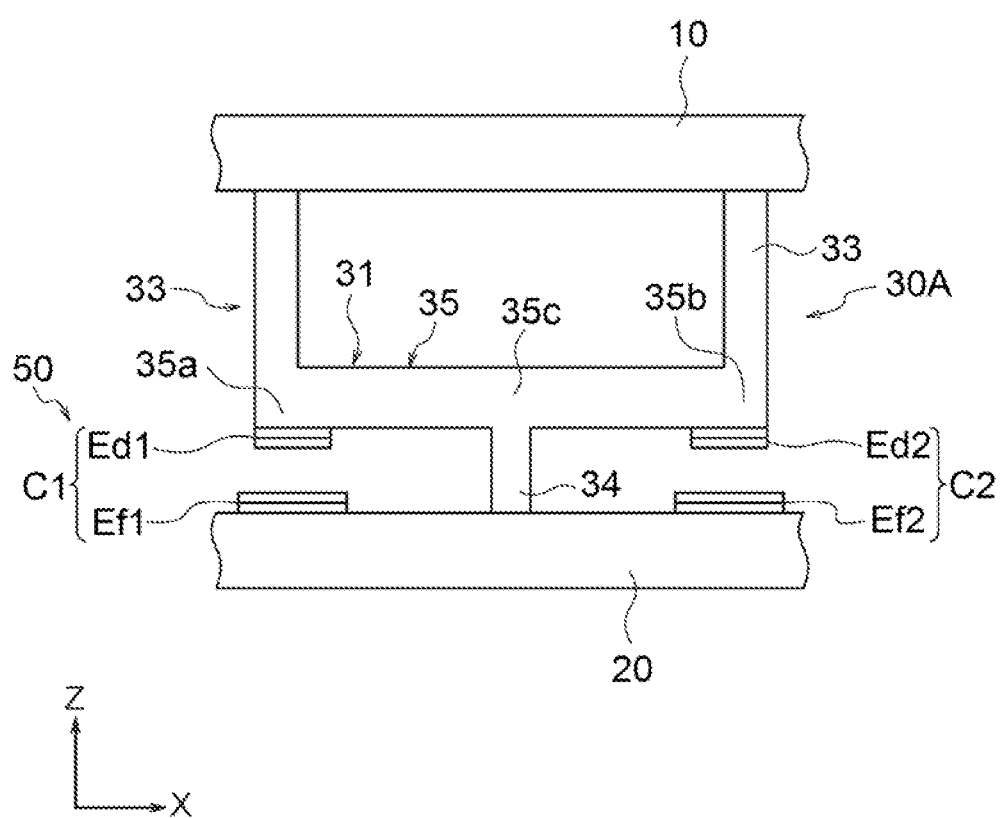
FIG. 24 is a front view illustrating a strain body of a force sensor in a second embodiment.

First, a force sensor 1 according to the present embodiment is described with reference to FIG. 24. FIG. 24 is a front view illustrating a strain body of the force sensor in the second embodiment.

In the force sensor 1 according to the present embodiment, as illustrated in FIG. 24, a tilting structure 31 of a first strain body 30A is configured by one first tilting body 35. The tilting structure 31 according to the present embodiment does not include a second tilting body 36 and connecting bodies 37 and 38 illustrated in FIG. 4. In the present embodiment, the first tilting body 35 extends in an X-axis direction. More specifically, the first tilting body 35 linearly extends in the X-axis direction from one end 35a of the first tilting body 35 to the other end 35b, and a central portion 35c of the first tilting body 35 in the X-axis direction is located at the same position in the Z-axis direction as both the ends 35a and 35b. The entire surface of the first tilting body 35 on the side of a force receiving body 10 is formed into a flat shape. Moreover, the entire surface of the first tilting body 35 on the side of a support body 20 is formed into a flat shape.

The force receiving body 10 and the first tilting body 35 are connected by two force-receiving-body-side deformable bodies 33 extending in the Z-axis direction. The two force-receiving-body-side deformable bodies 33 are disposed at positions different from each other in the X-axis direction. In the example illustrated in FIG. 24, the two force-receiving-body-side deformable bodies 33 are located at both the ends 35a and 35b of the first tilting body 35 in the X-axis direction. In the present embodiment, each of the force-receiving-body-side deformable bodies 33 has an upper end connected to the force receiving body 10 and a lower end connected to the first tilting body 35.

A support-body-side deformable body 34 is located between the two force-receiving-body-side deformable bodies 33 in the X-axis direction. More specifically, the support-body-side deformable body 34 is located in the center of the first tilting body 35 in the X-axis direction, and is connected to the central portion 35c of the first tilting body 35. In the present embodiment, the support-body-side deformable body 34 has a lower end connected to the support body 20 and an upper end connected to the first tilting body 35.

In this way, the first strain body 30A is formed symmetrically with respect to the support-body-side deformable body 34 in the X-axis direction.

Figure 25:
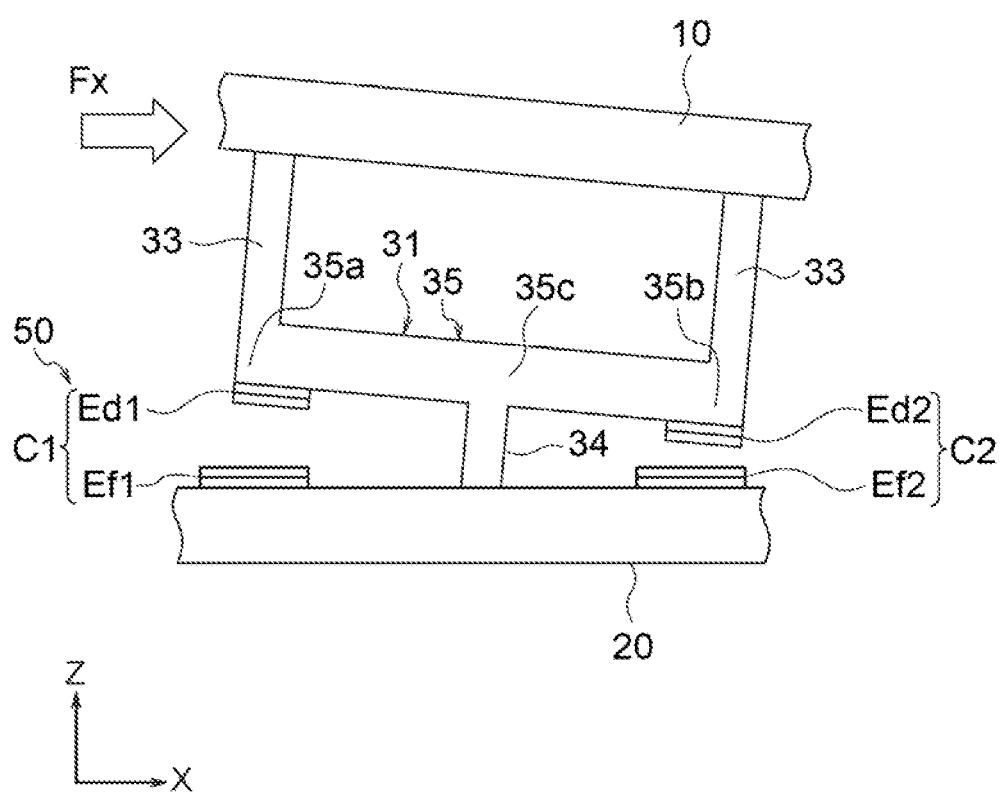
FIG. 25 is a front view schematically illustrating a deformation state of the strain body in FIG. 24 when receiving force on a positive side in an X-axis direction.
Figure 26A:
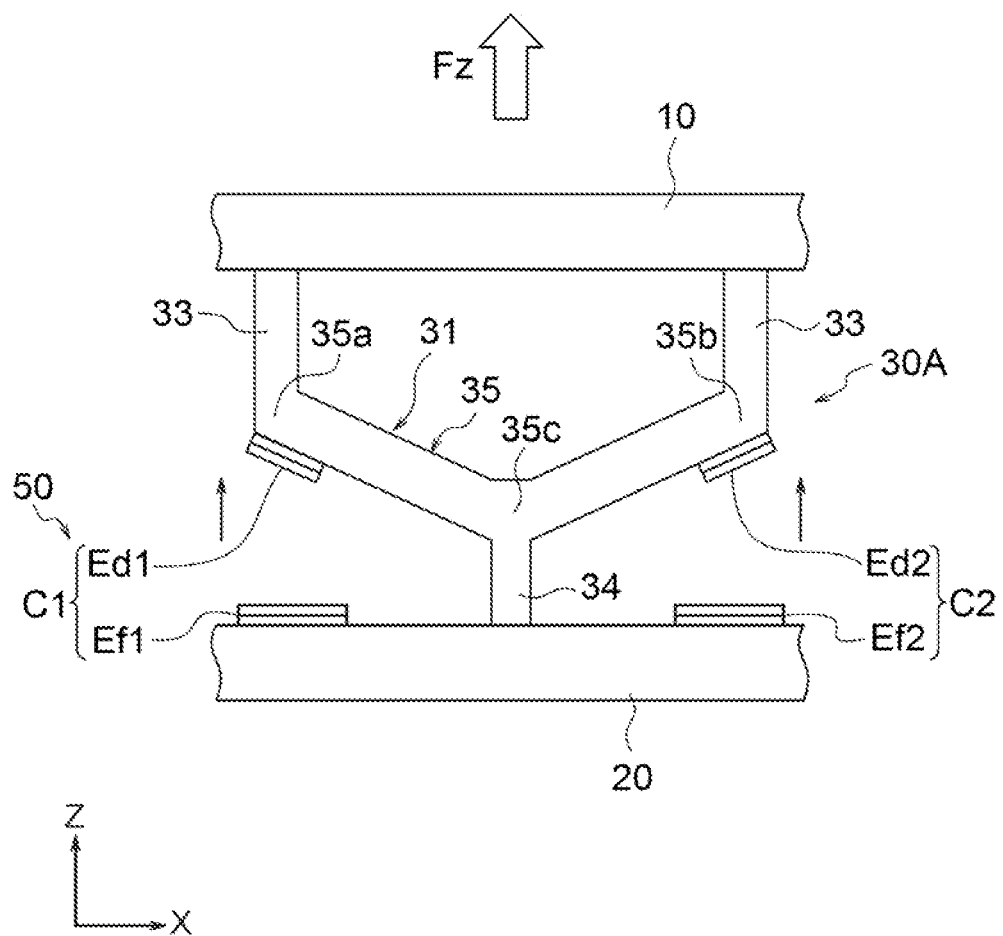
FIG. 26A is a front view schematically illustrating a deformation state of the strain body in FIG. 24 when receiving force on a positive side in a Z-axis direction.
Figure 26B:
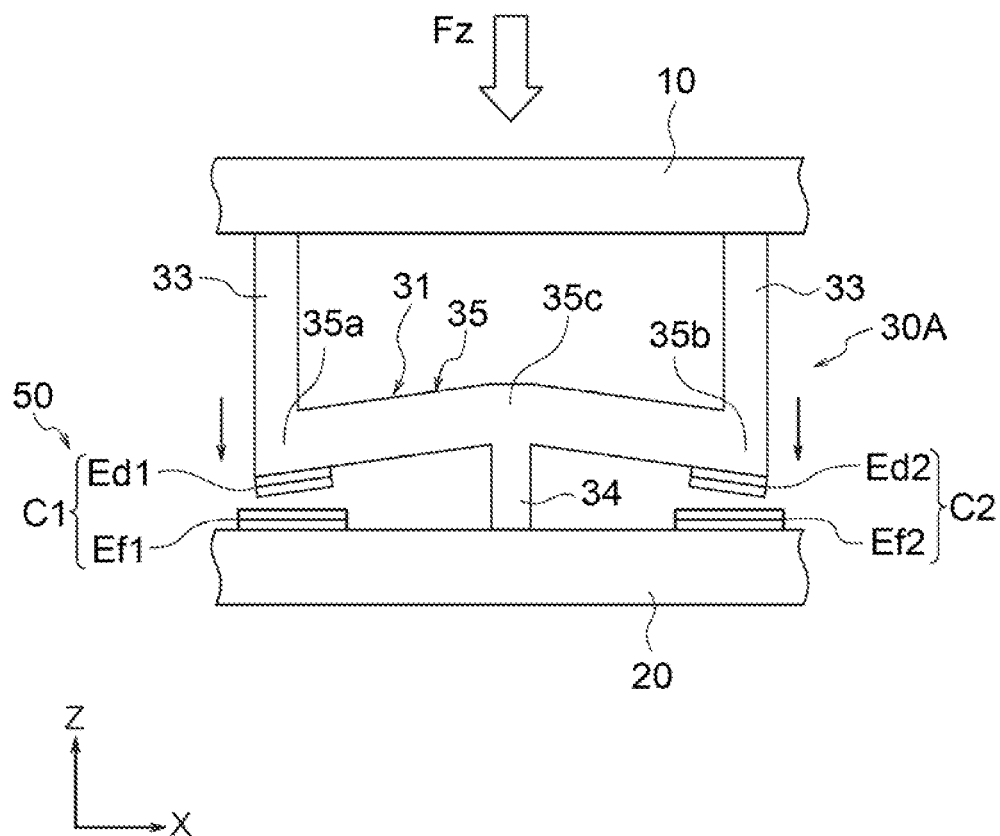
FIG. 26B is a front view schematically illustrating a deformation state of the strain body in FIG. 24 when receiving force on a negative side in a Z-axis direction.

Next, a method of detecting force or moment acting on the force sensor 1 in the present embodiment having such a configuration as above is described with reference to FIGS. 25 to 26B. FIG. 25 is a front view schematically illustrating a deformation state of the strain body in FIG. 24 when receiving force on the positive side in the X-axis direction. FIG. 26A is a front view schematically illustrating a deformation state of the strain body in FIG. 24 when receiving force on the positive side in the Z-axis direction. FIG. 26B is a front view schematically illustrating a deformation state of the strain body in FIG. 24 when receiving force on the negative side in the Z-axis direction.

Here, the first strain body 30A is taken for example to describe changes in capacitance value of a first capacitive element C1 and a second capacitive element C2 on which force Fx in the X-axis direction, force Fy in the Y-axis direction, and force Fz in the Z-axis direction act.
(When +Fx Acts)
When the force Fx acts on the first strain body 30A on the positive side in the X-axis direction, the two force-receiving-body-side deformable bodies 33 and the support-body-side deformable body 34 of the first strain body 30A are elastically deformed in the X-axis direction as illustrated in FIG. 25. Since the first tilting body 35 of the tilting structure 31 according to the present embodiment is connected to the force receiving body 10 via the two force-receiving-body-side deformable bodies 33 and is also connected to the support body 20 via one support-body-side deformable body 34, the support-body-side deformable body 34 can be elastically deformed more than the force-receiving-body-side deformable bodies 33. More specifically, the upper end of the support-body-side deformable body 34 is relatively greatly displaced to the positive side in the X-axis direction more than the lower end. Accordingly, as illustrated in FIG. 25, the two force-receiving-body-side deformable bodies 33 and the first tilting body 35 can be tilted together with the force receiving body 10 as a whole. In this instance, although not illustrated in FIG. 25, each of the force-receiving-body-side deformable bodies 33 is also elastically deformed, and the upper end of each of the force-receiving-body-side deformable bodies 33 can be displaced to the positive side in the X-axis direction more than the lower end. Thus, the support-body-side deformable body 34 of the first strain body 30A can be elastically deformable mainly by the force Fx on the positive side in the X-axis direction. In this case, the end 35a of the first tilting body 35 on the negative side in the X-axis direction rises, and the end 35b on the positive side in the X-axis direction lowers.

Accordingly, a first displacement electrode substrate Ed1 moves away from a first fixed electrode substrate Ef1, and the capacitance value of the first capacitative element C1 decreases. Moreover, a second displacement electrode substrate Ed2 moves closer to a second fixed electrode substrate Ef2, and the capacitance value of the second capacitative element C2 increases.
(When −Fx Acts)
Although not illustrated, a phenomenon opposite to the case illustrated in FIG. 25 occurs when the force Fx acts on the first strain body 30A on the negative side in the X-axis direction. Specifically, the capacitance value of the first capacitative element C1 increases, and the capacitance value of the second capacitative element C2 decreases.
(When +Fy Acts)
When the force Fy acts on the first strain body 30A on the positive side in the Y-axis direction (not illustrated), the first strain body 30A turns around the X-axis (corresponding to counterclockwise toward the positive side in the X-axis direction). As described above, the first capacitative element C1 and the second capacitative element C2 are disposed at the same position in the Y-axis direction. Thus, even when the first strain body 30A turns around the X-axis, the capacitance value increases in some regions of the first capacitative element C1, and the capacitance value decreases in other regions. Therefore, no change in capacitance value appears in the whole first capacitative element C1. Similarly, no change in capacitance value appears in the whole second capacitative element C2.
(When −Fy Acts)
When the force Fy acts on the first strain body 30A on the negative side in the Y-axis direction as well, no changes in capacitance value appear in the whole first capacitative element C1 and the whole second capacitative element C2.

(When +Fz Acts)
When the force Fz acts on the first strain body 30A on the positive side in the Z-axis direction, the first tilting body 35 of the tilting structure 31 is elastically deformed as illustrated in FIG. 26A. More specifically, while the first tilting body 35 is elastically deformed, the two force-receiving-body-side deformable bodies 33 are pulled up to the positive side in the Z-axis direction. Accordingly, the first tilting body 35 is pulled up by the force-receiving-body-side deformable bodies 33 at both the ends 35a and 35b in the X-axis direction as illustrated in FIG. 26A. On the other hand, the central portion 35c of the first tilting body 35 in the X-axis direction is connected to the support-body-side deformable body 34, and is therefore substantially not pulled up. Thus, the first tilting body 35 is elastically deformed in such a way as to project downward (e.g., a V-shape).

As Illustrated in FIG. 26A, when the first tilting body 35 is elastically deformed, the first displacement electrode substrate Ed1 moves away from the first fixed electrode substrate Ef1. Thus, the capacitance value of the first capacitative element C1 decreases. Moreover, the second displacement electrode substrate Ed2 moves away from the second fixed electrode substrate Ef2. Thus, the capacitance value of the second capacitative element C2 decreases.
(When −Fz Acts)
When the force Fz acts on the first strain body 30A on the negative side in the Z-axis direction, the first tilting body 35 of the tilting structure 31 is elastically deformed as illustrated in FIG. 26B. More specifically, while the first tilting body 35 is elastically deformed, the force-receiving-body-side deformable bodies 33 are pulled down to the negative side in the Z-axis direction. Accordingly, the first tilting body 35 is pulled down by the force-receiving-body-side deformable bodies 33 at both the ends 35a and 35b of the first tilting body 35 in the X-axis direction as illustrated in FIG. 26B. On the other hand, the central portion 35c of the first tilting body 35 in the X-axis direction is connected to the support-body-side deformable body 34, and is therefore substantially not pulled down. Thus, the first tilting body 35 is elastically deformed in such a way as to project upward (e.g., an inverted V-shape).

As illustrated in FIG. 26B, when the first tilting body 35 is elastically deformed, the first displacement electrode substrate Ed1 moves closer to the first fixed electrode substrate Ef1. Thus, the capacitance value of the first capacitative element C1 increases. Moreover, the second displacement electrode substrate Ed2 moves closer to the second fixed electrode substrate Ef2. Thus, the capacitance value of the second capacitative element C2 increases.

Thus, according to the present embodiment, the force receiving body 10 and the first tilting body 35 are connected by the two force-receiving-body-side deformable bodies 33, and the support-body-side deformable body 34 connects the first tilting body 35 and the support body 20. Accordingly, the dimension of the tilting structure 31 in the Z-axis direction can be reduced. Thus, the force sensor 1 can be reduced in height and made compact.

According to the present embodiment, the two force-receiving-body-side deformable bodies 33 of the first strain body 30A are located between both the ends 35a and 35b of the first tilting body 35 in the X-axis direction. Accordingly, the first tilting body 35 can be elastically deformed more easily by the action of force in the Z-axis direction. Thus, displacement of each of the displacement electrode substrates Ed1 to Ed8 can be increased more easily, and detection sensitivity of force or moment can be enhanced.

According to the present embodiment, the support-body-side deformable body 34 of the first strain body 30A is located between the two force-receiving-body-side deformable bodies 33 in the X-axis direction. Accordingly, the first tilting body 35 can be elastically deformed more easily by the action of force in the Z-axis direction. Thus, displacement of each of the displacement electrode substrates Ed1 to Ed8 can be increased more easily, and detection sensitivity of force or moment can be enhanced.

According to the present embodiment, the strain bodies 30A to 30D are formed symmetrically with respect to the support-body-side deformable body 34 in a second direction. Accordingly, when force in the Z-axis direction acts, displacement of the first displacement electrode substrate Ed1 can be equalized to displacement of the second displacement electrode substrate Ed2. Therefore, calculation of force or moment can be eased.

(Tenth Modification)

Figure 27:
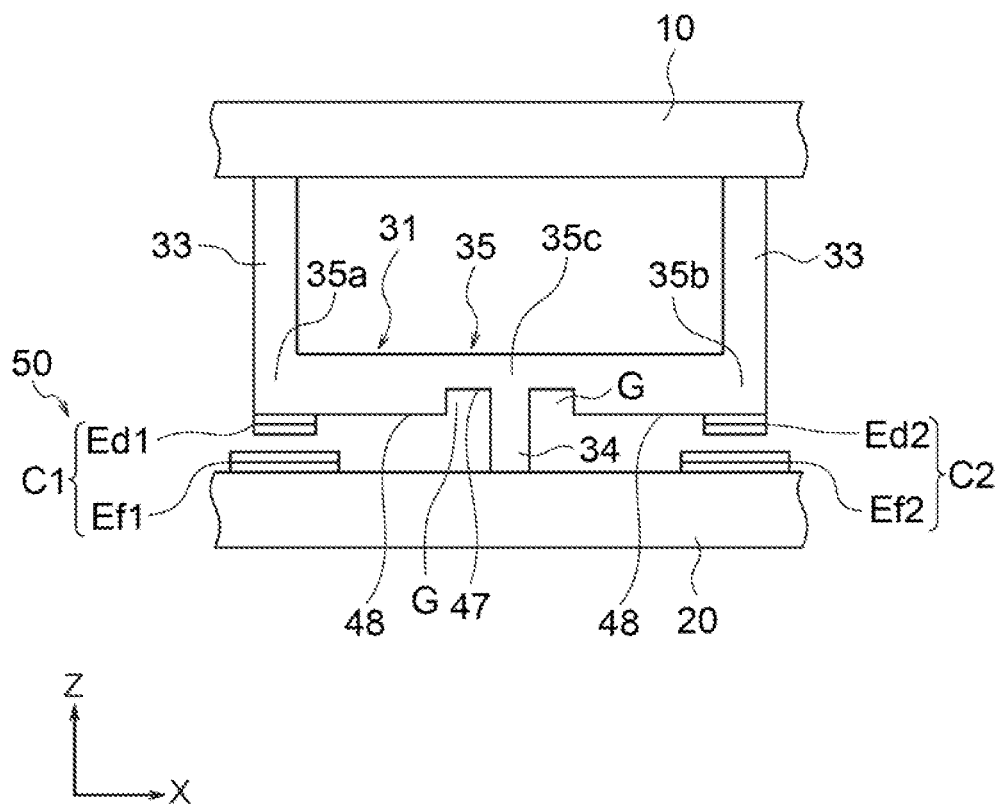
FIG. 27 is a plan view illustrating a modification of the strain body in FIG. 24.

In the example described above in the present embodiment, the entire surface of the first tilting body 35 of the first strain body 30A on the side of the support body 20 is formed into a flat shape. However, the present embodiment is not limited thereto. For example, as illustrated in FIG. 27, the surface of the first tilting body 35 on the side of the support body 20 may be formed into a recessed shape around the support-body-side deformable body 34. FIG. 27 is a plan view illustrating a modification of the strain body in FIG. 24.

More specifically, the first tilting body 35 may include a first support-body-side facing surface 47 and a second support-body-side facing surface 48 that face the support body 20. The support-body-side deformable body 34 is connected to the first support-body-side facing surface 47. The second support-body-side facing surface 48 is disposed on both sides of the first support-body-side facing surface 47 in the X-axis direction. The first support-body-side facing surface 47 is located on the side of the force receiving body 10 with respect to the second support-body-side facing surface 48. The first support-body-side facing surface 47 is formed around the support-body-side deformable body 34. The first support-body-side facing surface 47 is farther from the support body 20 than the second support-body-side facing surface 48. In this way, the surface of the first tilting body 35 on the side of the support body 20 is formed into a recessed shape, and the support-body-side deformable body 34 is connected to the portion that is formed into a recessed shape. The first support-body-side facing surface 47 is formed over the central portion 35c of the first tilting body 35 and a portion in its vicinity, and a groove G is formed around the support-body-side deformable body 34 (corresponding to both sides in the X-axis direction in the example illustrated in FIG. 27). Each of the first support-body-side facing surface 47 and the second support-body-side facing surface 48 may be formed into a flat shape. It should be noted that in the example illustrated in FIG. 27, the support-body-side deformable body 34 and the first tilting body 35 of the tilting structure 31 are integrally formed into a continuous shape, and the first support-body-side facing surface 47 is illustrated on both sides of the support-body-side deformable body 34.

Thus, according to the tenth modification, the first tilting body 35 includes the first support-body-side facing surface 47 located on the side of the force receiving body 10 with respect to the second support-body-side facing surface 48, and the support-body-side deformable body 34 is connected to the first support-body-side facing surface 47. Accordingly, the dimension of the support-body-side deformable body 34 in the Z-axis direction can be made longer. Thus, the force sensor 1 can be reduced in height and made compact without shortening the dimension of the support-body-side deformable body 34 in the Z-axis direction.

(Eleventh Modification)

Figure 28:
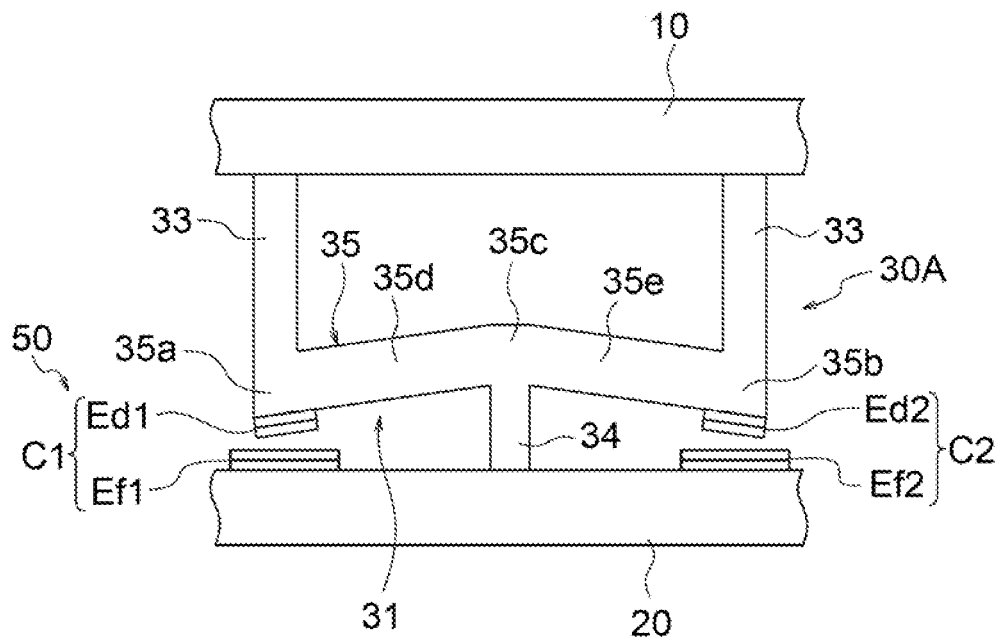
FIG. 28 is a plan view illustrating another modification of the strain body in FIG. 24.

In the example described above in the present embodiment, the first tilting body 35 linearly extends in the X-axis direction (corresponding to a second direction of the first strain body 30A). However, without being limited thereto, the first tilting body 35 and the second tilting body 36 can have any shape as long as the first tilting body 35 and the second tilting body 36 are disposed in a plane including the Z-axis direction (corresponding to a first direction) and the X-axis direction and extend in a direction different from the Z-axis direction. For example, the first tilting body 35 and the second tilting body 36 may have a shape illustrated in FIG. 28. Here, FIG. 28 is a front view illustrating another modification of the strain body in FIG. 24. It should be noted that the first strain body 30A illustrated in FIG. 28 shows a shape similar to that of the strain body when receiving the force Fz on the negative side in the Z-axis direction as illustrated in FIG. 26B, but is illustrated as the first strain body 30A when receiving no action of force or moment in FIG. 28.

In the first strain body 30A illustrated in FIG. 28, the central portion 35c of the first tilting body 35 in the X-axis direction is located on the side of the force receiving body 10 with respect to both the ends 35a and 35b in the X-axis direction. More specifically, the first tilting body 35 includes a first-tilting-body negative-side portion 35d disposed on the negative side in the X-axis direction and a first-tilting-body positive-side portion 35e disposed on the positive side in the X-axis direction. The first-tilting-body negative-side portion 35d is a portion connecting the negative-side end 35a and the central portion 35c, and is inclined in such a way as to extend toward the positive side in the Z-axis direction while extending toward the positive side in the X-axis direction. The first-tilting-body negative-side portion 35d extends in a direction (corresponding to a direction different from the Z-axis direction) inclined relative to the Z-axis direction in an XZ plane. The first-tilting-body positive-side portion 35e is a portion connecting the positive-side end 35b and the central portion 35c, and is inclined in such a way as to extend toward the negative side in the Z-axis direction while extending toward the positive side in the X-axis direction. The first-tilting-body positive-side portion 35e extends in a direction (corresponding to a direction different from the Z-axis direction) inclined relative to the Z-axis direction in the XZ plane. In this way, the first tilting body 35 in the modification illustrated in FIG. 28 is schematically formed into an inverted V-shape.

Thus, according to the modification illustrated in FIG. 28, both the ends 35a and 35b of the first tilting body 35 in the X-axis direction are located on the side of the support body 20 with respect to the central portion 35c in the X-axis direction. Accordingly, both the ends 35a and 35b of the first tilting body 35 in the X-axis direction can be kept far from the force receiving body 10, and the dimension of the force-receiving-body-side deformable body 33 in the Z-axis direction can be made longer. Thus, the force sensor 1 can be reduced in height and made compact without reducing the dimension of the force-receiving-body-side deformable bodies 33 in the Z-axis direction.

According to the modification illustrated in FIG. 28, the central portion 35c of the first tilting body 35 in the X-axis direction is located on the side of the force receiving body 10 with respect to both the ends 35a and 35b in the X-axis direction. Accordingly, the central portion 35c of the first tilting body 35 in the X-axis direction can be kept far from the support body 20, and the dimension of the support-body-side deformable body 34 in the Z-axis direction can be made longer. Thus, the force sensor 1 can be reduced in height and made compact without reducing the dimension of the support-body-side deformable body 34 in the Z-axis direction.

It should be noted that the form of the first tilting body 35 is not limited to the example illustrated in FIG. 28. For example, although not illustrated, the central portion 35c of the first tilting body 35 in the X-axis direction may be located on the side of the support body 20 with respect to both the ends 35a and 35b in the X-axis direction. In this case, the first tilting body 35 is schematically formed into a V-shape. Accordingly, the force sensor 1 can be increased in height without increasing the dimension of the force-receiving-body-side deformable body 33 in the Z-axis direction and the dimension of the support-body-side deformable body 34 in the Z-axis direction.

(Twelfth Modification)

Figure 29:
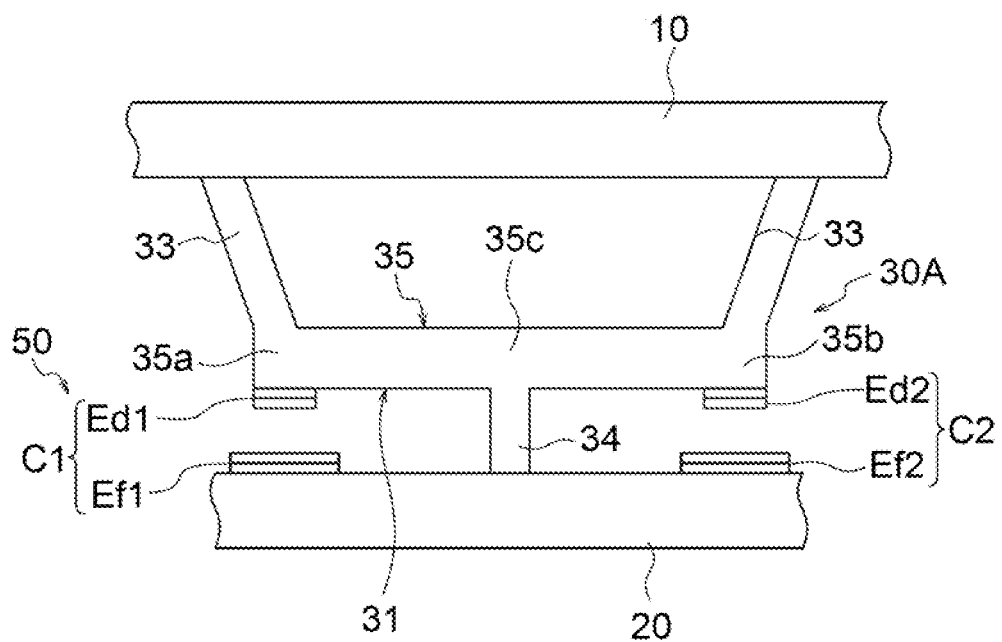
FIG. 29 is a plan view illustrating another modification of the strain body in FIG. 24.
Figure 30:
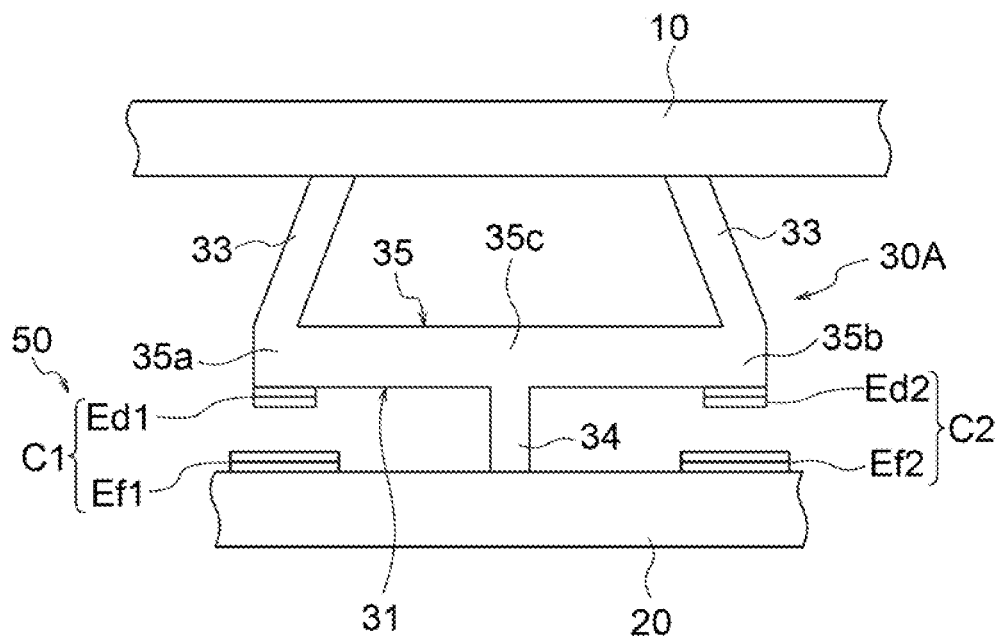
FIG. 30 is a plan view illustrating another modification of the strain body in FIG. 24.

In the example described above in the present embodiment, the force-receiving-body-side deformable body 33 extends in the Z-axis direction. However, the present embodiment is not limited thereto. For example, as illustrated in FIGS. 29 and 30, the force-receiving-body-side deformable body 33 may be inclined relative to the Z-axis direction when viewed in the Y-axis direction. FIG. 29 is a plan view illustrating another modification of the strain body in FIG. 24. FIG. 30 is a plan view illustrating another modification of the strain body in FIG. 24.

In the modification illustrated in FIG. 29, the two force-receiving-body-side deformable bodies 33 are inclined relative to the Z-axis direction in such a way as to be kept far from each other toward the force receiving body 10. More specifically, the force-receiving-body-side deformable body 33 located on the negative side in the X-axis direction is inclined relative to the Z-axis direction in such a way that the upper end is located on the negative side in the X-axis direction with respect to the lower end. On the other hand, the force-receiving-body-side deformable body 33 located on the positive side in the X-axis direction is inclined relative to the Z-axis direction in such a way that the upper end is located on the positive side in the X-axis direction with respect to the lower end. In this way, the force receiving body 10, the two force-receiving-body-side deformable bodies 33, and the first tilting body 35 are disposed in the shape of an inverted trapezoid when viewed in the Y-axis direction.

Thus, according to the modification illustrated in FIG. 29, the force sensor 1 can be reduced in height and made compact without reducing the longitudinal dimension of the force-receiving-body-side deformable bodies 33.

In the modification illustrated in FIG. 30, the two force-receiving-body-side deformable bodies 33 are inclined relative to the Z-axis direction in such a way as to be kept close to each other toward the force receiving body 10. More specifically, the force-receiving-body-side deformable body 33 located on the negative side in the X-axis direction is inclined relative to the Z-axis direction in such a way that the upper end is located on the positive side in the X-axis direction with respect to the lower end. On the other hand, the force-receiving-body-side deformable body 33 located on the positive side in the X-axis direction is inclined relative to the Z-axis direction in such a way that the upper end is located on the negative side in the X-axis direction with respect to the lower end. In this way, the force receiving body 10, the two force-receiving-body-side deformable bodies 33, and the first tilting body 35 are disposed in the shape of a trapezoid when viewed in the Y-axis direction.

Thus, according to the modification illustrated in FIG. 30, the force sensor 1 can be reduced in height and made compact without reducing the longitudinal dimension of the force-receiving-body-side deformable body 33.

(Thirteenth Modification)

Figure 31:
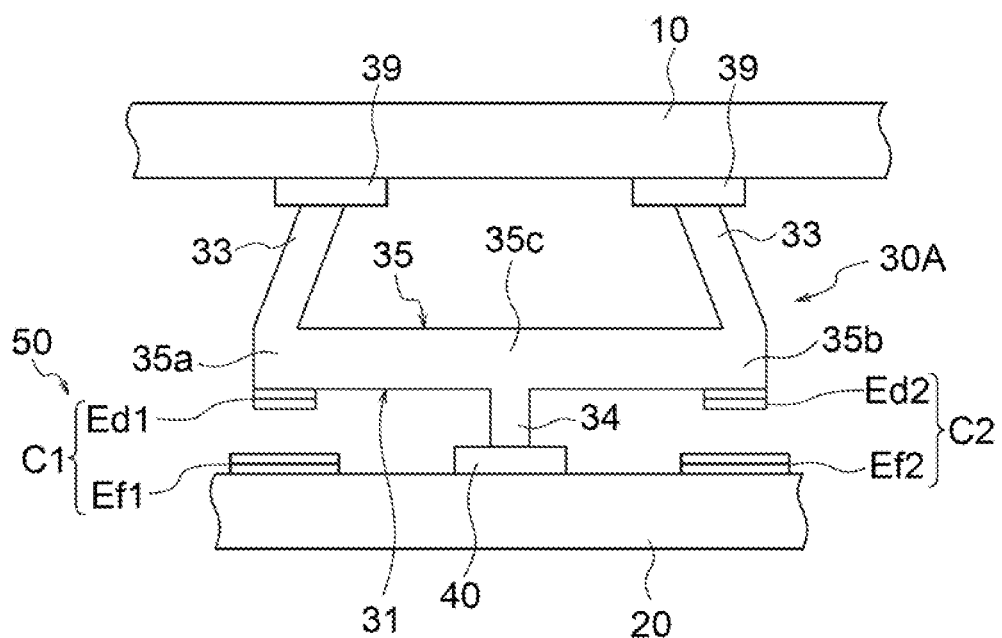
FIG. 31 is a plan view illustrating another modification of the strain body in FIG. 24.

In the example described above in the present embodiment, the upper end of each of the force-receiving-body-side deformable bodies 33 is connected to the force receiving body 10. However, without being limited thereto, each of the force-receiving-body-side deformable bodies 33 may be connected to the force receiving body 10 via a force-receiving-body-side seat 39, for example, as illustrated in FIG. 31. Accordingly, each of the force-receiving-body-side deformable bodies 33 can be stably attached to the force receiving body 10 by the force-receiving-body-side seat 39. For example, the force-receiving-body-side seat 39, the force-receiving-body-side deformable body 33, and the first tilting body 35 may be integrally formed. In this case, each of the force-receiving-body-side seats 39 may be fixed to the force receiving body 10 by a bolt, adhesive, or the like. Alternatively, the force-receiving-body-side seat 39 and the force-receiving-body-side deformable body 33 may be separately formed and fixed to each other by a bolt, adhesive, or the like.

Similarly, without being limited to the configuration of having the lower end connected to the support body 20, the support-body-side deformable body 34 may be connected to the support body 20 via a support-body-side seat 40, for example, as illustrated in FIG. 31. Accordingly, the support-body-side deformable body 34 can be stably attached to the support body 20 by the support-body-side seat 40. For example, the support-body-side seat 40, the support-body-side deformable body 34, and the first tilting body 35 may be integrally formed. In this case, the support-body-side seat 40 may be fixed to the support body 20 by a bolt, adhesive, or the like. Alternatively, the support-body-side seat 40 and the support-body-side deformable body 34 may be separately formed and fixed to each other by a bolt, adhesive, or the like.

Furthermore, the force-receiving-body-side seat 39, the force-receiving-body-side deformable body 33, the tilting structure 31, the support-body-side deformable body 34, and the support-body-side seat 40 may be integrally formed. In this case, the force-receiving-body-side seat 39 may be fixed to the force receiving body 10 by a bolt, adhesive, or the like, and the support-body-side seat 40 may be fixed to the support body 20 by a bolt, adhesive, or the like.

It should be noted that the force-receiving-body-side seat and the support-body-side seat are not exclusively applied to the first strain body 30A illustrated in FIG. 31, and can also be applied to the other strain bodies 30A to 30D including the first strain body 30A illustrated in FIG. 24 and the like.

(Fourteenth Modification)

In the example described above in the present embodiment, the detection element 50 is configured as an element that detects capacitance. However, without being limited thereto, the detection element 50 may be constituted by a strain gauge (see FIGS. 21A to 23B) that detects strain produced by the action of force or moment received by the force receiving body 10. For example, the strain gauges R1 to R4 may be attached to the surface of the first tilting body 35 of the tilting structure 31 on the side of the force receiving body 10, and the strain gauges R5 to R8 may be attached to the surface of the first tilting body 35 on the side of the support body 20. In this case, the strain gauges R1 to R4 and the strain gauges R5 to R8 may be disposed as illustrated in FIG. 21B. Moreover, for example, the strain gauges R1 to R8 may be attached to the surface of the first tilting body 35 on the side of the force receiving body 10, or to the surface on the side of the support body 20, as illustrated in FIG. 21C.

The present invention is not completely limited to the embodiments and modifications described above, and can be embodied by modifying the components without departing from the spirit thereof at the stage of implementation. Moreover, various inventions can be formed by a suitable combination of a plurality of components disclosed in the embodiments and modifications described above. Some components may be deleted from all of the components disclosed in the embodiments and modifications described above. Further, the components in different embodiments and modifications may be suitably combined.

The invention claimed is:

1. A force sensor comprising:
a force receiving body that receives action of force or moment to be targeted for detection;
a support body that is disposed on one side of the force receiving body in a first direction and that supports the force receiving body;
a strain body that connects the force receiving body and the support body and that is elastically deformed by the action of force or moment received by the force receiving body;
a detection element that detects displacement caused by elastic deformation produced in the strain body; and
a detection circuit that outputs an electric signal indicating force or moment acting on the strain body, on the basis of a detection result by the detection element, wherein
the strain body includes a tilting structure disposed between the force receiving body and the support body, a force-receiving-body-side deformable body that connects the force receiving body and the tilting structure, the force-receiving-body-side deformable body being elastically deformable by the action of force or moment received by the force receiving body, and a support-body-side deformable body that connects the tilting structure and the support body, the support-body-side deformable body being elastically deformable by the action of force or moment received by the force receiving body, and
the tilting structure includes a first tilting body that is disposed in a plane including the first direction and a second direction orthogonal to the first direction, the first tilting body extending in a direction different from the first direction and being elastically deformable by the action of force in the first direction,
the tilting structure further includes a second tilting body that is disposed between the first tilting body and the support body, the second tilting body being disposed in a plane including the first direction and the second direction, extending in a direction different from the first direction, and being elastically deformable by the action of force in the first direction, and a pair of connecting bodies connecting one of the both ends of the first tilting body in the second direction and a corresponding one of the both ends of the second tilting body in the second direction,
the force-receiving-body-side deformable body is connected to the first tilting body,
the support-body-side deformable body is connected to the second tilting body.

2. The force sensor according to claim 1, wherein the force-receiving-body-side deformable body extends in the first direction.

3. The force sensor according to claim 1, wherein the support-body-side deformable body extends in the first direction.

4. The force sensor according to claim 1, wherein the force-receiving-body-side deformable body is located between both the ends of the first tilting body in the second direction.

5. The force sensor according to claim 1, wherein the support-body-side deformable body is located between both the ends of the second tilting body in the second direction.

6. The force sensor according to claim 1, wherein the second tilting body extends in the second direction,
the second tilting body includes a first support-body-side facing surface to which the support-body-side deformable body is connected, the first support-body-side facing surface facing the support body, and a second support-body-side facing surface that is disposed on both sides of the first support-body-side facing surface in the second direction, the second support-body-side facing surface facing the support body, and
the first support-body-side facing surface is located on the side of the force receiving body with respect to the second support-body-side facing surface.

7. The force sensor according to claim 1, wherein the force-receiving-body-side deformable body is connected to the force receiving body via a force-receiving-body-side seat, and
the support-body-side deformable body is connected to the support body via a support-body-side seat.

8. The force sensor according to claim 1, wherein the detection element includes a fixed electrode substrate provided on the force receiving body or the support body and a displacement electrode substrate provided on the tilting structure, the displacement electrode substrate facing the fixed electrode substrate, and
the displacement electrode substrate is disposed at both ends of the tilting structure in the second direction.

9. The force sensor according to claim 8, wherein the displacement electrode substrate is provided on the tilting structure via a columnar member.

10. The force sensor according to claim 9, wherein the displacement electrode substrate is provided on the columnar member via a reinforcing substrate.

11. The force sensor according to claim 1, wherein the detection dement includes a strain gauge provided on the strain body.

12. The force sensor according to claim 1, wherein the force receiving body and the support body are connected by the four strain bodies,
the four strain bodies include a first strain body, a second strain body, a third strain body, and a fourth strain body,
the first direction is a Z-axis direction in an XYZ three-dimensional coordinate system,
the first strain body is disposed on a negative side in the Y-axis direction relative to a center of the force receiving body, the second strain body is disposed on a positive side in the X-axis direction relative to the center of the force receiving body, the third strain body is disposed on a positive side in the Y-axis direction relative to the center of the force receiving body, and the fourth strain body is disposed on a negative side in the X-axis direction relative to the center of the force receiving body,
the second direction of the first strain body and the third strain body is the X-axis direction, and
the second direction of the second strain body and the fourth strain body is the Y-axis direction.

13. The force sensor according to claim 12, wherein at least one of the planar shape of the force receiving body and the planar shape of the support body is circular or rectangular, and the tilting structure of the strain body is formed into a curved shape when viewed in the first direction.

* * * * *